United States Patent
Douglas et al.

(10) Patent No.: US 10,354,545 B2
(45) Date of Patent: Jul. 16, 2019

(54) LOCOMOTIVE ELECTRICAL SYSTEMS SIMULATOR

(71) Applicant: BNSF Railway Company, Fort Worth, TX (US)

(72) Inventors: Ronnie Joe Douglas, Tonganoxie, KS (US); Bennie Ray Fortner, Lenexa, KS (US)

(73) Assignee: BNSF Railway Company, Fort Worth, TX (US)

(*) Notice: Subject to any disclaimer, the term of this patent is extended or adjusted under 35 U.S.C. 154(b) by 582 days.

(21) Appl. No.: 15/071,625

(22) Filed: Mar. 16, 2016

(65) Prior Publication Data

US 2017/0061811 A1   Mar. 2, 2017

Related U.S. Application Data

(60) Provisional application No. 62/212,794, filed on Sep. 1, 2015.

(51) Int. Cl.
| | |
|---|---|
| *G09B 9/04* | (2006.01) |
| *G09B 9/00* | (2006.01) |
| *B60L 7/12* | (2006.01) |
| *B60L 50/15* | (2019.01) |
| *B61C 5/00* | (2006.01) |

(52) U.S. Cl.
CPC ............ *G09B 9/00* (2013.01); *B60L 7/12* (2013.01); *B60L 50/15* (2019.02); *G09B 9/04* (2013.01); *B61C 5/00* (2013.01)

(58) Field of Classification Search
CPC . G09B 9/04; G09B 9/00; B60W 10/08; B60L 2200/26; B60L 15/20
See application file for complete search history.

(56) References Cited

U.S. PATENT DOCUMENTS 3,629,676 A * 12/1971 Ephraim, Jr. ............. B60L 3/12
                                                        318/144
3,691,446 A *  9/1972 Ephraim, Jr. ............ H02H 6/00
                                                        318/472

(Continued)

FOREIGN PATENT DOCUMENTS

| FR | 2801403 A1 | 5/2001 |
|---|---|---|
| RU | 2550105 C1 | 5/2015 |

OTHER PUBLICATIONS

Witten Opinion of the International Searching Authority dated Nov. 16, 2016 in connection with International Patent Application No. PCT/US2016/049841.

(Continued)

*Primary Examiner* — Jerry-Daryl Fletcher

(57) ABSTRACT

A system for simulating electrical systems of a diesel-electric locomotive comprising includes a first electric motor for simulating a locomotive diesel engine and a generator coupled to the electric motor for simulating a locomotive main generator in a main generator operating mode. A second electric motor is driven by an electrical output of the generator in the main generator operating mode and simulates a locomotive traction motor. A third electric motor is coupled to the second electric motor and operates as a generator providing a load on the second electric motor during simulated locomotive motoring operations.

21 Claims, 54 Drawing Sheets

(56) References Cited

U.S. PATENT DOCUMENTS

| | | | | |
|---|---|---|---|---|
| 2005/0045058 A1* | 3/2005 | Donnelly | ............ | B60L 3/0046 |
| | | | | 105/26.05 |
| 2005/0228620 A1* | 10/2005 | Convert | ................ | G09B 9/04 |
| | | | | 703/1 |
| 2015/0088344 A1* | 3/2015 | Shakal | .................. | B61C 17/12 |
| | | | | 701/20 |

OTHER PUBLICATIONS

International Search Report dated Nov. 16, 2016 in connection with International Patent Application No. PCT/US2016/049841.

\* cited by examiner

ZONE 36

| | | | |
|---|---|---|---|
| | | | CR { 31, 32, 34, 35, 38, 39, 49 |
| NVR 611 | GR 1105 | | |
| | MR 1506 | FOR 1002 | PCR 1509 |
| | BR1 1502 | RER 1003 | GFX 1501 |
| | BR2 1007 | TSR 1001 | ER 1201 |
| | FPCR 1106 | CDR 1504 | S12A 1503 |
| | FPR 1107 | FTX 1516 | P1A 1515 |
| | | PR 1514 | THL 1710 |
| | LTTA 1510 | | |
| BA 1507 | | | |

FIG. 24D

LOCOMOTIVE ELECTRICAL SYSTEMS SIMULATOR

CROSS-REFERENCE TO RELATED APPLICATION

The present application claims the benefit of U.S. Provisional Application Ser. No. 62/212,794, filed Sep. 1, 2015, which is incorporated herein by reference for all purposes.

FIELD OF INVENTION

The present invention relates in general to railroad locomotive maintenance and maintenance training, and in particular to a locomotive electrical systems simulator.

BACKGROUND OF INVENTION

The electrical systems of typical railroad locomotives have a substantial number of common subsystems and circuits, which are based on the same or similar theories of operation. A thorough knowledge of these subsystems and circuits is crucial to the proper maintenance and operation of locomotives. Therefore, if a locomotive maintenance student or locomotive electrician can grasp the concept of how each subsystem or circuit works, that student or electrician need not be trained on every make and model of locomotive, yet still be able qualified to address a wide range of maintenance and operational problems encountered during railroad operations.

The typical locomotive electrical system training curricula generally consists of both instructor-led training and hands-on training. The hands-on portion of the training is normally accomplished through locomotive electrical systems simulators, which are typically constructed from actual locomotive electrical cabinets with programmable logic controllers simulating the signals found in an actual locomotive.

Current locomotive electrical systems simulators are subject to some significant disadvantages. Among other things, these simulators lack generators and motors, which are the main components that allow diesel-electric locomotives to move. Consequently, students are not provided with first hand experience with regards to important locomotive electrical operations such as generator field excitation, electrical loading on the main generator by the traction motors under varying conditions, and dynamic braking. Furthermore, the number of simulators available to a typical class is normally limited. Such the hands-on time available to each student is consequently limited.

In addition, in conventional simulator systems, the ability of the instructor to emulate faults typically found during the operation of actual locomotive electrical systems is also limited. While each instructor can place faults within a given electrical subsystem or circuitry in the simulator, the ability to consistently emulate actual locomotive electrical system faults suffers, a consequently the training of the students, as well.

SUMMARY OF INVENTION

One exemplary embodiment of the principles of the present invention is a locomotive electrical systems simulation system including a simulated diesel engine subsystem including an electric motor and a motor speed controller for controlling the speed of the electrical motor in response to a control voltage. A plurality of throttle setting switches simulate a locomotive throttle handle switch and provide inputs to a simulated electronic governor provided to the motor speed controller, which includes a switched voltage divider for selectively setting the control voltage in response to the inputs from the plurality of throttle setting switches. A generator driven by the electrical motor of the simulated diesel engine subsystem operates in two modes. In a main generator mode, the generator simulates a locomotive main generator and in an auxiliary generator mode, simulates a locomotive auxiliary generator. Excitation control circuitry controls the excitation of the field winding of the generator in response to user inputs.

The exemplary locomotive electrical simulation system also includes a simulated traction motor subsystem including first and second simulated traction motors and switching circuitry for selectively electrically coupling the first and second simulated traction motors with the generator during simulated motoring in the main generator mode and to a resistive load during simulated dynamic braking. First and second control motors operate as generators respectively loading the first and second simulated traction motors during simulated motoring and operate as motors respectively turning the first and second simulated traction motors simulated during dynamic braking. Switching circuitry selectively electrically couples the generator to a auxiliary generator load in the auxiliary generator mode.

Particular embodiments of the present principles include a simulated interlock system, simulated fuel pump system, simulated pneumatic system, and simulated cooling system, among other things.

Advantageously, the present principles may be practiced in compact locomotive electrical systems simulators, which allow a railroad to make available multiple simulators for each training class and ensure that each student is provided with hands-on simulator training. At the same time, the preferred embodiments of the present principles provide for comprehensive training and troubleshooting monitoring on the basic electrical systems common to all locomotives, including hands-on experience with electrical motors and electrical generators.

Moreover, locomotive electrical system simulation systems embodying the principles of the present invention ensure that fault emulation by the instructors is consistent and that every student receives the same training. Safety is incorporated into these simulator systems, as well, since students will be working with only low voltage circuits, with 42 V being the highest voltage students will be exposed to under normal circumstances. Notwithstanding the limited voltages, embodiments of the present locomotive electrical simulator systems still introduce students to the safety exposures associated with actual locomotives, such as electrical hazards and rotating equipment

BRIEF DESCRIPTION OF DRAWINGS

For a more complete understanding of the present invention, and the advantages thereof, reference is now made to the following descriptions taken in conjunction with the accompanying drawings, in which:

FIGS. 24A-24E are diagrams of the panels of an upper front section of an exemplary training rack housing the simulator system of FIG. 1;

DETAILED DESCRIPTION OF THE INVENTION

The principles of the present invention and their advantages are best understood by referring to the illustrated embodiment depicted in FIGS. 1-33 of the drawings.

Figure 1:
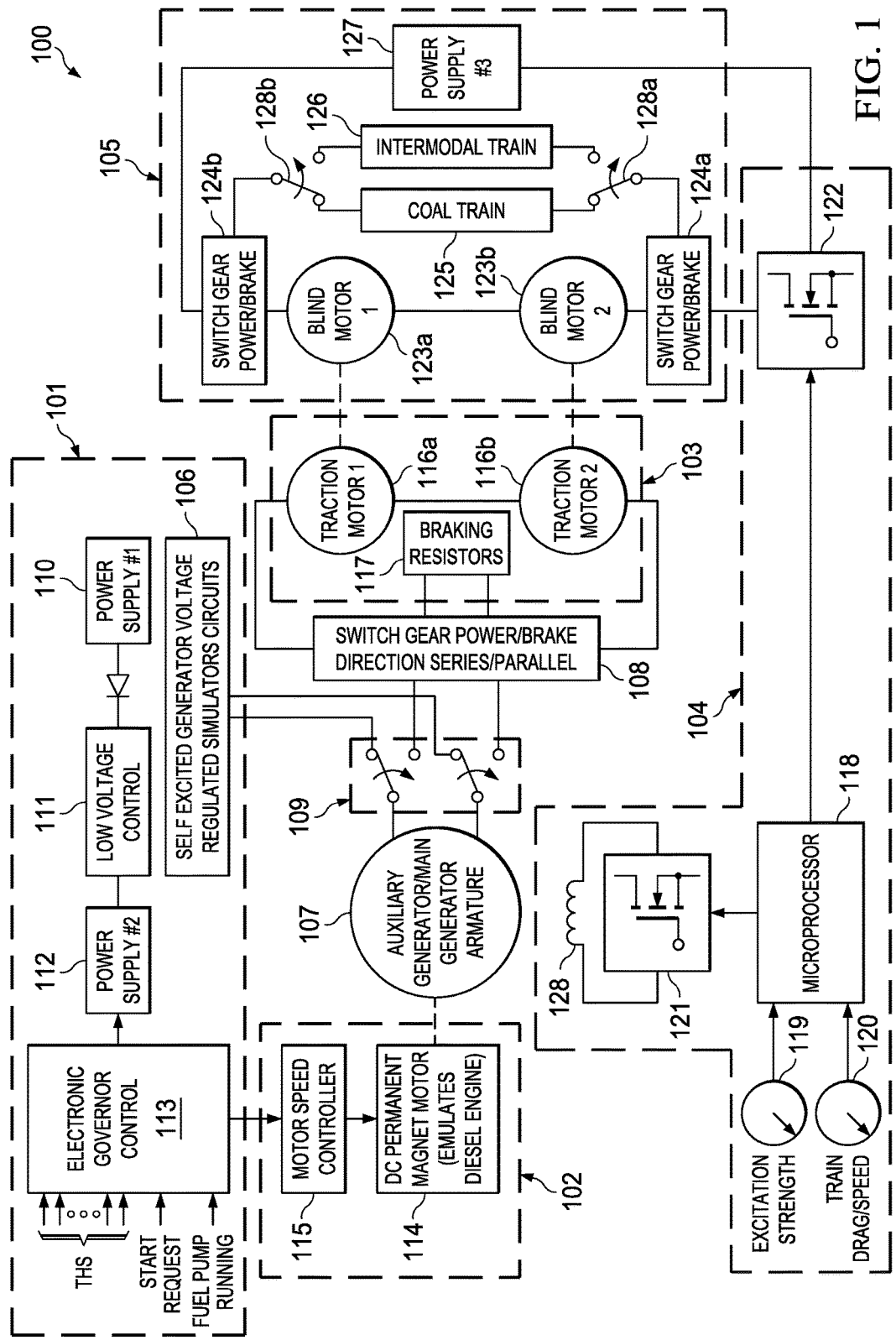
FIG. 1 is a high level block diagram of the primary subsystems of a locomotive electrical systems simulator system according to a preferred embodiment of the principles of the present invention.

FIG. 1 is a high level functional block diagram of a locomotive electrical system training rack ("locomotive electrical system simulator" or "simulator system") 100 embodying the principles of the present invention. Generally, simulator 100 emulates operations of each of the primary electrical systems of a typical locomotive, including the low voltage control systems, the diesel engine, the traction motors, the main and auxiliary generators, and the high voltage systems. Advantageously, simulator 100 can emulate locomotive electrical system states corresponding to forward and reverse locomotive movements, dynamic braking conditions, changes in notches (i.e., locomotive speed), changes in drag on a moving locomotive (i.e., changes in grade), and different loading (e.g., coal trains, intermodal trains).

In the embodiment FIG. 1, the primary subsystems include emulated low voltage subsystems 101, emulated diesel engine subsystem 102, emulated traction motors subsystem 103, dual auxiliary/main generator 107, and blind (control) motor subsystems 105. Auxiliary generator/main generator (AG/MG) switch 109 allows dual auxiliary/main generator 107 to emulate either a typical locomotive main generator or a typical locomotive auxiliary generator.

In particularly when operating in the main generator mode, generator field control circuitry 104 allows dual auxiliary/main generator 107 to operate as a separately excited generator driving emulated traction motors 103 through switch gear 108. In the auxiliary generator mode, self-excited generator/voltage regulator simulator circuits 106, allow dual auxiliary/main generator 107 to emulate a typical self-excited locomotive auxiliary generator.

Switch gear 108 allows emulated traction motors 103 to operate during simulated motoring in either a forward or reverse direction and either in series or in parallel. In addition, switch gear 108 allows traction motors 103 to operate in a simulated dynamic braking mode.

Locomotives typically employ 74 volt low voltage systems for operational control. In the illustrated embodiment of FIG. 1, emulated locomotive low voltage systems 101 include two twelve (12) volt power supplies 110 (PS1) and 112 (PS2) for emulating a typical locomotive battery and charging system, which supplies the power needed to start the diesel engine and operate the low voltage control systems. As described in further detail below, emulated low voltage control systems 111 include fuel pump motor circuits, engine starting circuits, battery charging circuits, engine run & alarm bell circuits, air compressor control circuits, diesel engine speed control circuits, engine cooling control circuits, headlight circuits, locomotive directional control circuits, and motoring/dynamic brake control circuits.

In the illustrated embodiment of simulator system 100, emulated diesel engine 102 is based on a 90 volt permanent magnet DC motor 114 and a motor speed controller 115, discussed in further detail below.

The emulated locomotive high voltage systems include dual purpose auxiliary/main generator 107, which in the illustrated is a 36V DC series wound motor operating as a generator mechanically coupled to DC motor 114. In the illustrated embodiment, emulated traction motors 103, which are electrically coupled to dual auxiliary/main generator 107 in the main generator mode, include two 36V DC series wound motors 116a and 116b. Braking resistors 117 allow for the simulation of dynamic braking conditions, under the control of switch gear 108. In the illustrated embodiment, switch gear 108 includes a pair of motorized multi-contact switches, one for directional control and one for power/braking control, as described in detail below. Other switches within switch gear 108 connect emulated traction motors 116a and 116b in either a series or parallel arrangement.

Generator field control circuitry 104 includes a microprocessor 118, excitation strength potentiometer 119, and train drag/speed potentiometer 120. Microprocessor 118 controls the field coil 128 of dual auxiliary generator/main generator 107 through a pulse width modulation (PWM) driver 121. As discussed further below, generator field control circuitry 104, allows students to vary the excitation current to generator field coil 128 using excitation strength potentiometer 119 for both auxiliary generator and main generator modes of operation.

In the illustrated embodiment, blind motors 105 include blind motor 1 123a, which is mechanically coupled to traction motor 1 116a, and blind motor 2 123b, which is mechanically coupled to traction motor 1 116b. (Motors 123a and 123b are "blind" to the extent they are not be seen by the students under normal circumstances). Microprocessor 118 controls the fields blind motors 123a-123b through PWM driver 122 and switch gear 124a-124b switch gear 124a-125b also allows blind motors 123a-123b to operate in power/motoring and dynamic braking modes.

In the power/motoring mode blind motors 123a-123b are connected as generators to traction motors 116a-116b, with power supply 3 (PS3) 127 providing the generator excitation current under the control of microprocessor 118. In this case, blind motors 123a-123b load traction motors 116a-116b to simulate the drag on a locomotive from an actual train, with the amount of loading set by selecting either a coal train 125 or intermodal train 126 electrical load through switch contacts 128a-128b and the setting of train speed/drag potentiometer 120 to vary conditions such as changes in grade.

In the dynamic brake mode, blind motors 123a-123b are connected as motors to PS3 127 and spin traction motors 116a-116b. In this case, the speed of the motors blind motors 123a-123b is controlled by the position of train drag/speed potentiometer 120 and the resulting PWM signal applied for to the blind motor field windings. The electrical output from traction motors 116a-116b is dissipated by braking resistors 117.

Traction motors 116a-116b and blind motors 123a-123b advantageously allow students to study generator and motor operating characteristics, learn how locomotive high voltage circuits operate in series and parallel modes, and learn the importance of monitoring generator voltage, amperage and field current. Prior to simulator 100, these capabilities were not available in a simulation system.

Figure 2:
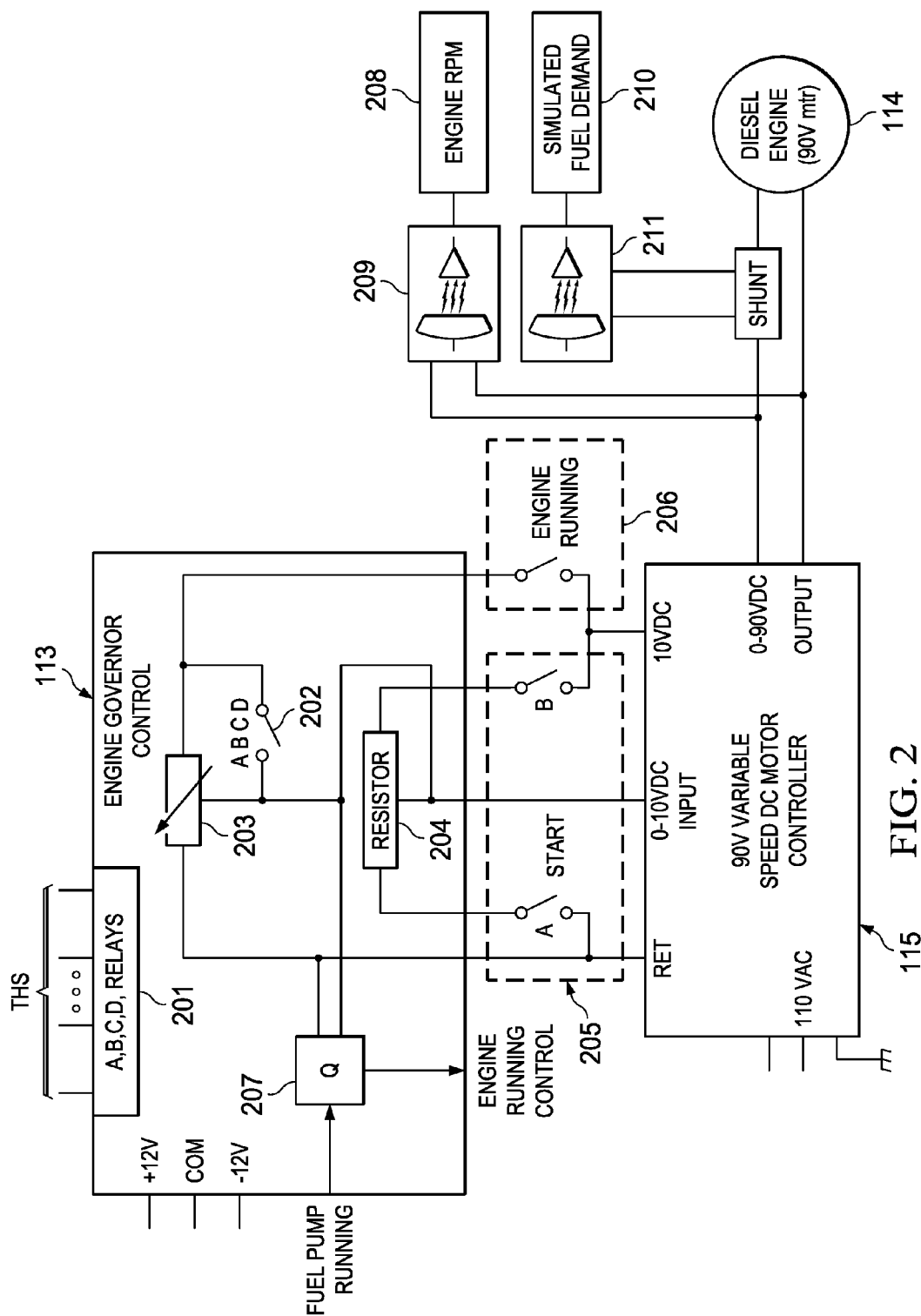
FIG. 2 is block diagram emphasizing the diesel engine speed control emulation subsystem of the simulator system FIG. 1.

FIG. 2 shows the interrelationship between emulated diesel engine (DC motor) 114, variable speed motor controller 115, and engine governor control circuitry 113 in further detail. Generally, engine governor control circuitry 113 and variable speed motor controller 115 cause DC motor 114 operate as an actual locomotive diesel engine would in response to actual locomotive low voltage control circuits.

In particular, in order for DC motor 114 to spin, there must be a start request from a start switch and a starting circuit must be applying power to an emulated starter motor (i.e., the coil of simulator starting [SST] contactor 205 must be energized and its A and B contacts closed). As with an actual locomotive, the emulated starter motor must crank for greater than 3.9 seconds before DC motor 114 will continue to run (i.e., the coil of engine running relay (ERUN) 206 energized and its contact closed).

An actual diesel engine requires fuel to run, therefore simulator 100 includes circuitry that emulates fuel pump operations. ERUN relay 206 is supplied through control circuitry 207 (described in detail below), which emulates fuel pump motor operations. If the emulated fuel pump motor is not energized, the Revolutions Per Minute (RPM) of DC motor 114 falls to 0, as indicated on display 208, which communicates with variable speed motor controller 115 through isolation circuitry 209. If the emulated fuel pump runs, but then quits running, the RPM of DC motor 114 falls to 0 after a 15 second time delay.

Once the DC motor 114 and the emulated fuel pump motor are running, engine governor control circuitry 113 enables the output of PS2 112 (FIG. 1), which represents the auxiliary generator output.

As discussed further below, a standard locomotive throttle handle switch (THS) is emulated by a set of throttle setting toggle switches, which control a set of relays 201 (i.e., the A, B, C, and D relays) and four throttle circuits (AV, BV, CV, & DV) shown generally at 202 in FIG. 2. The setting of the simulated THS determines the RPM of DC motor 114.

During starting, the 0-10 v control input to motor speed controller 115 is set by potentiometer 204 to a predetermined value (e.g., approximately 4.2 v). After a successful start, the voltage at the 0-10 v input to motor speed controller 115 is controlled by the setting of the AV, BV, CV, and DV throttle circuits and the toggle switches emulating the locomotive THS.

In the illustrated embodiment, if no speed input signals are provided through the throttle setting switches, engine governor control circuitry 113 signals variable speed DC motor controller 115 to operate 90 V DC motor 114 at 20 volts, which represents the Idle & Notch 1 speed of 1 RPM. On the other hand, if only the DV throttle circuit is energized, then engine governor control circuitry 113 opens the ERUN relay 206, which sends 0 volts to variable speed DC motor controller 115 and the rotation of DC motor 114 falls to 0 RPM (i.e., engine shut down).

Other inputs through the throttle setting switches emulating change the RPM of DC motor 114 by changing the 0-10

V input voltage to variable speed DC motor controller 115, which simulates the governor valve settings and notches of an actual locomotive. In the illustrated embodiment, the energized valves represent: AV=Notch 2 RPM; CV=Notch 3 RPM; AV & CV=Notch 4 RPM; BV, CV & DV=Notch 5 RPM; AV, BV, CV, & DV=Notch 6 RPM; BV & CV=Notch 7 RPM; and AV, BV & CV=Notch 8 RPM.

Current meter 210 monitors the amperage being provided to DC motor 114, which represents the simulated fuel demand of an actual diesel engine. In the illustrated embodiment, current meter 210 which operates at lower power, is isolated from the higher voltage/current path to DC motor 114 by an isolation circuit 211.

Figure 3:
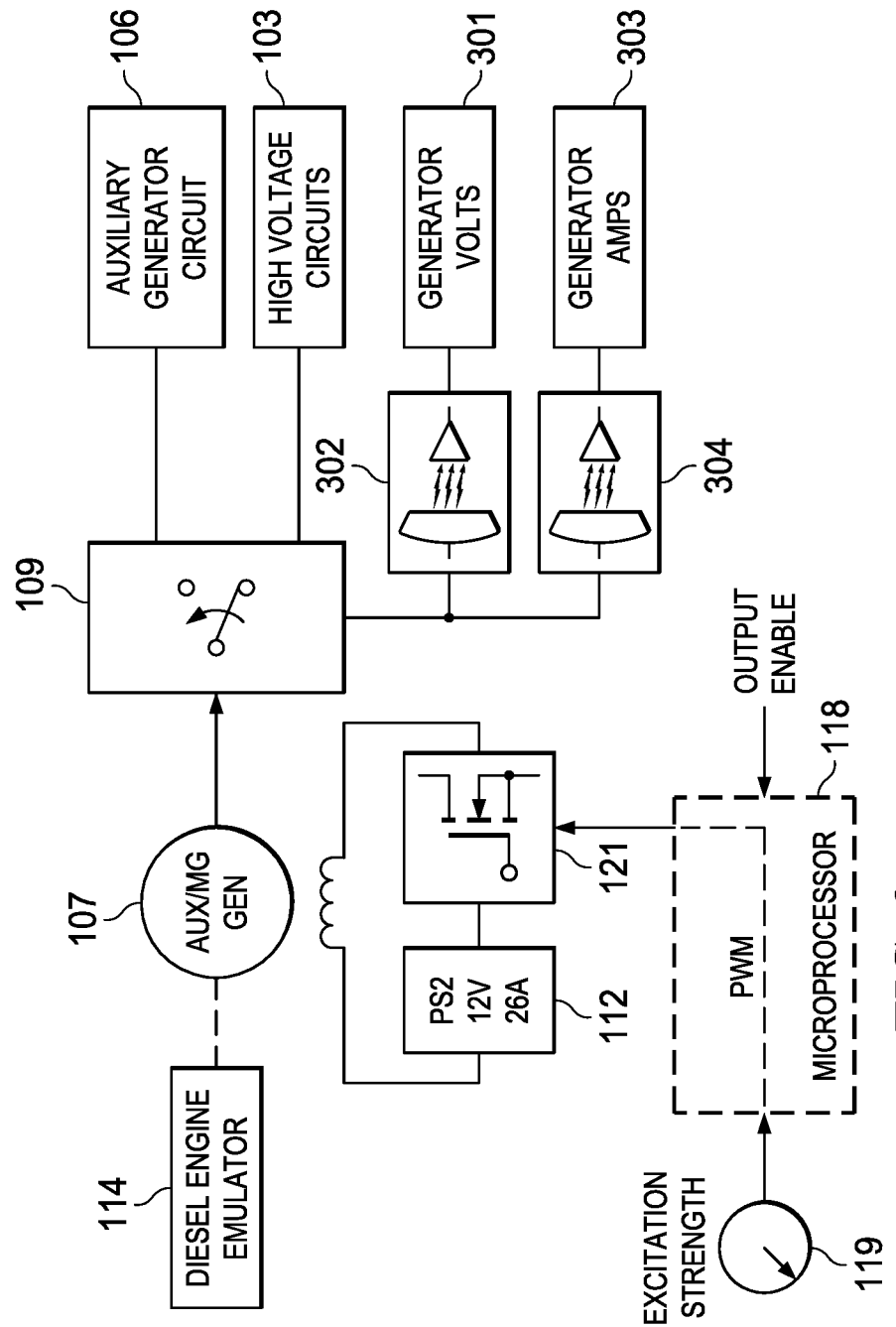
FIG. 3 is a block diagram emphasizing the dual auxiliary/main generator emulation subsystem of the simulator system of FIG. 1.

FIG. 3 illustrates the dual auxiliary generator/main generator emulation subsystem in further detail. In the preferred embodiment, a dual-purpose auxiliary/main generator 107 is mechanically coupled to diesel engine emulator DC motor 114. Depending on the state of AG/MG switch 109, either a voltage regulated self-excited generator auxiliary generator or a voltage, current, and power limited separately excited main generator can be demonstrated. A generator voltmeter circuit 301, coupled to auxiliary/main generator 107 through isolation circuitry 302, and a generator ammeter circuit 303, coupled to auxiliary/main generator 107 through isolator circuitry 304, allow students to monitor the generator output voltage and current under varying conditions.

Generally, operations powered by the auxiliary generator in a typical locomotive are powered by PS2 112 (FIG. 1), as described below in conjunction with the electrical schematic diagrams. In addition, self-excited generator/voltage regulator simulation circuitry 106 (FIG. 1), includes switches for demonstrating how residual magnetism starts the output of an actual self-excited generator, as well as switches allowing an instructor to create faults for the student to troubleshoot.

When AG/MG switch 109 is in the AG (auxiliary generator) position, the output of auxiliary/main generator 107 is loaded with a potentiometer, which simulates the charging current to the locomotive batteries. The field current to field winding 128 (FIG. 1), of auxiliary/main generator 107 in the auxiliary generator mode is provided by PS2 112 to emulate a self-excited generator. This field current is controlled by PWM driver 121 and microprocessor 118 such that voltage regulator operation may be demonstrated by student control of excitation strength potentiometer 119. (Given that simulator 100 does not have an actual AG generator but a power supply instead, circuitry is provided for demonstrating why a reverse current diode is installed in all charging circuits.) In addition, voltage regulator response may demonstrated by changing the RPM of auxiliary/main generator 107 by setting the throttle setting switches and changing the RPM of DC motor 114.

When AG/MG switch 109 is in the MG (main generator) position, auxiliary/main generator 107 is connected as a locomotive main generator, and powers emulated traction motors 116a and 116b. If simulator 100 is calling for power either in the motoring or dynamic brake modes, the student can control the output of auxiliary/main generator 107 using excitation potentiometer 119. In either the auxiliary generator mode and or the main generator mode, the student may view the generator output voltage and amperage out of the generator using meters 301 and 303.

Figure 4:
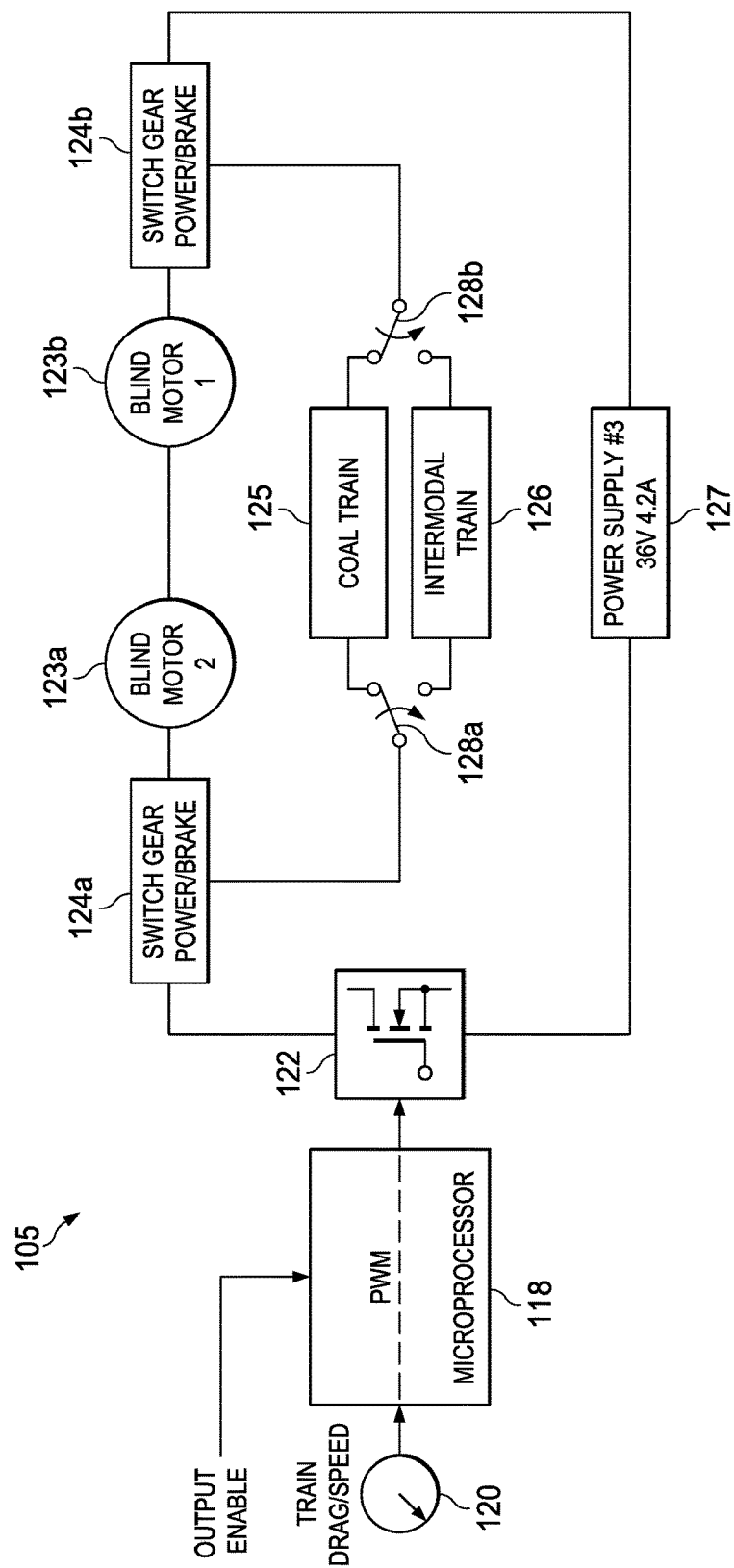
FIG. 4 is a block diagram emphasizing the blind motor subsystem of the simulator system of FIG. 1.

FIG. 4 illustrates the circuitry associated with blind motors 123a-123b in further detail. Operation of these circuits in the preferred embodiment of simulator 100 is also discussed in detail in conjunction with FIG. 23. Generally, during simulated monitoring, blind motors 123a-123b load traction motors 116a-116b and during dynamic braking, drive traction motors 116a-116b.

In the following discussion of the electrical schematic diagrams of FIGS. 5-23, the primary switch settings and voltages are set out in the tables provided in the Appendix. Generally, Table 1 gives the settings for the toggle switches emulating the locomotive THS, along with the corresponding control voltages provided to motor speed controller 115 and DC motor 114. Table 2 shows the settings for the primary switches, relays, and contactors under various simulated locomotive operating conditions. Table 3 illustrates the settings and terminal connections for the test switch (TS) under various simulated locomotive operating conditions. Tables 4 and 5 do the same for fuel prime/engine start (FP/ES) switch and the isolation switch (IS) respectively. The switch positions and corresponding locomotive speed notches for the emulated THS are also shown in Table 6, along with the contacts making the electrical connections. Table 7 shows the positions of the front and rear headline control switches. Finally, Table shows the positions of the remote headlights switch (RHS).

Figure 5A:
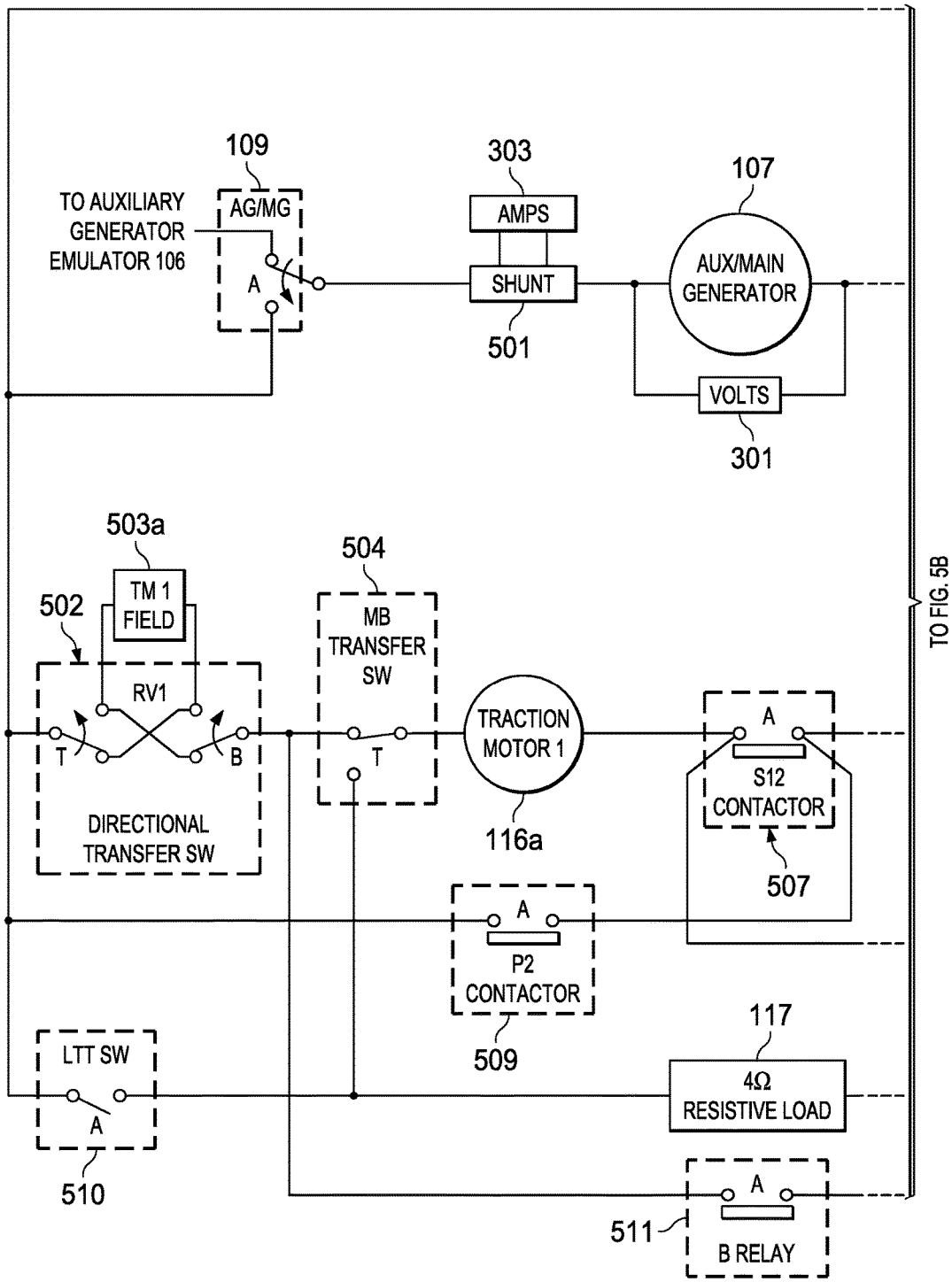
FIGS. 5A and 5B are electrical schematic diagrams of the traction motor (high voltage) emulation subsystem of the simulator system of FIG. 1.
Figure 5B:
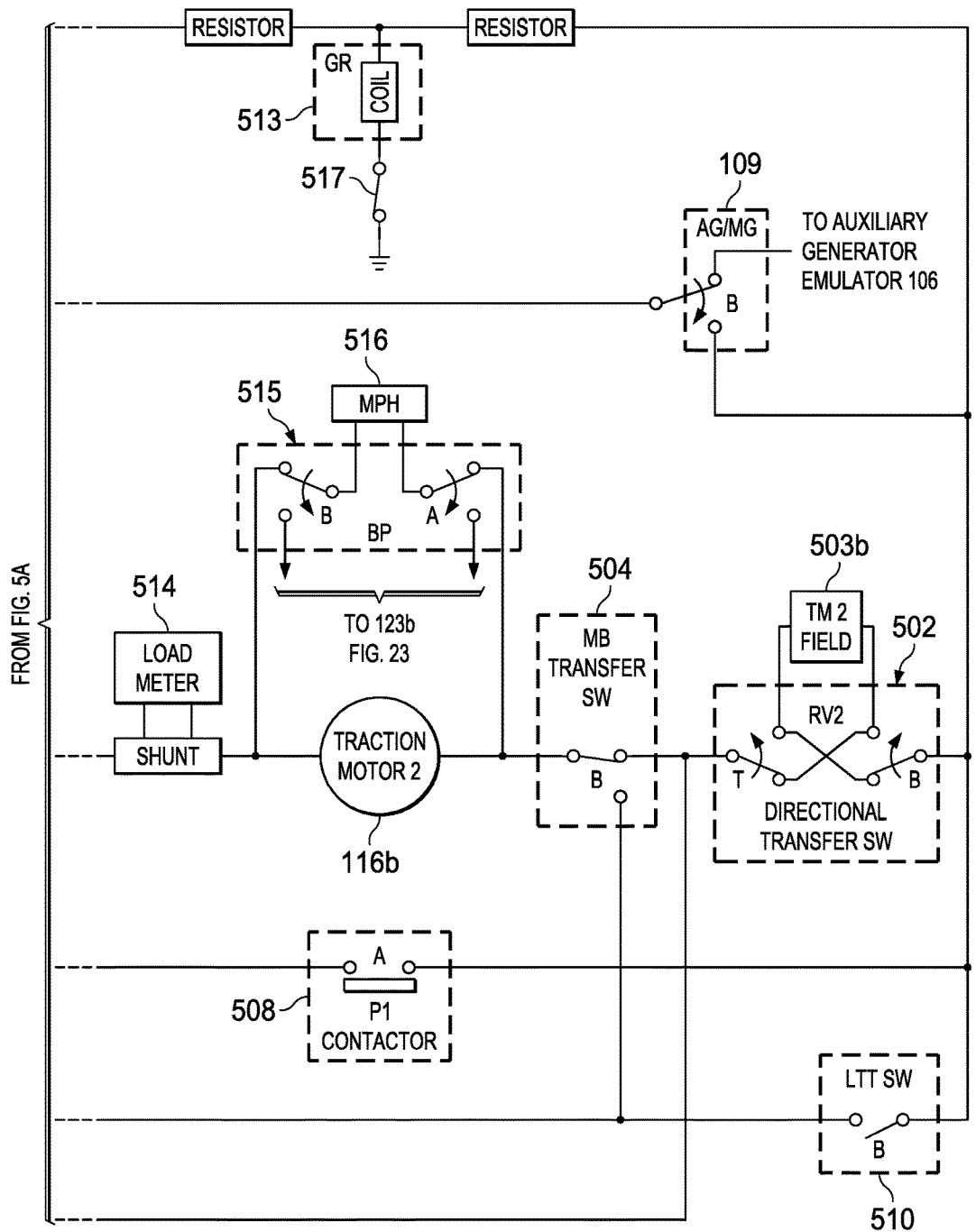

FIGS. 5A and 5B are electrical schematic diagrams of emulated traction motor control subsystem 103 (i.e., the emulated high voltage circuits) in further detail. When the A and B contacts of AG/MG control switch 109 are set in the main generator (MG) mode, dual-purpose generator 107 drives emulated traction motors 116a and 116b.

A shunt 501 allows for monitoring of the current output from emulated main generator 107 with ammeter 303. Reverser control is simulated by motor-actuated multiple-contact directional transfer switch 502, which includes reverser control contacts RV1 502a, which control the direction of current flow through the field 503a of traction motor 1 116a, and reverser control contacts (RV2) 502b, which control the direction of current flow through the field 503b of traction motor 2 116b.

Motoring/braking is controlled by motor-actuated multiple-contact motor/braking (MB) control transfer switch 504, which includes MB contacts B and T for selectively coupling traction motors 116a and 116b to the RV1 and RV2 contacts of reverser transfer switch 502 in the motoring mode and resistive load (emulated braking grid resistors) 117 in the dynamic braking mode. (A preferred structure of directional control transfer switch 502 and motor/braking control transfer switch 504 is shown in FIG. 23A).

In FIGS. 5A and 5B, the RV1 and RV2 directional control transfer switch 502 are shown in the forward mode and the B and T contacts motor/braking control transfer switch 504 is shown in the motoring mode.

The A contacts of S12 contactor 507 are closed during series operation of emulated traction motors 116a-116b and open during parallel operations of emulated traction motors 116a-116b. Conversely, the A contacts of parallel power contactors (P1, P2) 508 and 509 are closed during parallel traction motor operations and open during series traction motor operations.

In the dynamic braking mode, the A contacts of braking (B) relay 511 are closed. Load test transfer switch 510, which includes A and B contacts, supports load testing through braking resistors 117. While AG/MG switch 109 is in the MG position, and switch 517 is closed, the coil of ground relay (GR) 513 can be energized if a jumper is placed on the positive or negative input of the main generator. Switch 517 is used to isolate a simulated ground. (The high voltage circuits of a locomotive are isolated from ground and the GR relay monitors current leakage and halts high voltage circuit operations if the leakage current exceeds a predetermined level.)

The current load on auxiliary/main generator 107 presented by traction motors 116a-116b is monitored by a shunt and load (current) meter 514. The speed of a DC motor is proportionate to the applied voltage, so variations in emulated traction motor speed in response to changes in the control inputs may be monitored by the student, for both the motoring and dynamic braking modes, depending on the setting of switch 515. In the motoring mode, switch 515 is set to measure the voltage across traction motor 2 116b, while in the dynamic braking mode, switch 515 is set to measure the voltage across blind motor 2 123b (see FIG. 23).

Figure 6:
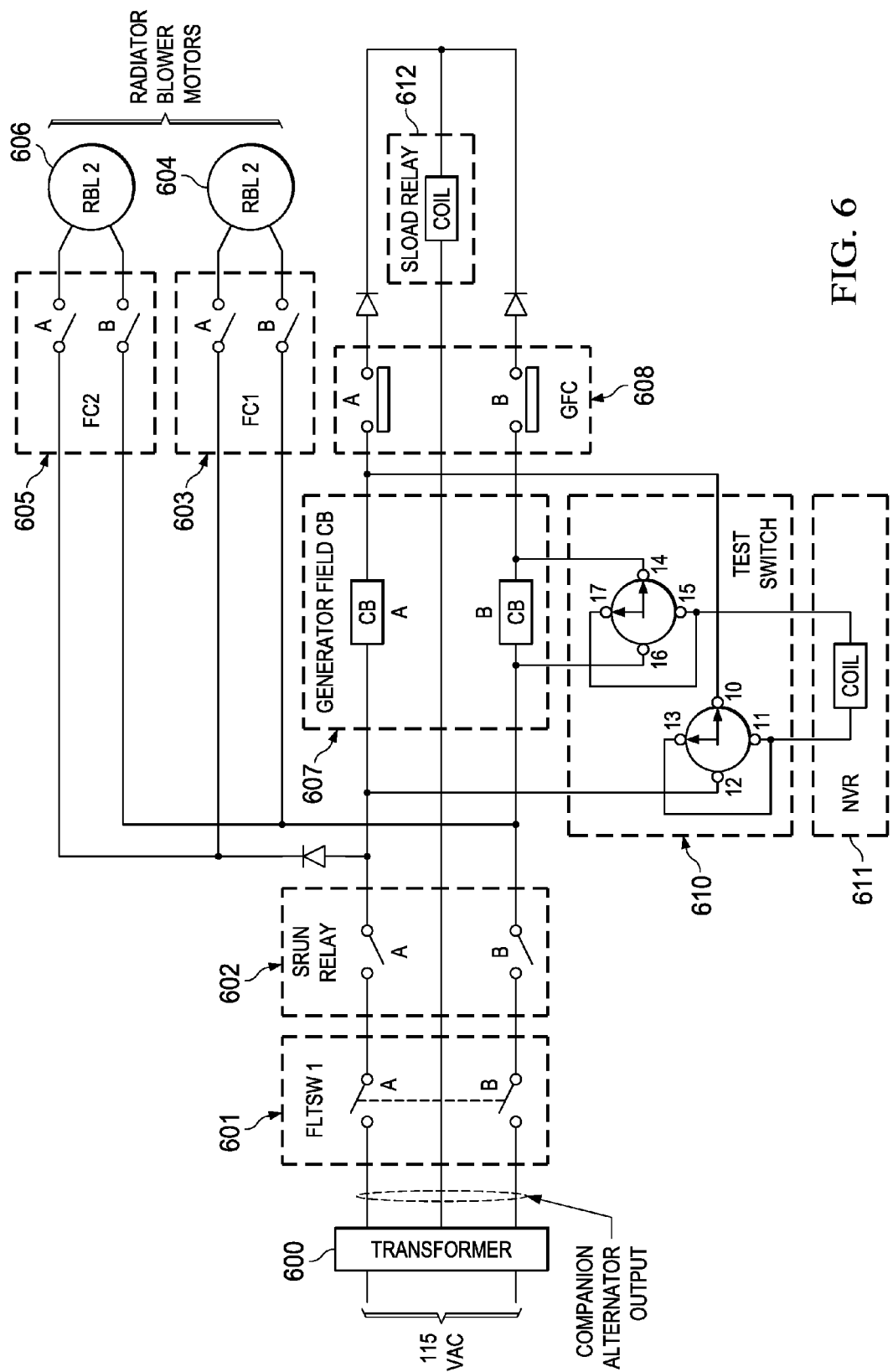
FIG. 6 is an electrical schematic diagram of the companion alternator output, radiator blower motor and main generator field emulation subsystems of the simulator system of FIG. 1.

FIG. 6 illustrates the emulated companion alternator output, radiator blower motor subsystem and parts of the auxiliary/main generator 107 field control subsystem Conventional 115 V AC power is supplied to a tapped transformer 600, which emulates the output of the companion alternator, and a fault switch 601 (FLTSW 1). Generally, simulator 100 includes a set of fault switches (FLTSW), including fault switch 601, which allow an instructor to introduce faults into the simulated locomotive electrical system for troubleshooting exercises by the students.

The AC power is also controlled by simulator running (SRUN) relay 602. In the illustrated embodiment, the locomotive radiator blower motors (RBL 1 and RBL 2) are emulated by a pair of 12 VDC fans 604 and 606, with DC power pulsed to emulate AC power. (A diode provides the rough 12V DC power for running fans 604 and 606, although this power will appear as AC power to a voltmeter.) Fan control relay (FC1) 603 controls the power to emulated radiator blower motor 604 and fan control relay (FC2) 605 controls the power to emulated radiator blower motor 606. The coils of fan control relays 603 and 603 are energized by the cooling control emulation circuitry shown in FIGS. 17A and 17B, discussed below.

The generator field circuit breakers 607 and generator field contactor (GFC) 608 contacts A and B are also shown in FIG. 6. The energizing of the SLOAD relay coil 612 through GFC 608 closes a normally open SLOAD relay, which signals microprocessor 118 to apply the generator field current to generator field coil 128. (The coil of GFC is controlled by the generator field control circuitry discussed below in conjunction with FIG. 20).

Multiple-deck rotary test switch 610 allows for circuit checking and controls the voltage to the coil of no voltage relay (NVR) 611 (the contacts of NVR relay 611 are discussed below in conjunction with FIG. 13). NVR 611 senses for a failure in AC power, which an actual locomotive powers such critical subsystems as the traction motor blowers and the indicator blowers. In particular, terminals 14 and 17 of deck A and 10 and 13 of deck B are connected in the normal mode, terminals 14 and 15 of deck A and 10 and 11 of deck B are connected in the load test mode, and terminals 16 and 17 of deck A and 12 and 13 of deck B are connected in the circuit test mode.

Figure 7:
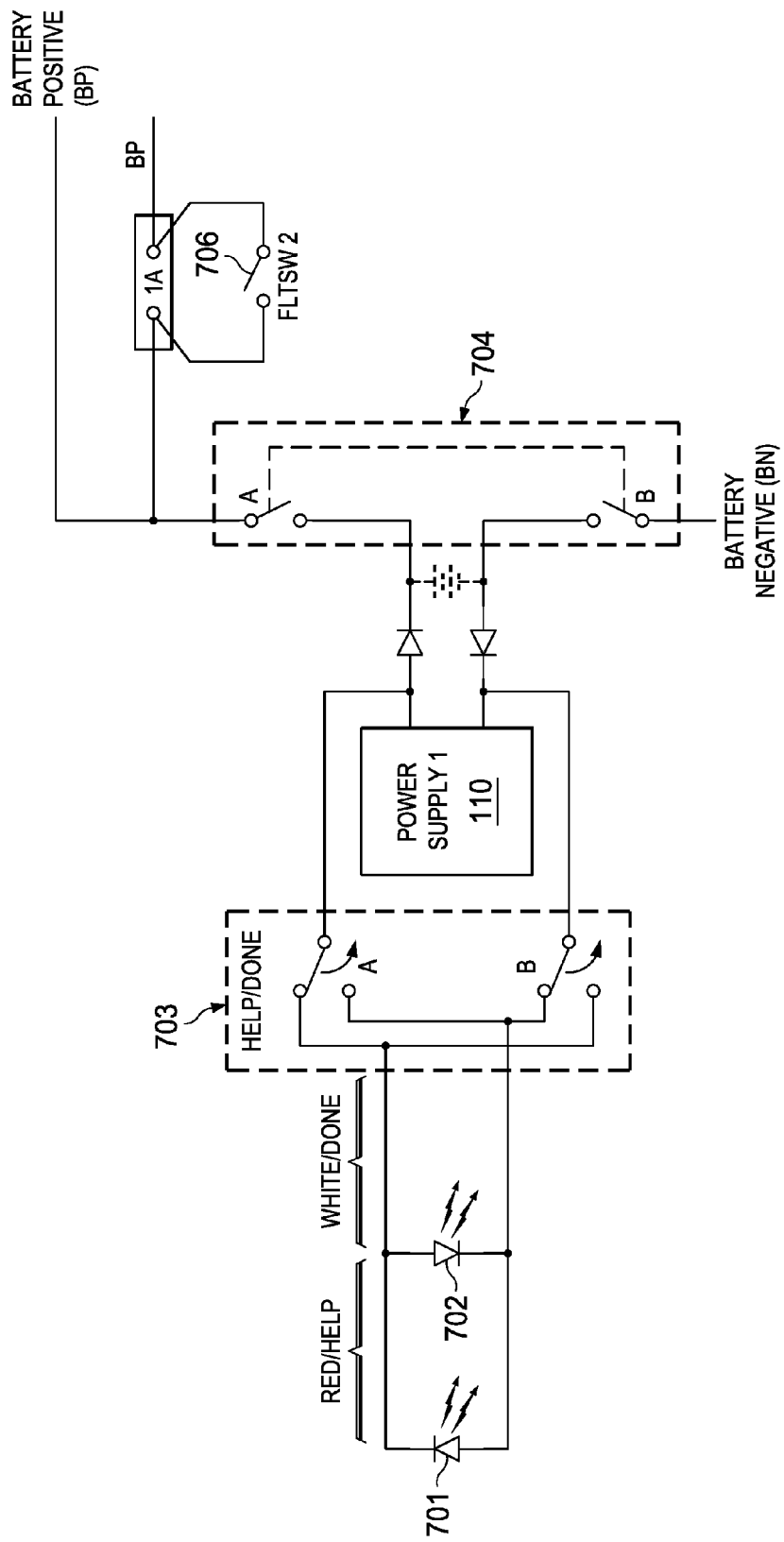
FIG. 7 is an electrical schematic diagram of the battery emulation subsystem of the simulator system of FIG. 1.

FIG. 7 shows power supply 1 (PS1) 110, which emulates the locomotive battery system, in further detail. PS1 110 supplies low voltage systems 111 when emulated diesel engine 114 is not running. When emulated diesel engine 114 is running, and the engine running relay (ERR) coil is energized, PS2 112, which emulates the locomotive auxiliary generator, supplies low voltage systems 112, as discussed further below in conjunction with FIG. 12. The output voltage of PS1 110 is set below the output voltage of PS2 and diodes, represented by the diode at the output of PS1 110 in FIGURE 1and by the pair of back-to-back diodes at the output of PS1 110 in FIG. 7, provide extra protection when PS1 110 and PS2 112 are operating in parallel. (In an actual locomotive, the current is reversed such that the auxiliary generator charges the batteries).

Throughout the following discussion of the electrical schematic diagrams, BP (battery positive) represents the power supply rail, which is sourced by the positive terminal of PS1 when emulated diesel engine 114 is not running and by V+2 positive terminal of PS2 112 when emulated diesel engine 114 is running. BN (battery negative) represents a power supply return to power supplies PS1 110 and PS2 112.

For the locomotive battery system emulated by PS1 110, as shown in FIG. 7, the power flow through the positive and negative terminals of power supply 1 is controlled by the A and B contacts of battery switch 704. A double pole, double throw (on-off-on) switch 703 allows a student to indicate that an exercise on simulator system 100 has been done, through a white LED 702, or that assistance from an instructor is needed, through a red LED 701. Fault switch 706 (FLTSW 2) allows power to the emulated starter motor control circuitry of FIG. 8 to be selectively disrupted for troubleshooting training.

In a typical EMD locomotive, two 32 V starter motors operate from the locomotive battery to crank the diesel engine during the diesel engine start sequence. Normally, the fuel prime/engine start (FP/ES) switch, discussed below in conjunction with FIG. 11, must be held in the start position for at least 3.9 seconds to allow the diesel engine to sufficiently crank.

Figure 8:
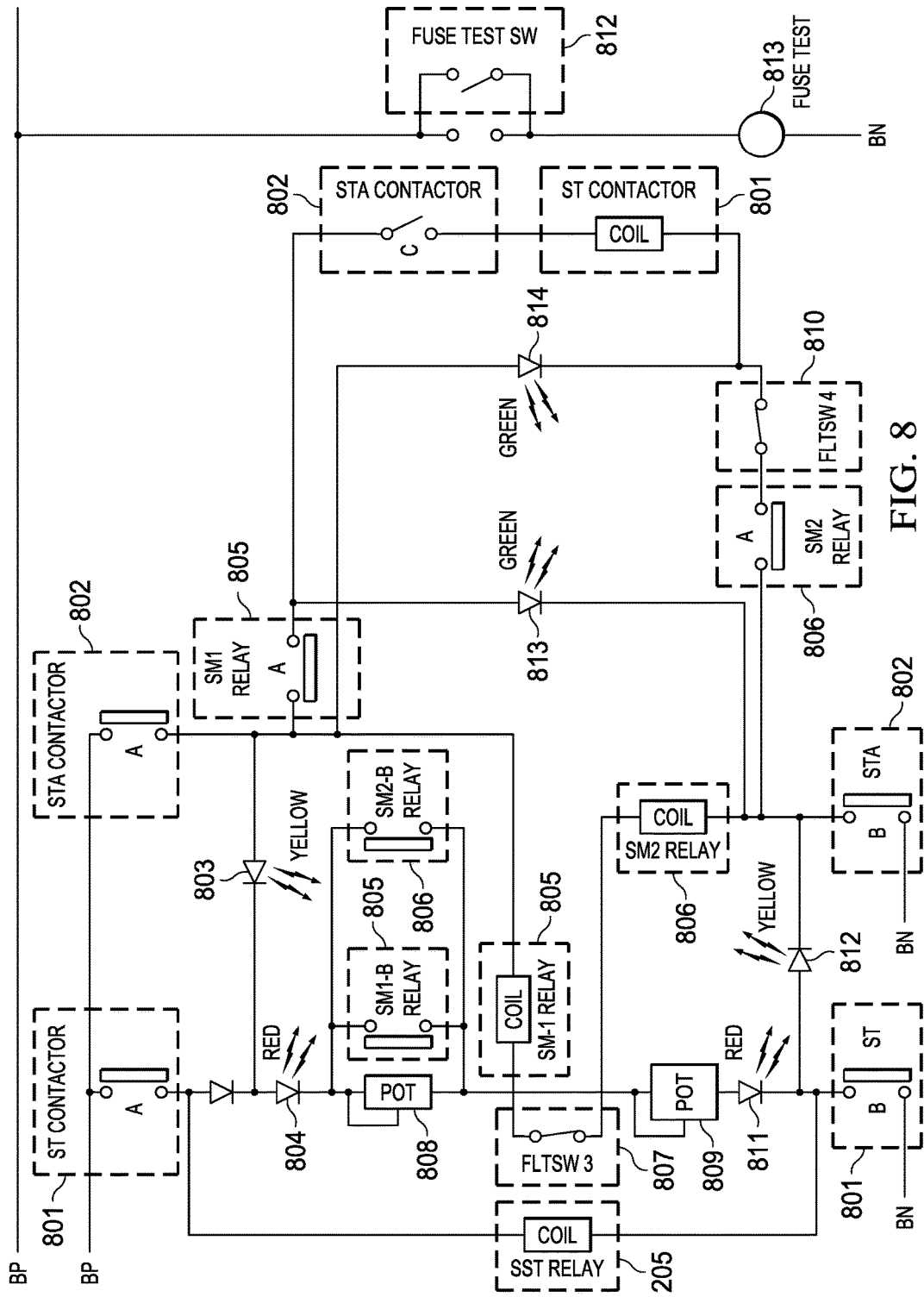
FIG. 8 is an electrical schematic diagram of the starter motor control emulation subsystem of the simulator system of FIG. 1.

In simulator 100, the starter motor control circuitry of FIG. 8 operates in conjunction with engine governor control circuitry 113 to provide the voltages to the 10V, 0-10V, and return inputs to motor speed controller 115 during a simulated start sequence. More specifically, the circuitry shown in FIG. 8 controls the coil to SST contactor 205. As discussed further in conjunction with FIG. 23, power is switched to the current paths of SST 205 engine running delay relay (ERDR) 1201, which introduces a delay of approximately 4 seconds into the simulated start sequence to emulate the required crank time of an actual diesel engine. The coil of ERDR 1201 is controlled by the current paths of engine running relay (ERUN) 206 and fuel pump running relay (FPPR) 2218, such that there must be battery power applied and the simulated fuel pump motor must be running.

The emulated starter motor control circuitry shown in FIG. 8 includes the A and B contacts and the coil of starting (ST) contactor 801, the A, B, and C contacts starting auxiliary (STA) contactor 802, the A and B contacts and 6 volt coil of starter motor relay 1 (SM1) 805 and the A and B contacts and 6 volt coil of starter motor relay 2 (SM2) 805. Yellow LEDs 803 and 812 represent the pick-up coils in the starter motor solenoids, green LEDs 813 and 814 represent starter motor 1 and 2 engagement, and the red LEDs 804 and 811 represent current flowing through starter motors 1 and 2. Potentiometers 808 and 809 emulate the current through the starter motors.

Generally, STA contactor 802 controls the interlock sequence, which closes the contacts of ST contactor 801. When the contacts of ST contactor 801 are closed, the coil of SST contactor 206 is energized.

In a simulated starting sequence, the fuel prime/engine start (FP/ES) switch, with the fuel pump motor running, energizes the coil of STA contactor 802 (FIG. 13) and the A, B, and C contacts of STA contactor 802 close, which in turn energizes parallel paths, one path including yellow LED's 803, 812 and red LED's 804, 811, the other path including the coils of starter motor relay 1 805 and starter motor relay 2 806. The A contacts of starter motor relays 805 and 806 close and the B contacts of starter motor relays 805 and 806 open. The green LEDs 813, 814 illuminate indicating both motors have the starter motor gears engaged fully with the engine flywheel. Current flows through the coil of ST contactor 801 and the C contacts of STA contactor 802, such that the A and B contacts of ST contactor 801 close.

When the contacts of ST contactor 801 close, the coil of SST relay 205 is energized simulating engagement of the starter motor. SST relay 205 contacts A and B now will cause electronic governor control 113 to control the output of the motor speed controller 115 to produce rotation of the diesel engine emulator 114. Red LEDs 804 and 811 indicate that current is flowing through ST contactor 801 and STA contactor 802.

Green LEDs 813 and 814 indicate that the emulated starter motor is engaged. The instructor can introduce faults into the emulated starter motor control system using fault switch 3 (FLTSW 3) 807 and fault switch 4 (FLTSW 4) 810.

FIG. 8 also depicts fuse test switch 812 and fuse test lamp 813.

Figure 9:
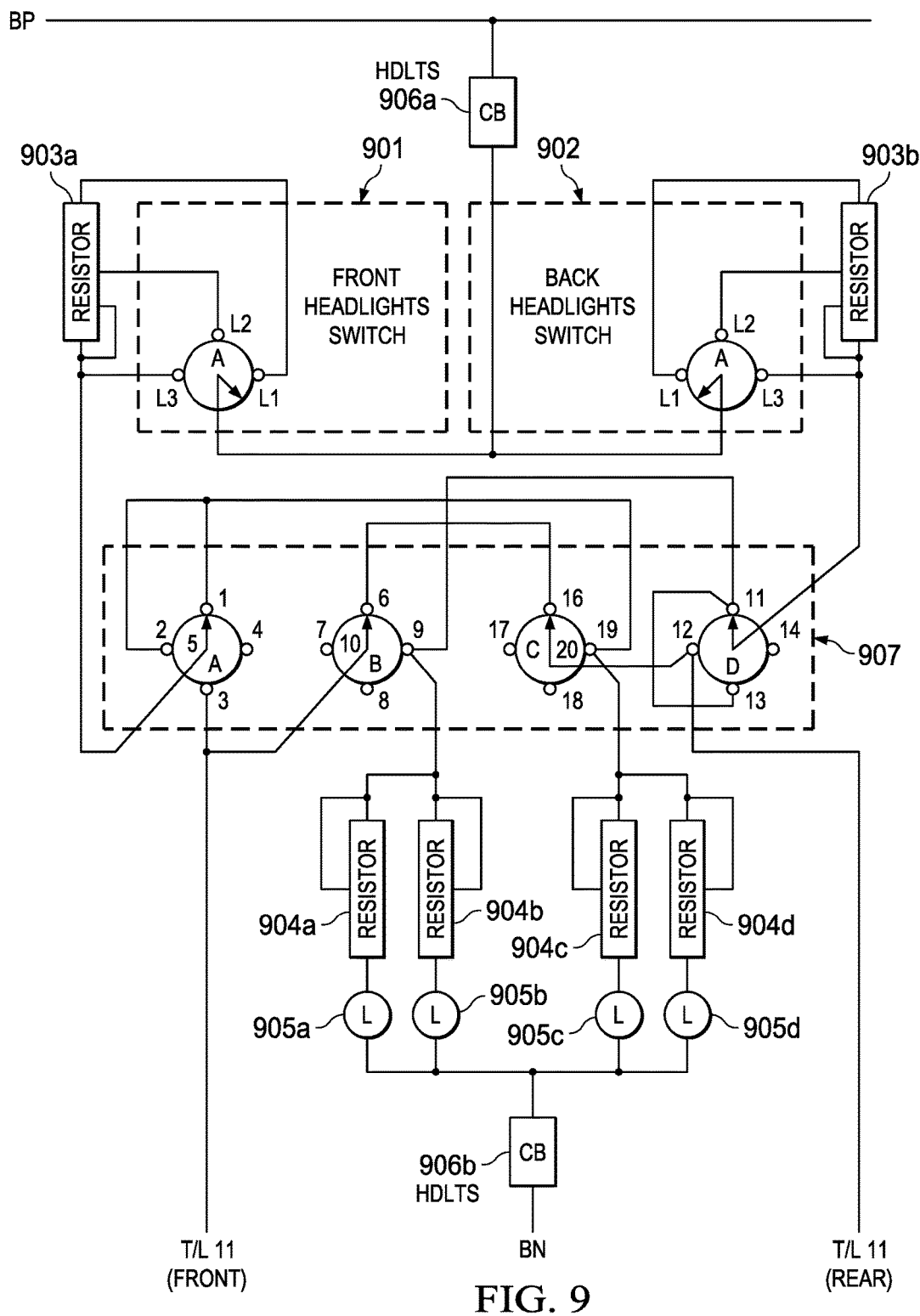
FIG. 9 is an electrical schematic diagram of the headlight control emulation subsystem of the simulator system of FIG. 1.

Representative circuitry for emulating the locomotive headline control subsystem is shown in FIG. 9. A four-position, single layer rotary switch 901 and associated tapped resistor 903a simulate the off, dim (L1), medium (L2), and bright (L3) front headlight locomotive settings. Similarly, a four-position, single layer switch 902 and associated tapped resistor 903b simulate the off, dim (L1), medium (L2), and bright (L3) back headlight locomotive settings. Front headlights switch 901 and rear headlights switch 902 are shown in the off position in FIG. 9.

A four-gang rotary switch 907 emulates the locomotive remote headlight switch (RHS), which includes positions for single unit/intermediate unit, controlling with unit coupled at hood end, controlling with unit coupled at cab end, and controlled by another unit coupled to either end. RHS switch 907 is shown in the single unit/intermediate unit position. Table 8 provides the preferred settings for RHS 907.

The locomotive rear headlights are emulated by tapped resistors 904a-904b and lamps 905a-905b. Tapped resistors 904c-904d and lamps 904c-904d emulate the locomotive front headlights. FIG. 9 also depicts headlight circuit breakers 906a and 906b. Lines T/L 11 (front) and T/L 11 (rear) emulate the locomotive front and rear train line 11 connections.

When RHS 907 is set for single or intermediate unit operations, front headlights switch 901 controls front lamps 905c-905d, the back headlights switch 902 controls rear lamps 905a-905b, and neither front or rear T/L 11 is energized. When RHS 907 is set for controlling with unit coupled at hood end, front headlights switch 901 controls front lamps 905c-905d, rear headlights switch 902 controls the voltage on T/L rear, and rear lamps 905a-905b are inactive. When RHS 907 is set for controlling with unit coupled at cab end, front headlights switch 901 controls the voltage on T/L front, rear headlights switch controls rear lamps 905a-905b, and T/L 11 rear and front lamps 905c-905d are inactive. In the controlled by another unit coupled to either end, RHS 907 disables front headlights switch 901 and rear headlights switch 902, such that rear lamps 905a-905b can be controlled by the voltage on T/L 11 front and front lamps 905c-905d can be controlled by the voltage on T/L 11 rear.

Figure 10:
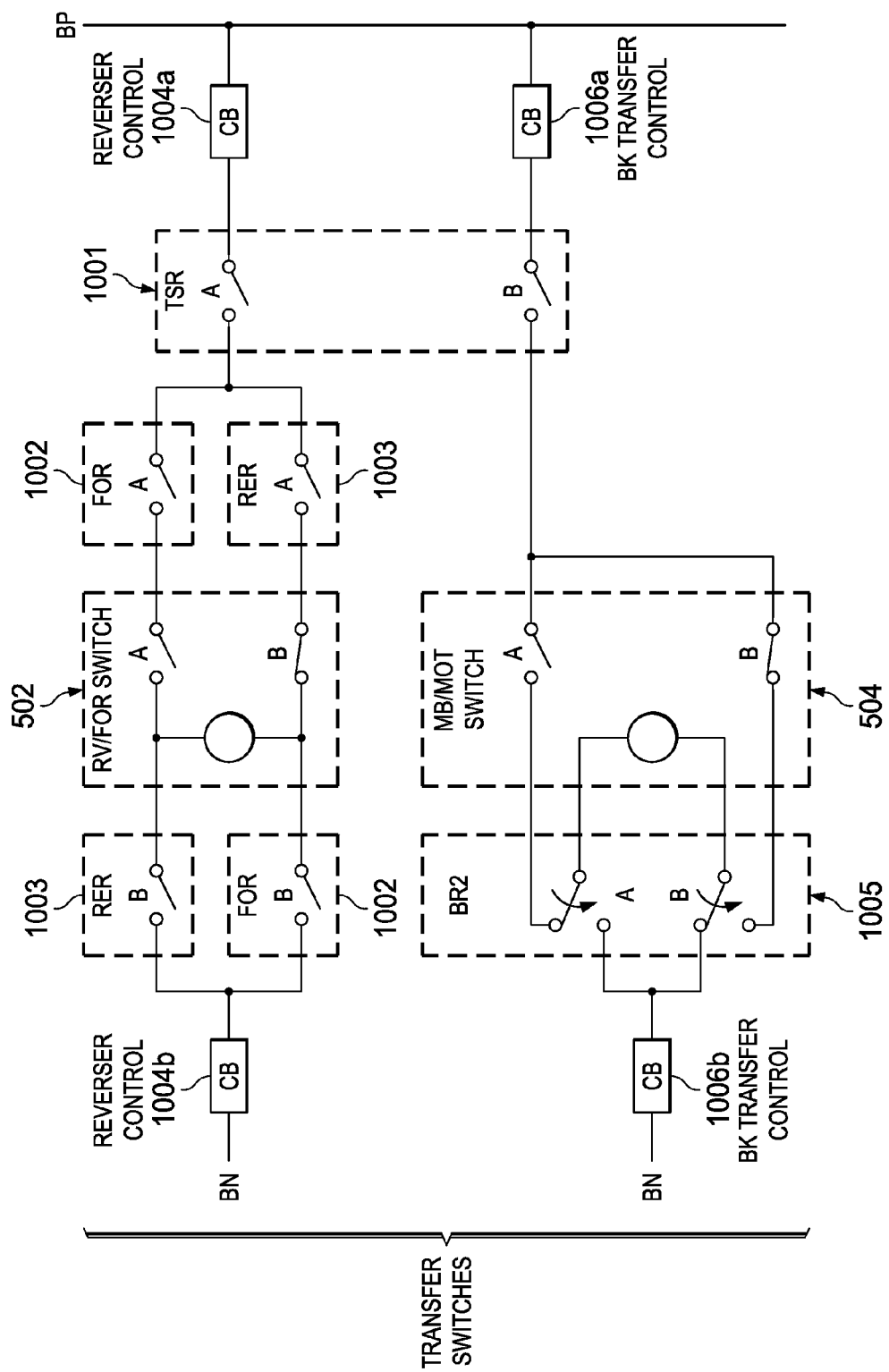
FIG. 10 is an electrical schematic diagram of the transfer switches emulation subsystem of the system of FIG. 1.

FIG. 10 illustrates the emulated locomotive transfer switches, including the A and B limit contacts of the reverser directional control transfer switch 502 (FIGS. 5A and 5B). The reverser has three positions: forward, reverse, and centered, and is shown in the forward position in FIG. 10. FIG. 10 also shows the A and B limit contacts of motoring/braking transfer switch 504. Motoring/braking transfer switch 504 has three positions; motoring, braking, and centered, and is shown in FIG. 10 in the motoring position.

Figure 15A:
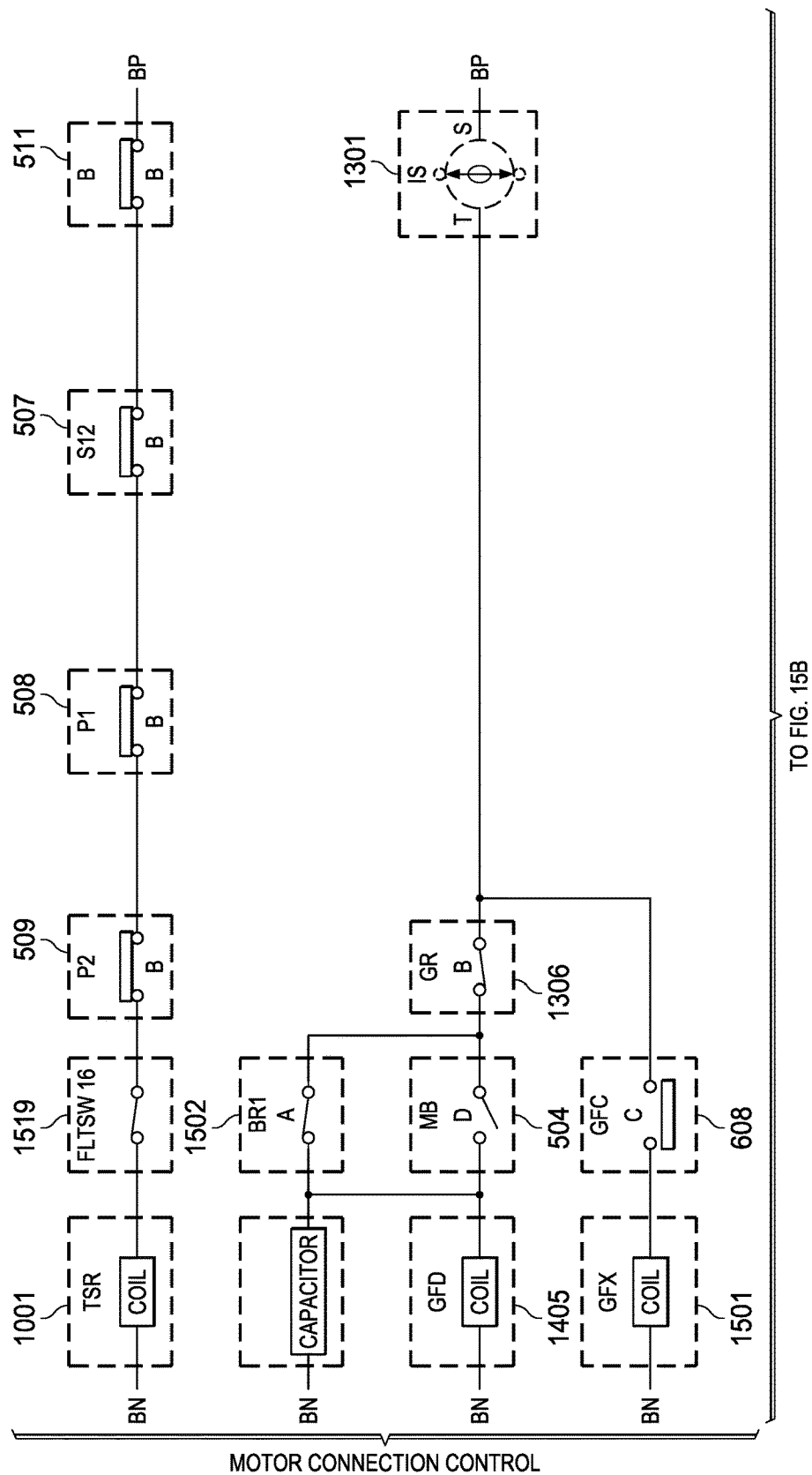
FIGS. 15A-15C are electrical schematic diagrams of the motor connection control emulation subsystem of the system of FIG. 1.

The directional control signal path includes the A contacts of transfer switch relay (TSR) 1001 and the A and B contacts of forward direction relay (FOR) 1002 and reverse direction relay (RER) 1003. (The coil for TSR 1001 is shown in FIG. 15A, and is active when the locomotive is not in motion, with the ends of the P1, P2, S12, and B contractors of FIG. 15A de-energized). The coils for FOR 1002 and RER 1003 are shown in directional control circuitry of FIG. 21, which are discussed further below). Also shown are reverser control circuit breakers 1004a and 1004b. Directional control switch 502 allows the simulated locomotive to be switched so long as the simulated locomotive is neither calling for power nor braking.

The motoring/braking control signal path includes the B contacts of TSR 1001, and the A and B contacts of brake relay 2 (BR 2) 1005 and brake transfer control circuit breakers 1006a and 1006b. (The coil for BR 2 1005 is shown in the dynamic braking control circuitry of FIG. 22B, discussed below.) A switch between motoring and braking can only be made when the coils of the P1, P2, S12, and B contactors of FIG. 15A are de-energized and the B contact of TSR 1001 is closed.).

Figure 11:
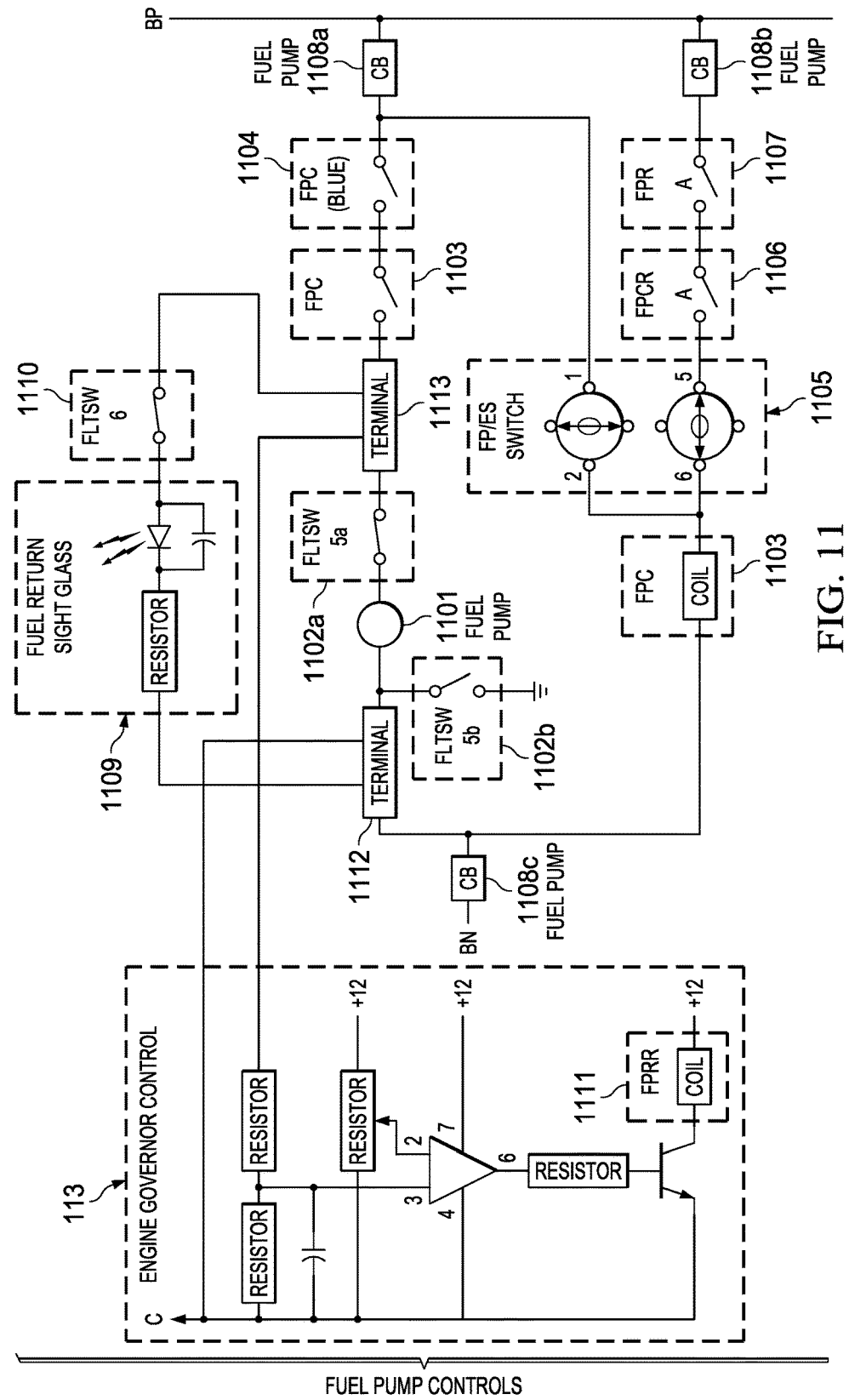
FIG. 11 is an electrical schematic diagram of the fuel pump control emulation subsystem of the simulator system of FIG. 1.

Preferred circuitry for emulating the locomotive fuel pump controls are shown in FIG. 11. In the illustrated embodiment of simulator system 100, the fuel pump 1101 is emulated with a 12 V permanent magnet motor. Fault switch 5 (FLTSW 5) 1102 allows an instructor to introduce a fault into the emulated fuel pump controls for training purposes The instructor inserts one of two fuel pump contactors (FPC) 1103 and FPC (blue) 1104 into the fuel pump control circuitry of FIG. 11 to demonstrate normal operation and operation under fault conditions. To demonstrate normal operations, the instructor inserts FPC 1103, which controls the electrical power supplied to emulated fuel pump 1101 in response to fuel pump/engine start (FP/ES) rotary switch 1105, which has engine prime, start, and off (engine running) positions.

Figure 19:
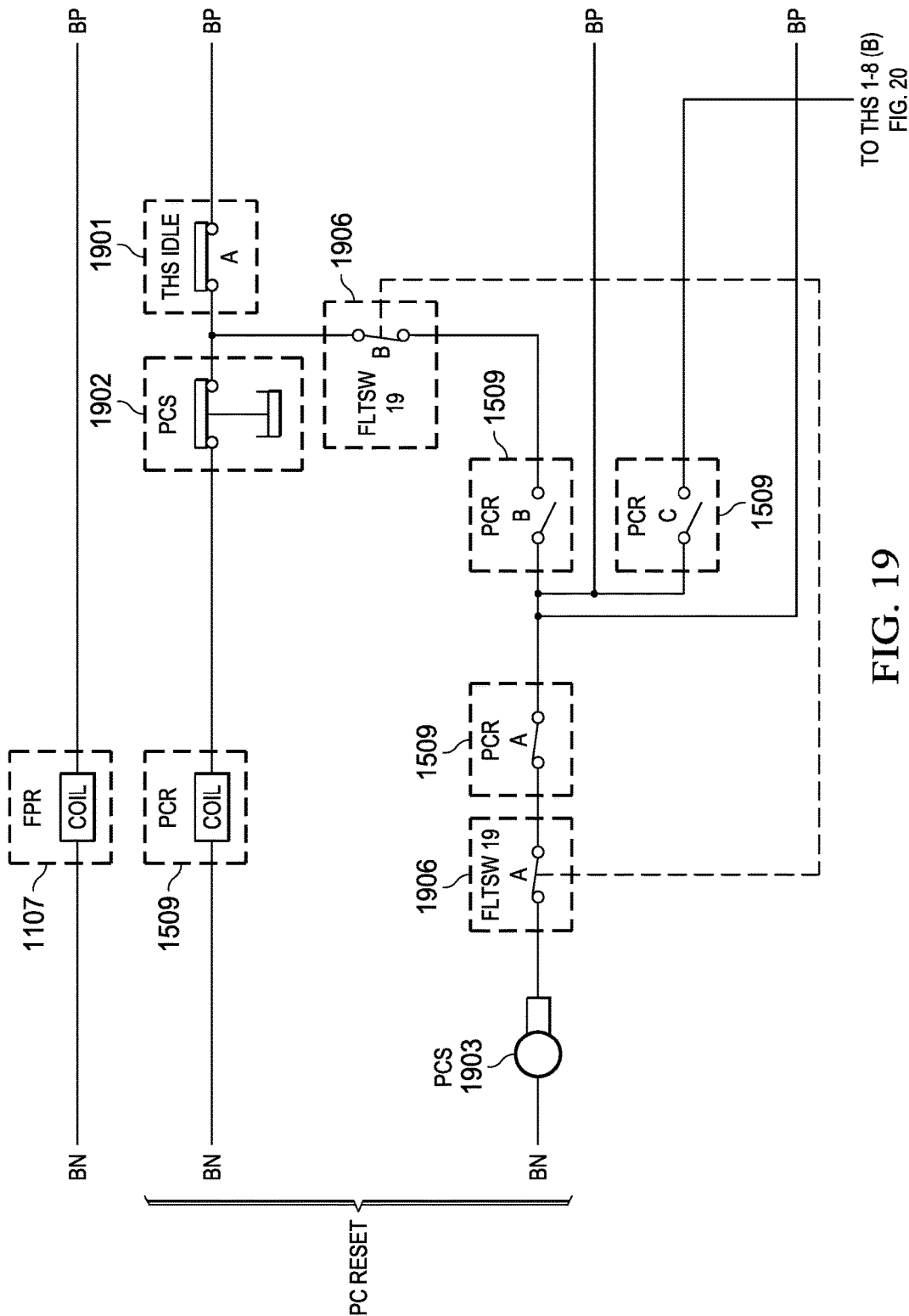
FIG. 19 is an electrical schematic diagram of the generator field control emulation subsystem of the simulator system of FIG. 1.

In FIG. 11, the FP/ES switch is shown in the off (engine running) position, with the signal path through the 1-2 terminals open and the signal path through the 5-6 terminals closed. In this case, the coil of FPC 1103 energized through the A contacts of fuel pump control relay (FPCR) 1106 and fuel pump relay (FPR) 1107. The coil of FPCR is shown in FIG. 13 and is armed by FP/ES on engine start. The coil of FPR 19 is shown in FIG. 19 and is energized when battery power available.

In the prime and start modes, the signal path between the 1-2 terminals of FP/ES switch 1105 is closed and the signal path through the 5-6 terminals is open. In this state, the coil of FPC 1103 is energized directly from the battery voltage supply rail.

Engine governor control 113 monitors the voltage applied to the emulated fuel pump motor 1101 and controls the coil of fuel pump running relay (FPRR) 1111 (i.e., DC Motor 114 will stop if the fuel pump is not running.). Emulated locomotive return sight glass 1109 is based on a resistor and an LED/capacitor and monitors electrical voltage applied to the emulated fuel pump 1101. Fault switch 6 (FLTSW 6) 1110 allows an instructor to simulate a fault with the locomotive fuel return sight glass. FIG. 11 also shows fuel pump circuit breakers 1108a-1108c.

In the illustrated embodiment, FPC (blue) 1104 has a blue base with a cut movable, which will never dose notwithstanding the state of FPC coil 1103. Consequently, when the instructor replaces FPC 1103 with FPC (blue) 104, emulated fuel pump motor 1101 does not run, no power is applied to emulated fuel return sight glass 1109, and engine governor control 113 does not energize the coil of FPRR 1111. (As discussed below in conjunction with FIG. 22C, unless the coil of FPRR 1111 is energized, DC motor 114 (FIG. 1) emulating the locomotive diesel engine will not start.)

Figure 12:
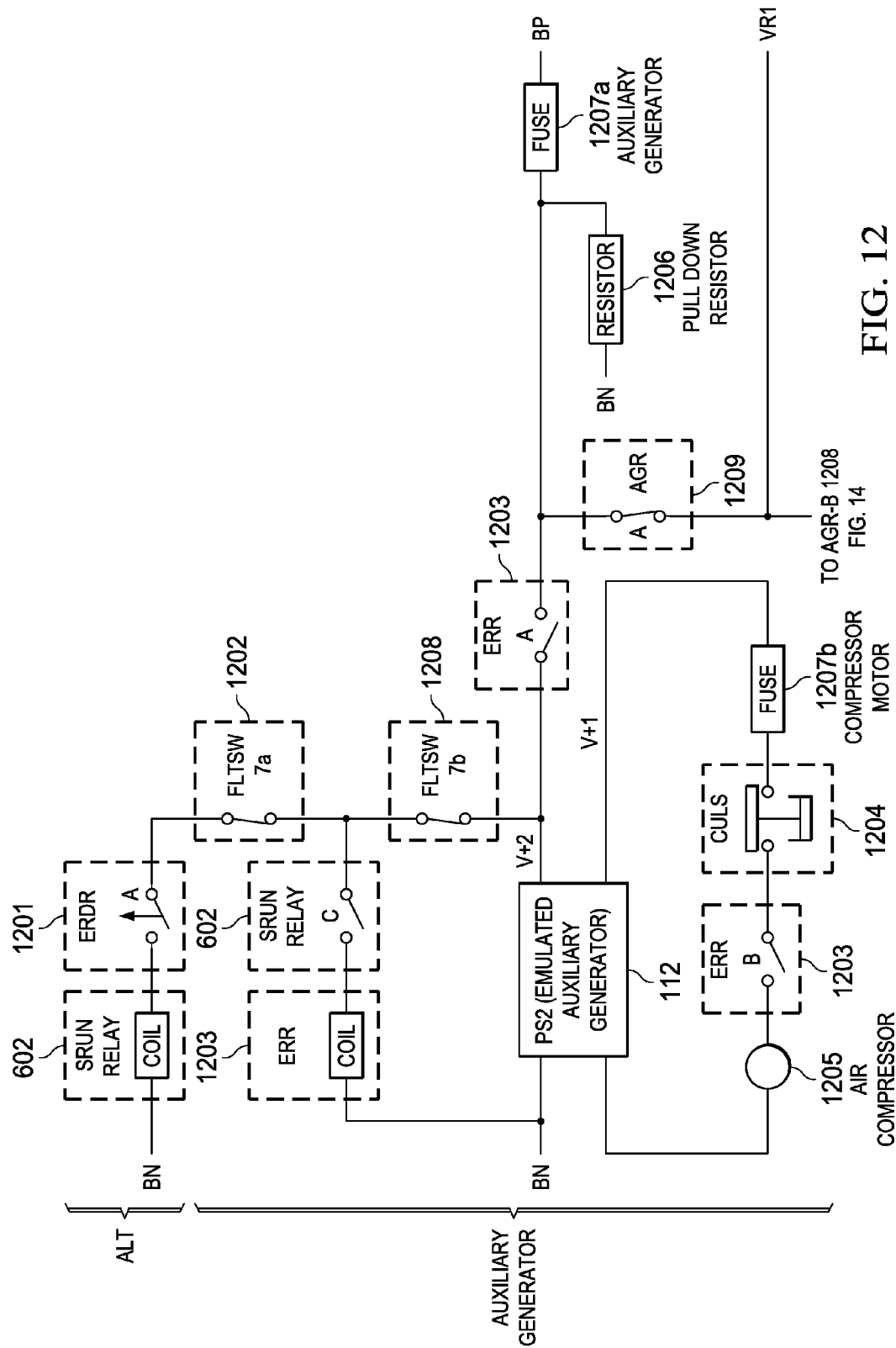
FIG. 12 is an electrical schematic diagram of the auxiliary generator, companion alternator field, and air compressor motor emulation subsystems of the simulator system of FIG. 1.
Figure 22A:
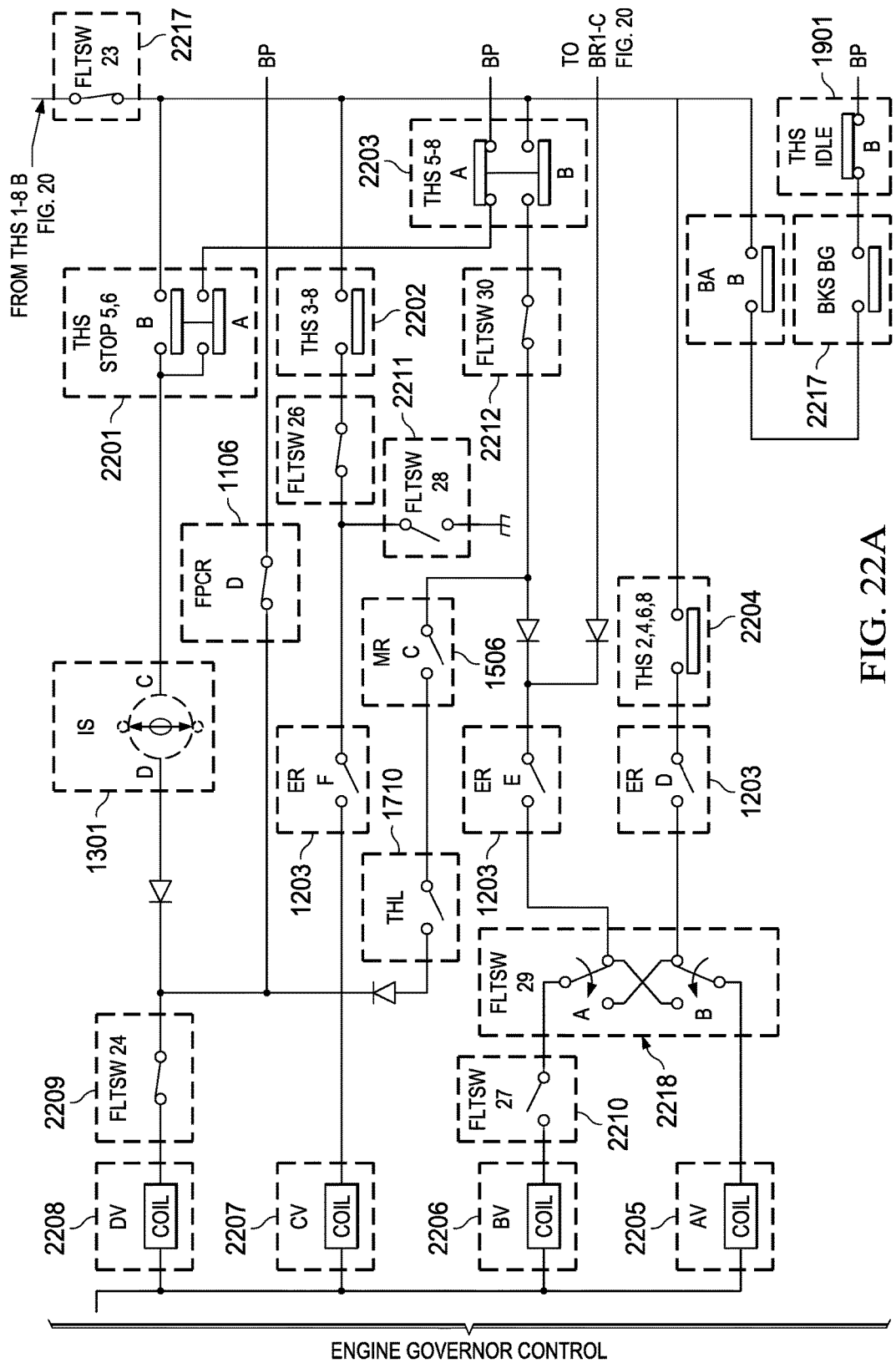
FIGS. 22A-22C are electrical schematic diagrams of the engine governor control and dynamic braking control emulation subsystems of the simulator system of FIG. 1.

FIG. 12 illustrates the preferred auxiliary generator emulation circuitry 106, which is based on power supply 2 (PS2) 112 of FIG. 1, along with emulated companion alternator circuitry 600, and the emulated compressor motor circuitry. The V+2 output of PS2 112 drives the coil of SRUN relay 602 through engine run delay relay (ERDR) 1201. (The coil of ERDR 1201 is shown in FIG. 22C and is energized only after a successful diesel engine start and FPRR 1111 indicates that the fuel pump motor is running and an approximate 4 second delay emulating the minimum actual time to start a diesel engine). In addition, the coil of engine running relay (ERR) 1203 is driven through the C contacts of SRUN relay 602 by the V+2 output of PS2 112. Fault switch 1202 (FLTSW7) allow an instructor in simulate a fault in the emulated auxiliary alternator circuitry.

On a typical locomotive, the compressor motor is always running during locomotive operations and the compressor stages are either loaded (i.e. compressing air) or unload (i.e. not compressing air.). The loading and unloading of the compressor is controlled by air pressure from the compressor control magnetic value (MVCC), discussed further below.

In simulator 100, the compressor unloader line switch (CULS) 1204 and B contacts of ERR couple the V+1 output of PS2 112 to emulated air compressor 1205. In the illustrated embodiment, emulated air compressor 1205 is a one stage compressor which emulates the typical two-stage compressor of an actual locomotive. CULS 1204 responds to air pressure from MVCC 1807 of FIG. 18. FIG. 12 also depicts auxiliary generator fuses 1207a and compressor motor fuse 1207b.

Pulldown resistor 1206, which is coupled to the V+2 output of PS2 112 through the A contacts of ERR 1203, pulls down the V+2 output to simulate an actual generator when not turning.

Figure 14:
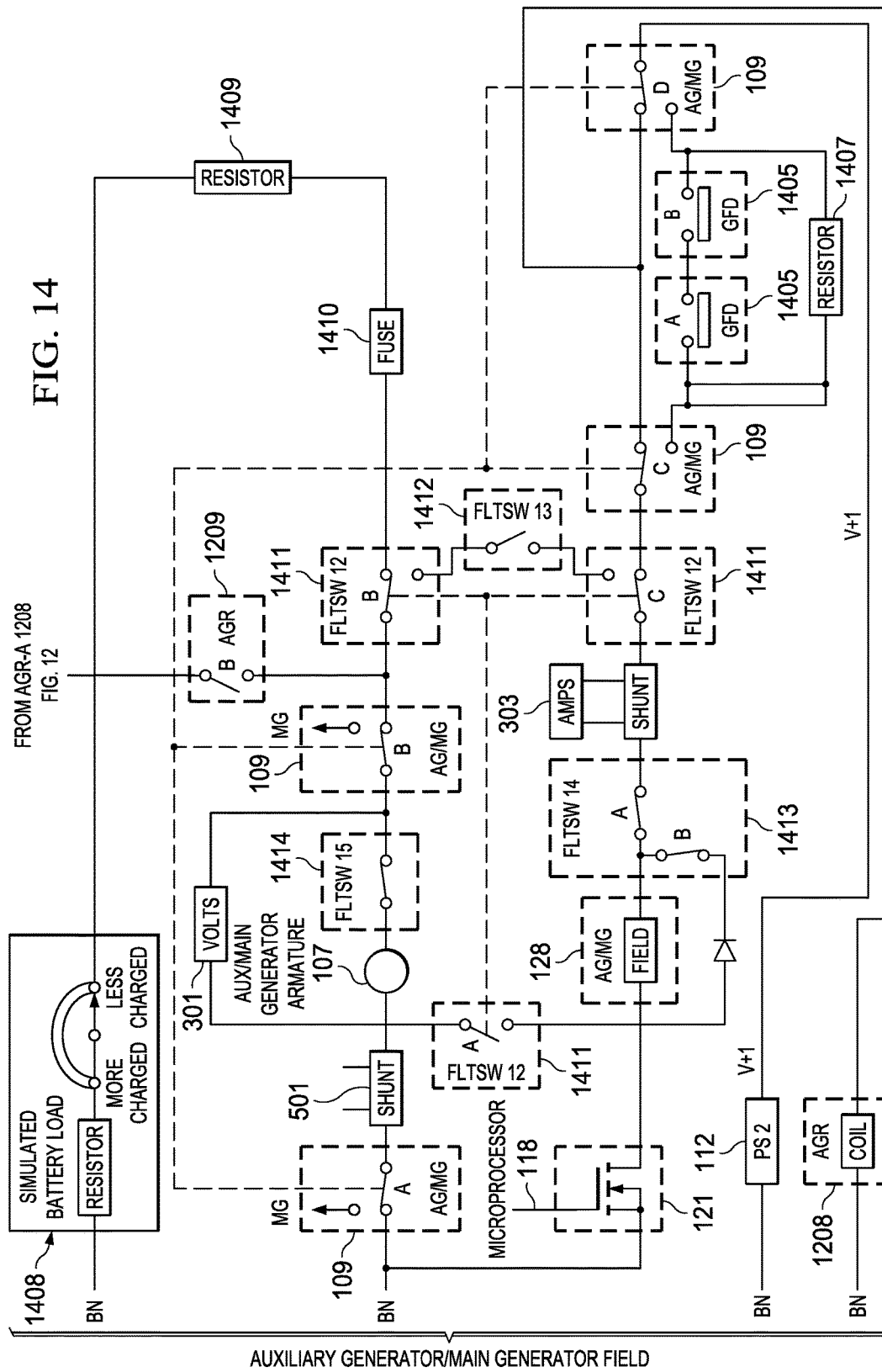
FIG. 14 is an electrical schematic diagram illustrating emulated battery loading on the dual-mode auxiliary generator/main generator, as well as emulated field control while operating in the auxiliary generator mode.

FIG. 12 also shows the A contact of auxiliary generator relay (AGR) 1208. The B contact and coil of AGR are shown in FIG. 14 and discussed further below. When Aux/Main generator 107 is operating in the main generator (MG) mode and DC motor 114 emulating the locomotive diesel engine is running, the A contact of AGR 1209 is normally closed and provides the voltage to test point VR1. Test point VR1 (see FIG. 25B) emulates the voltage regulator (VR) test point on an actual locomotive, which is used to set the voltage regulator.

Figure 13:
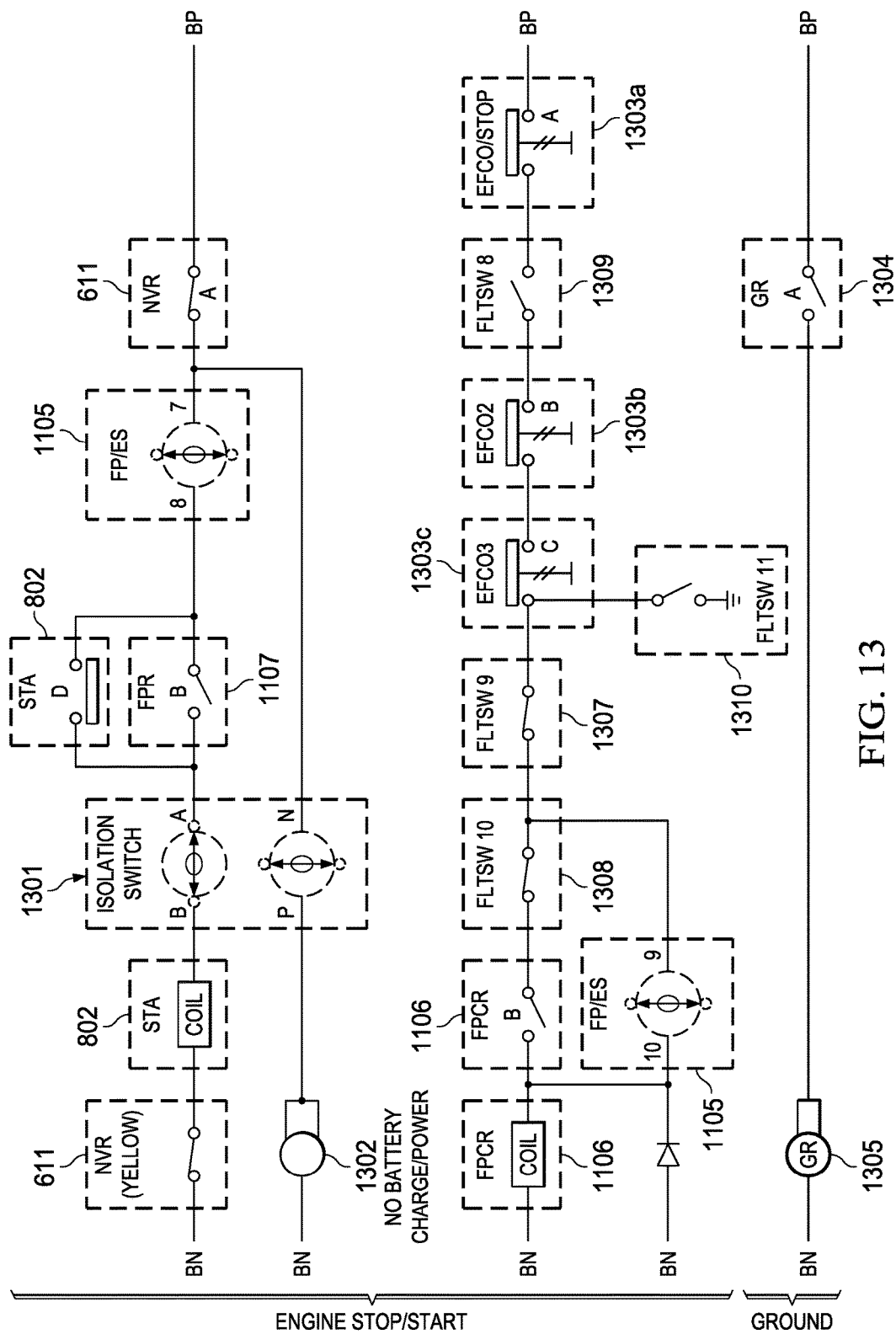
FIG. 13 is an electrical schematic diagram of the engine stop/start emulation subsystem and the ground relay warning circuit of the simulator system of FIG. 1.

Preferred emulated locomotive engine stop/start circuitry is shown in FIG. 13. The contacts of NVR 611 and NVR (yellow) 611 are closed so long as AC power is available and the NVR 611 coil of FIG. 6 is de-energized.

The engine start control circuitry also includes the paths between the A-B and N-P terminals of isolation switch 1301, the path through the D contact of STA contactor 802, the path through the B contacts of FPR 1107, and the path through the 7-8 terminals of FP/ES switch 1108.

The path through the A-B terminals of isolation switch 1301 is closed in the start mode and open during the run mode. The path through the N-P terminals of isolation switch 1301 is open during the start mode and closed during the run mode. The path through the 7-8 terminals of FP/ES switch 1105 is closed during the start mode. The B contact of fuel pump relay (FPR) 1107 is closed as long as battery power is available.

When isolation switch 1301 and FP/ES switch 1105 are set to the engine start mode, the coil of STA contactor 802 is energized, and latched by the D contract of STA 802, which initiates operations of the emulated starter motor circuit previously described in conjunction with FIG. 8.

The coil of fuel pump control relay (FPCR) 1106 is energized through the signal path including the normally-closed spring-actuated engine fuel cutoff (EFCO) switches 1303a, 1303b and 1303c, the B contacts of FPCR 1106, in the running mode. During start, the 9-10 terminals of FP/ES switch 1105 energize the coil of FPRC 1106. After start, if any one of the EFCO Switches 1303 is depressed, opened, the coil of FPCR 1106 is de-energized, which opens the A contacts of FPCR 1106 and de-energizes the coil of FPC relay 1103, shutting down emulated fuel pump 1101 and the emulated diesel engine.

FIG. 13 also depicts the A contacts of ground relay (GR) 517 and ground warning lamp 1305. (The coil for GR 517 is shown in FIG. 5). Fault switches 1307-1310 (FLTSW 8, FLTSW 9, FLTSW 10, FLTSW 11) allow an instructor to introduce simulated faults into the engine stop/start circuitry.

FIG. 14 shows the circuitry that controls the generator field coil 128 of dual-purpose auxiliary generator/main generator 107. In FIG. 14, AG/MG switch 109 is set in the AG mode, where power is supplied to generator exciter coil 128 from the V+1 input of PS2 112 as pulsed by PWM driver 121 under the control of microprocessor 118 and excitation potentiometer 119 (FIG. 1). Ammeter 303 allows students to monitor the generator field current.

In the MG mode, power passes through the A and B contacts of generator field decay (GFD) contactor 1405. In the MG mode, with the contacts of GFD 1405 open, the voltage on field winding 128 decays through resistor 1407 during dynamic braking. The coil of GFD contactor 1405 is discussed in conjunction with FIG. 15A.

A rheostat 1408, coupled through a resistor 1409 and fuse 1410, allows the loading on dual-purpose generator 107 to be increased or decreased in the AG mode, which emulates the battery charge in an actual locomotive. Fault switches 1411, 1412, 1413, and 1414 (FLTSW 12, FLTSW 13, FLTSW 14, and FLTSW 15, respectively) allow an instructor in introduce various faults into the generator field control circuitry.

Figure 15B:
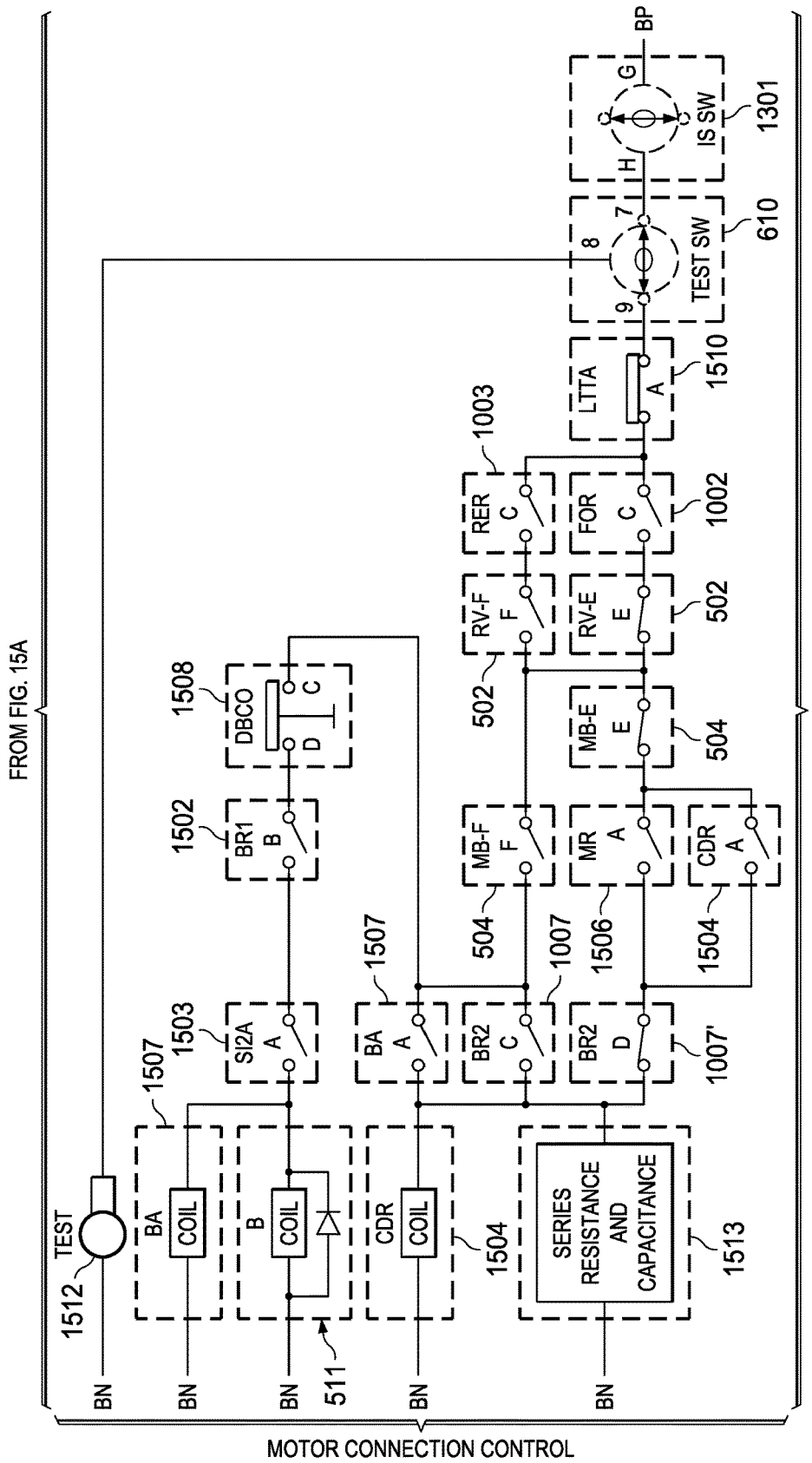
Figure 15C:
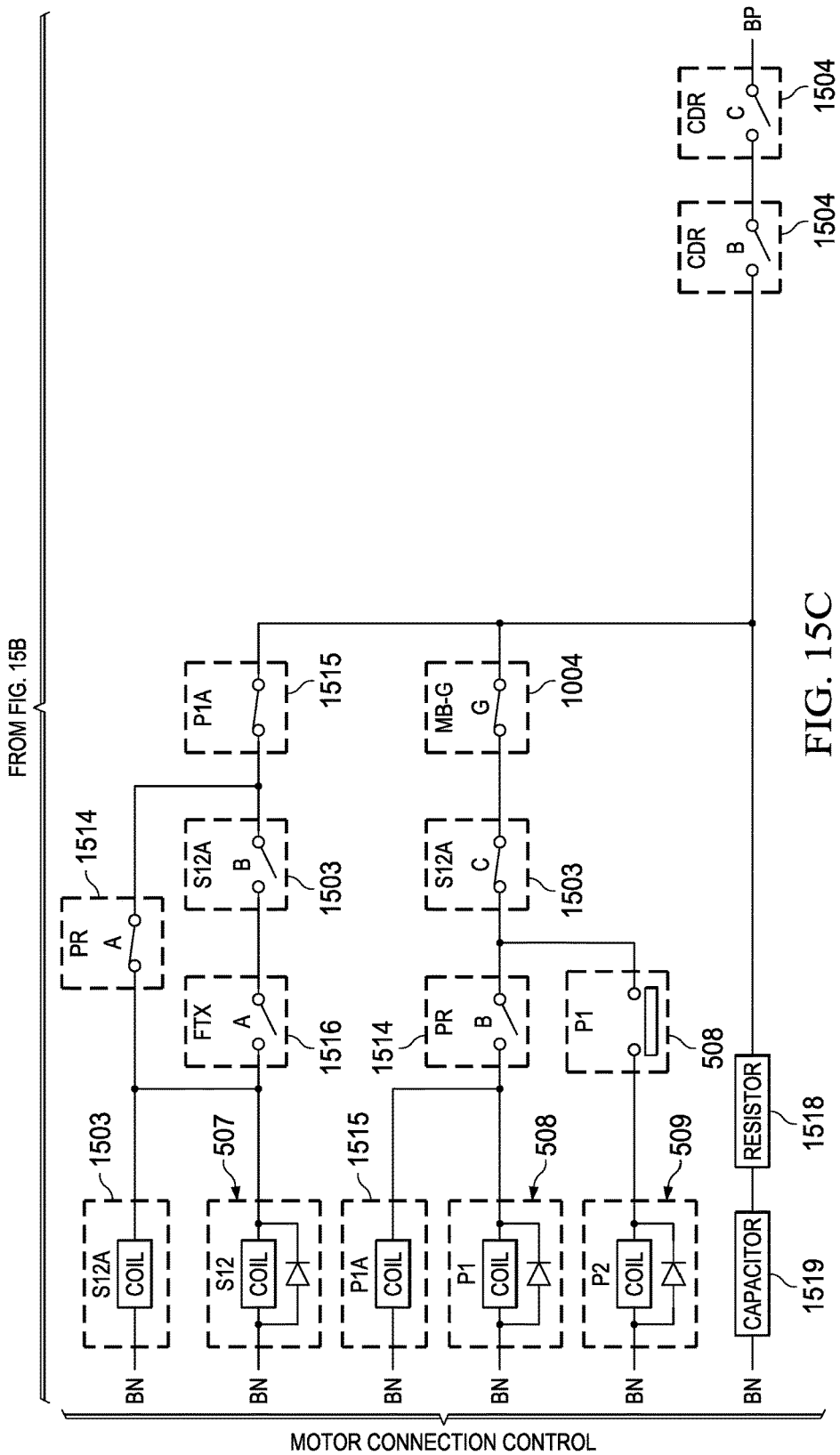

The preferred emulated motor connection controls are shown in the electrical schematic diagrams FIGS. 15A-15C. The coil of TSR 1001 (A and B contacts shown in FIG. 10), is energized when the normally closed B contact of B relay 511, the B contact of S12 contactor 507, the B contact of P1 contactor 508, and the B contacts of P2 contactor 509 all remain closed (i.e., the coils of the P1, P2, and S12 contactors and the B relay shown in FIG. 15C are de-energized—the locomotive is not in motion).

FIG. 14 shows the coil and B contact of AGR 1209. When auxiliary/main generator 107 is operating in the auxiliary generator (AG) mode, the A contact of AGR 1209 is open and the B contact is closed. The voltage generated by auxiliary/main generator 107 is presented at test point VR1, which allows students to troubleshoot faults emulating faulty battery charging.

FIG. 15A depicts the S-T contacts of isolation switch 1301, which are closed in the run mode and open in the start mode. In the run mode, the signal path is controlled by the normally-closed B contact of GR 1306 (coil shown in FIG. 5B). Brake relay 1 (BR1) 1502 (coil shown in the dynamic braking control circuitry of FIG. 22B) is closed during motoring and open during dynamic braking.

The coil of GFD contactor 1405 (A and B contacts shown in FIG. 14) is controlled by the A contact of BR1 1502 (open during braking, closed during motoring) and the D contact of MB switch 504 (open during braking, closed during motoring). (The GFD coil is energized during motoring and de-energized during dynamic braking). A capacitor sets a time constant for the energizing and de-energizing of the GFD contactor coil, which delays the opening and closing of GFD contactor 1405 by a predetermined amount of time. GFD contactor 1405 drops out if a high voltage ground is detected and slows the decay of the main generator field collapse to prevent spikes in the high voltage circuits and further damage. On an actual locomotive, the GFD coil is large and the capacitor is used for suppression.

Figure 20:
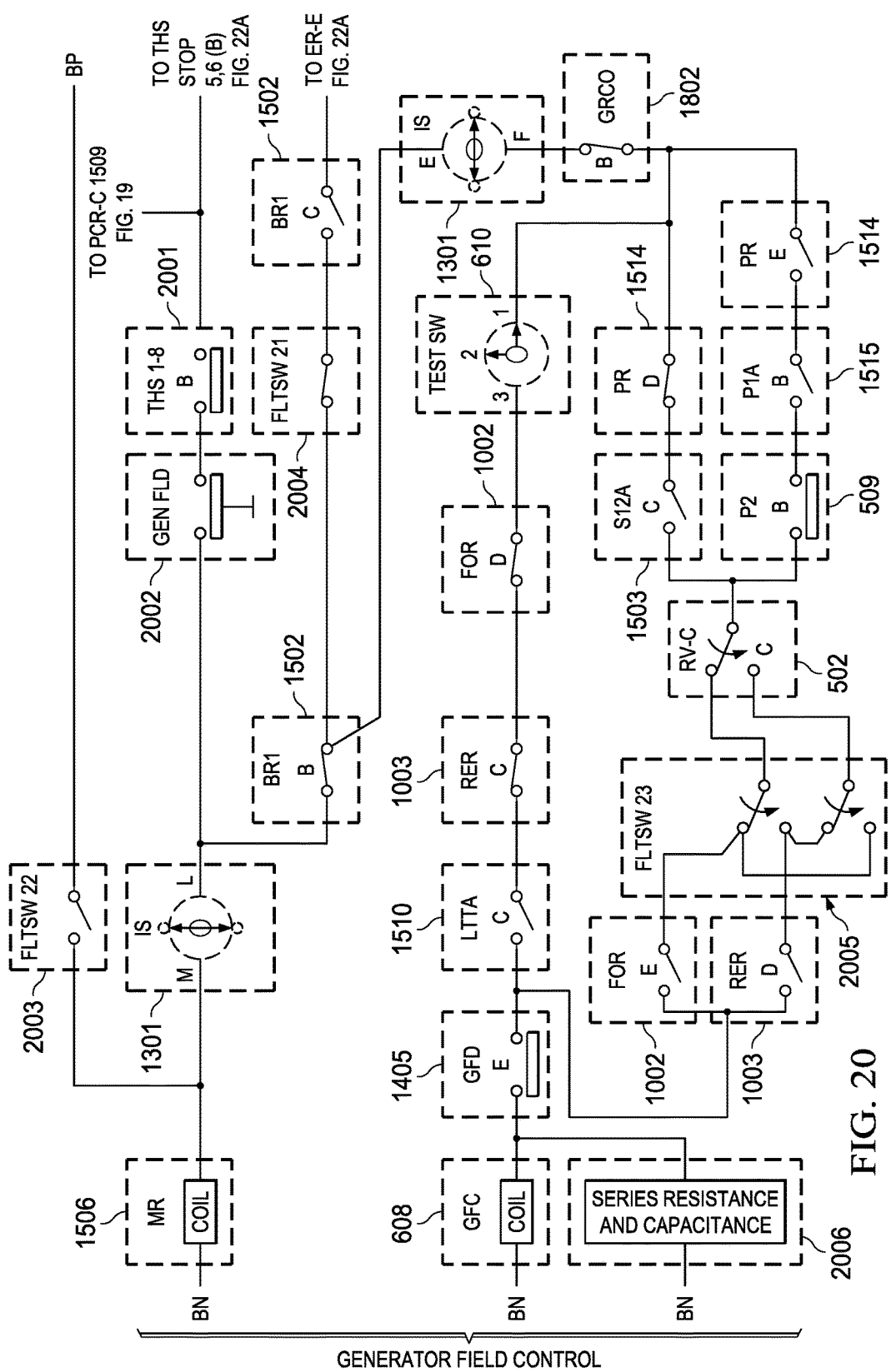
FIG. 20 is an electrical schematic diagram of the generator field control emulation subsystem of the simulator system of FIG. 1.

The coil of generator field auxiliary relay (GFX) 1501 is controlled by the C contacts of GFC 608 (GFC coil shown in the generator field control circuitry of FIG. 20).

As shown in FIG. 15B, the H-G contacts of isolation switch 1301 are open during start and connected in the run mode. The 7-8 contacts of test switch 601 are connected in the test mode and the 7-9 contacts are connected in the normal mode. When test switch 1301 is set to the test mode, test lamp 1512 is illuminated.

Figure 21:
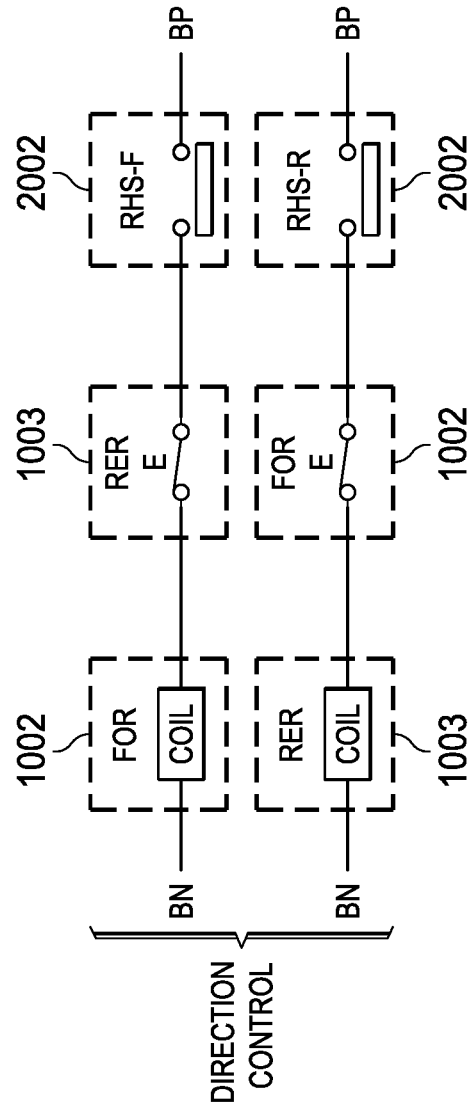
FIG. 21 is an electrical schematic diagram of the direction (reverser) control emulation subsystem of the simulator system of FIG. 1.
Figure 22B:
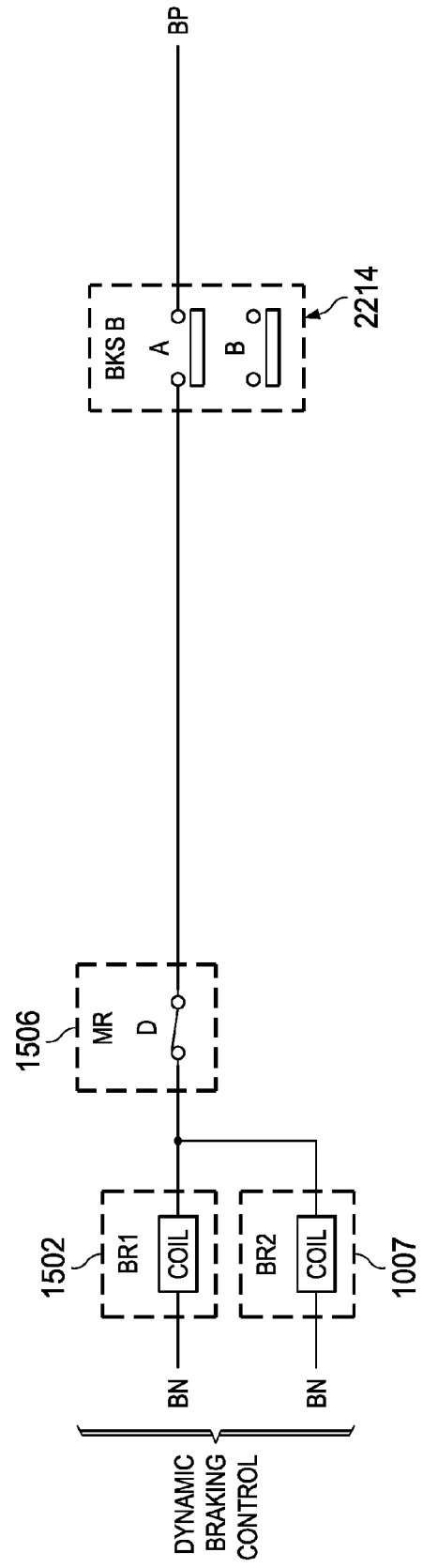
Figure 22C:
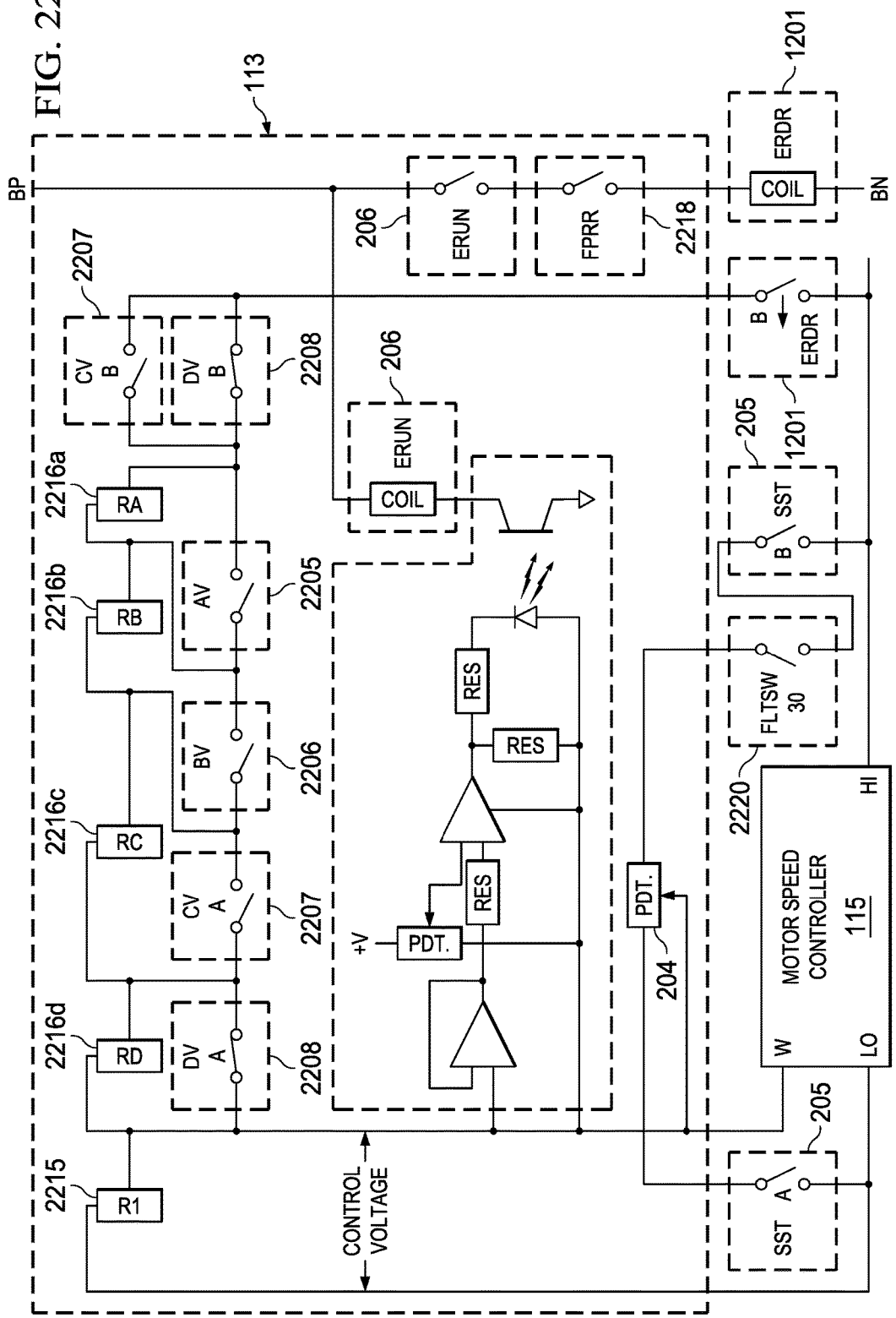

In the run mode, while motoring in the forward direction, the coil of contact delay relay (CDR) 1504 is energized through the C contact of FOR 1002 (coil shown in FIG. 21 as part of the direction control circuitry), the E contact of RV transfer switch 502, the E contacts of MB transfer switch 504, the A contacts of MR 1506 (coil shown in the generator field control circuitry of FIG. 20), and the normally closed D contacts of BR2 1007 (coil shown in the dynamic braking control circuitry of FIG. 22B).

A capacitor and resistor circuit 1513 sets the time constant for de-energizing of CDR 1504, which delays the opening of the contacts of CDR 1513 by a predetermined amount. This delay in drop-out allows for the energy in the high voltage circuitry to collapse before the contacts of CDR 1513 open.

While motoring in the reverse direction, CDR 1505 is energized through the C contact of RER 1003 (coil shown in the directional control circuitry of FIG. 21), the F contact of RV transfer switch 502, the E contact of MB transfer switch 504, the A contacts of MR 1506, and the normally closed D contacts of BR2 1007. In both forward and reverse operation the A contact of CDR 1504 prevents power contactors from dropping out when the throttle is placed in idle. (MR 1506 opens when the throttle is in idle).

In the motoring mode, the coils of B relay 511 and brake auxiliary (BA) relay 1507 are de-energized for both directions of movement.

In the dynamic braking mode, forward direction, the coil of CDR 1504 is energized through the signal path including the C contact of FOR 1002, the E contact of RV transfer switch 502, the F contacts of MB transfer switch 504, and the C contact of BR2 1007. Energizing the coil of CDR 1504, along with the interlock circuitry of FIG. 15C, closes the A contact of S12 auxiliary (S12A) relay 1503 when traction motors 116a-116b are connected in series. The coils of B relay and BA relay 1507 are energized through normally closed dynamic braking cut-out switch 1508, the B contact of BR1 1502, and the A contact of S12A relay 1503. The A contact of BA relay 1507 closes when the BA relay coil is energized.

The sequence of events is similar in the dynamic braking mode, reverse direction, except that the signal passed through the C contacts of RER 1003 and the F contacts of RV transfer switch 502, rather than through the C contacts of FOR 1002 and the E contacts of RV transfer switch 502.

When the CDR 1504 coil of FIG. 15B is energized, the associated B and C contacts of CDR 1504 shown in FIG. 15C close. During series traction motor operations, the normally closed A contact of parallel relay (PR) 1514 (coil shown in transition control circuitry of FIG. 16) and the normally closed contact of parallel relay P1 auxiliary (P1A) relay 1515 (coil FIG. 15C). The coils of S12A contactor 1503 and S12 contactors 507 are energized. As shown in FIGS. 5A-5B, with the coil of S12 contactor 507 energized, the A contacts of 512 contactors close, which connects traction motors 116a-116b in series with AG/MG generator 107.

During parallel traction motor operations, the G contact of MB transfer switch is normally closed (i.e. motoring mode) and the C contact of S12A contactor 1503 is normally closed. The S12 and S12A coils are de-energized. When the B contact of PR 1514 closes with the energizing of its coil by the transition control circuitry of FIG. 16, the coils of P1 auxiliary (P1A) contactor 1515 and P1 contactor 508 energize. The contacts of P1 contactor 508 in turn close an energizes the coil of P2 contactor 509 and the contacts of P2 contactor 509 close. As shown in FIGS. 5A-5B, with the P1 and P2 contactors closed, traction motors 116a and 116b are electrically coupled in parallel with single auxiliary/main generator 107.

A resistor 1518 and a capacitor 1519 set a time constant for the energizing and de-energizing of the coils shown in FIG. 15C.

Figure 16:
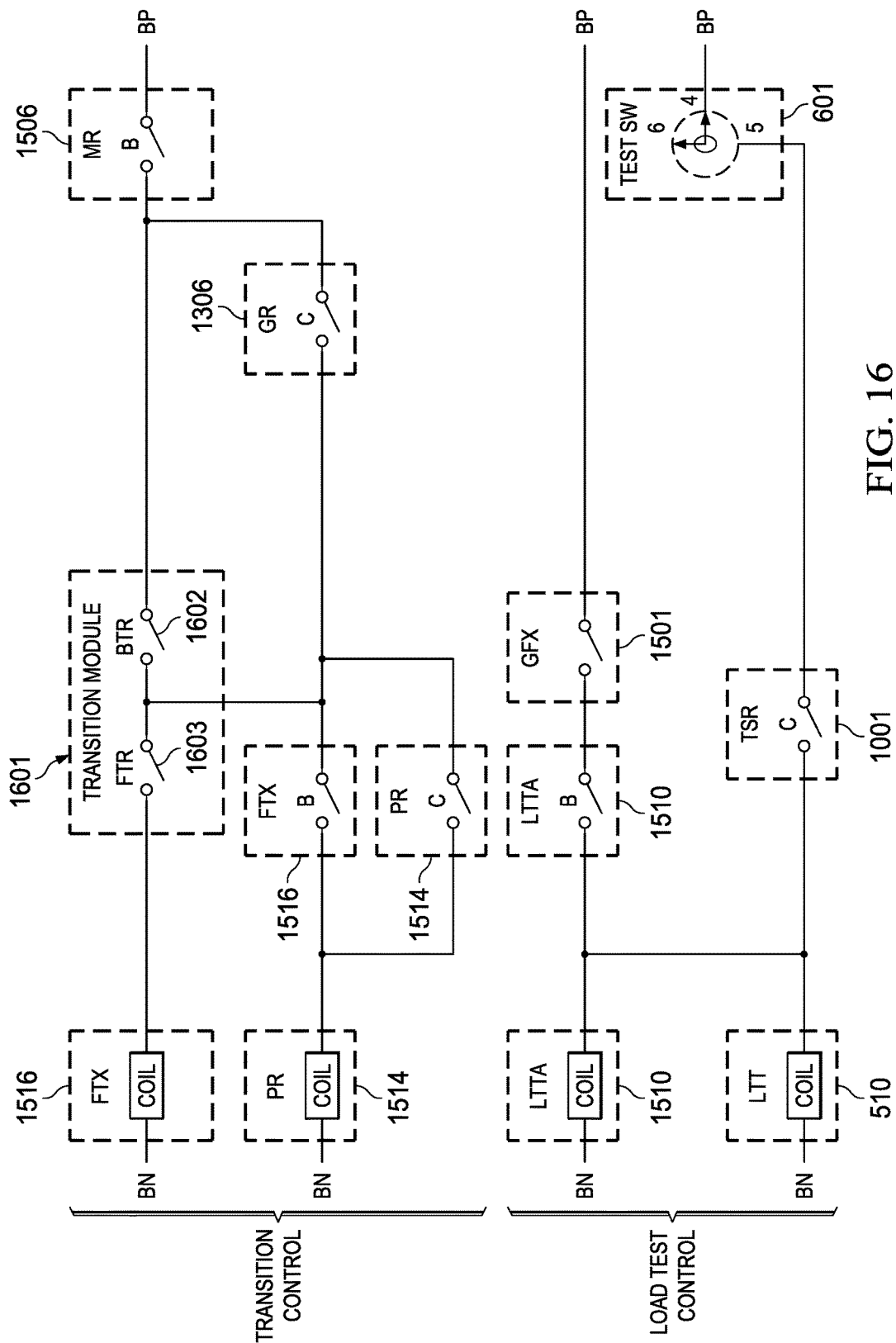
FIG. 16 is an electrical schematic diagram of the transition control and load test control emulation subsystems of the simulator system of FIG. 1.

The transition control circuitry and load test control circuitry of simulator 100 are shown in detail in FIG. 16. The transition control circuitry includes a transition module 1601 having a backwards transition (BTR) toggle switch 1602 and forward transition (FTR) toggle switch 1603. During motoring, the B contact of MR relay 1506 is closed. If a ground relay operation happens when the high voltage is configured in parallel by the PR relay being energized, the C contact of GR 1306 keeps the PR relay energized when the BTR opens on TR module 1601.

During series traction motor operation, the coils of S12 contactor 507 and S12A contactor 1503 are energized and the A contacts of S12 contactor 507 of FIG. 5A are closed. The coils of P1 contactor 508, P2 contactor 509, and P1A contactor 1515 are de-energized such that the contacts of P1 contactor 508 and P2 contactor 509 shown in FIGS. 5A and 5B are open.

For a forward transition from series to parallel traction motor operation, BTR switch 1602 and FTX switch 1603 are closed. Transition module 1601 energizes the coil of FTX relay 1516, which causes the A and B contacts of FTX relay 1516 to close. The coil of PR 1514 is energized, which closes the C contact of PR 1514, latching the PR coil in an energized state. The A contact of PR 1514 (FIG. 15C) opens and the B contact of PR 1514 closes in preparation for the transition.

At the same time, when the coil of PR 1514 energizes, the D contact of PR 1514 (FIG. 20) opens, which de-energizes the coil of GFC 608 and interrupts the output of auxiliary/main generator 107. The coils of S12 contactor 507 and S12A contactor 1503 remain energized through the A contact of FTX relay 1516, the B contact of S12A contactor 1503, and P1A contactor 1515 (FIG. 15C). Transfer module 1601 then releases the coil of FTX relay 1516, after a delay which simulates the voltage decay in the main generator output voltage during forward transitioning in an actual locomotive.

The FTX A contact opens and the coils of S12 contactor 507 and S12A contactor 1503 de-energize. The S12A C contact closes and the coils of P1 contactor 508, P2 contactor 509, and P1A contactor 1515 energize. In the generator field control circuitry of FIG. 20, the C contact of S12A 1514 opens and the coil of GFC 608 is re-energized through the E contact of PR 1514, the B contact of P1A 1515, and the B contacts of P2 contactor 509.

The transition from series to parallel traction motor operation is complete. As shown in FIGS. 5A and 5B, the A contacts of the S12 contactor open and the contacts of the P1 and P2 contactors close such that emulated traction motors 116a-116b now operate in parallel.

After the forward transition, the coil of PR 1514 remains latched by C contact of PR 1514. A backwards transition is initiated by BTR 1602 opening, which cuts the current flow to the coil of PR 1514. (The C contact of GR 1306 remains normally open and provides protection when a ground relay occurs during parallel traction motor operations.) The PR coil de-energizes and the C contact of PR 1514 opens.

When the coil of PR 1514 de-energizes, the A contact of PR 1514 closes and the B contact of PR 1514 opens. The coils of P1A contactor 1515 and P1 contactor 508 de-energizes. With the contacts of P1 contactor 508 open, the coil of P2 contactor 509 also de-energizes. In the generator field control circuitry of FIG. 20, the E contact of PR 1514 opens, which de-energizes the coil of GFC 608 and interrupts the output of auxiliary/main generator 107.

The coils of S12 507 and S12A 1503 energize and The S12A B contact closes and the S12A C contact opens. The coil of GFC 608 re-energizes through the normally closed D contact of PR 1514 and the now closed C contact of S12A 1503.

The backwards transition from parallel to series traction motor operation is now complete. As shown in FIGS. 5A and 5B, the A contacts of the S12 contactor close and the contacts of the P1 and P2 contactors open such that emulated traction motors 116a-116b now operate in series.

FIG. 16 also shows the load test control circuitry of simulator 100. In FIG. 16, test switch 601 is shown in the normal operating mode, with contacts 4 and 6 connected. In the load test mode, contacts 4 and 5 of test switch 601 are connected and the coils of LTT relay 510 and LTT auxiliary (LTTA) relay 1510 are energized through the C contacts of TSR 1001 (the TSR coil shown in FIG. 15A is energized when the locomotive is not in motion). The B contacts of LTTA relay 1510 close and the coils of LTT relay 510 and LTTA relay 1510 are held in an energized state so long as the contact of GFX relay 1501 is closed (coil in FIG. 15A).

Figure 17A:
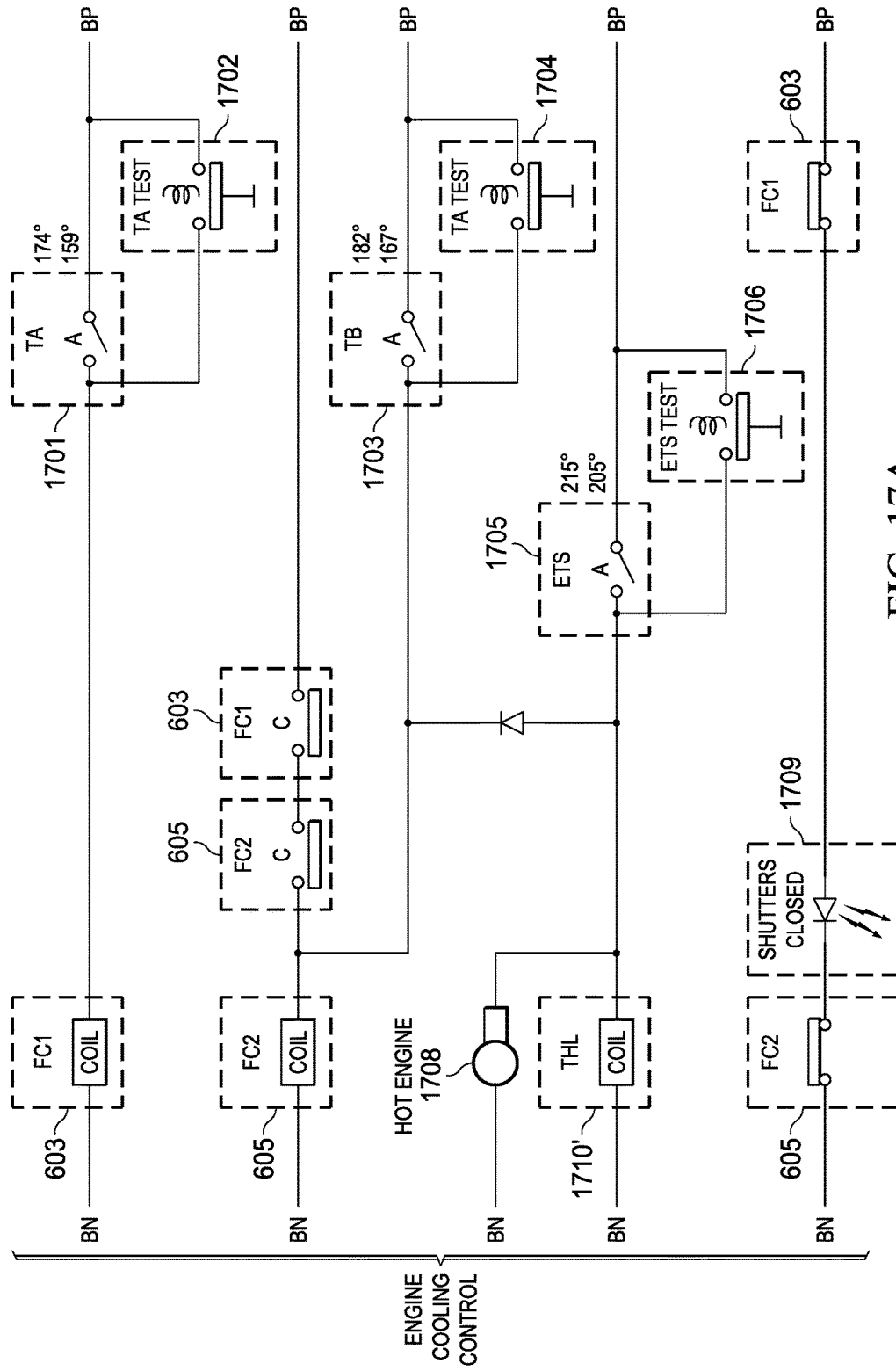
FIG. 17A-17B are electrical schematic diagrams of the diesel engine cooling control emulation subsystem of the simulator system of FIG. 1.
Figure 17B:
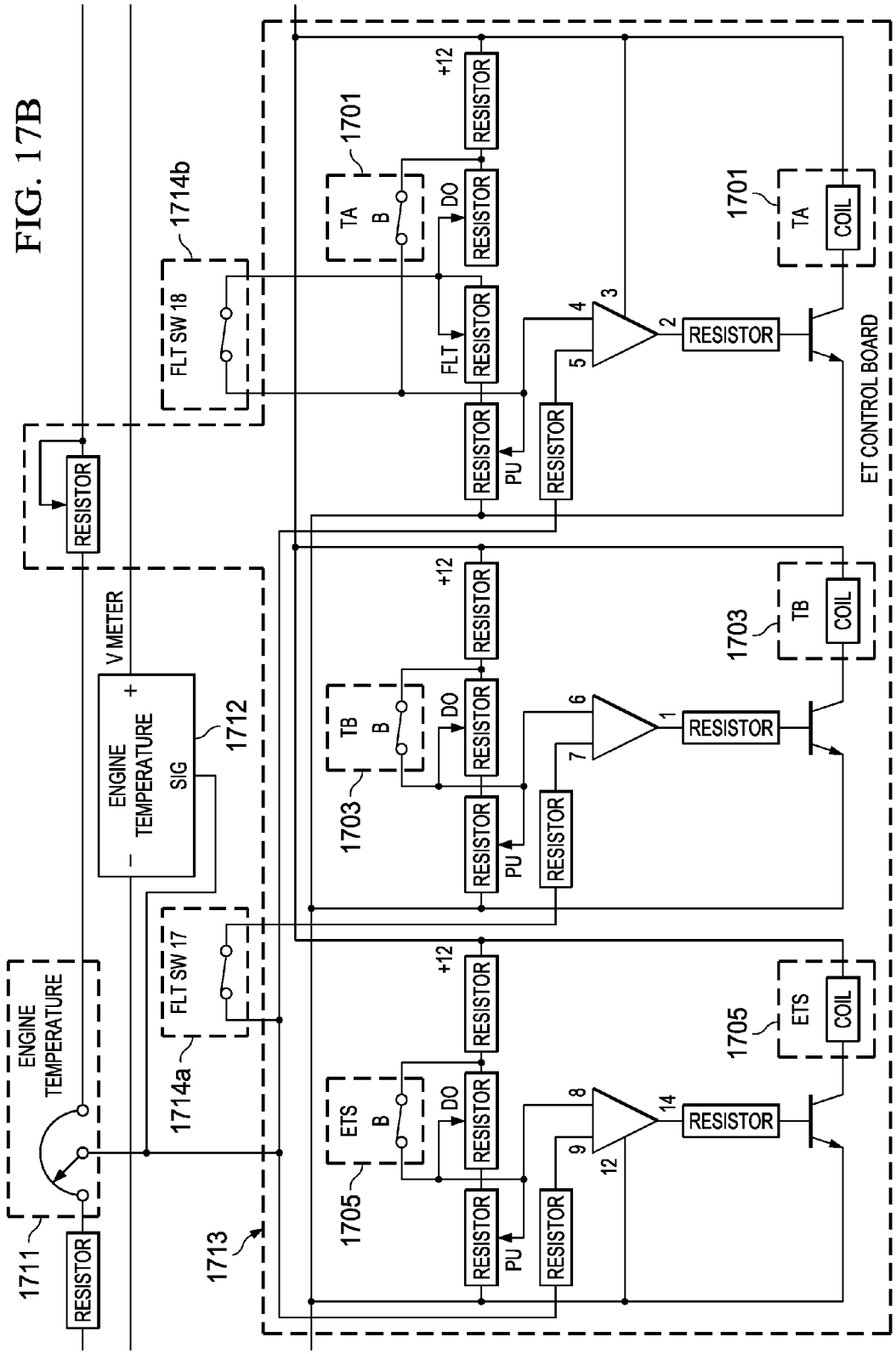

FIGS. 17A and 17B illustrate the emulated cooling control systems of the illustrated embodiment of simulator 100. Generally, the emulated cooling control systems simulate diesel engine temperatures and selectively activate the coils controlling fan control relays 603 (FC1) and 605 (FC2) of FIG. 6, as well as the coil controlling the throttle limit relay (THL) 1710.

The coil of FC1 603 of FIG. 6 is controlled by temperature switch A (TA) 1701. The FC1 relay coil and radiator blower motor 1 (RBL 1) control path are tested with spring-return pushbutton switch 1702. The coil of FC2 relay 605 is initially controlled by temperature control switch B (TB) 1703 or engine temperature switch (ETS) 1705 and then held energized by the C contacts of FC1 relay 603 and FC2 relay 605. Spring-return pushbutton switch 1704 allows testing of the FC2 605 coil and the radiator blower motor (RBL 2) control path.

The coil of THL 1710 is controlled by ETS 1705, which also illuminates hot engine lamp 1708. Spring-return pushbutton switch 1706 allows testing of the THL coil 1701 and the THL control path. An LED 1709 illuminates when the coils of FC1 relay 603 and FC2 relay 605 are both de-energized, which emulates the condition where the locomotive shutters are closed and the radiator blower motors are off.

A potentiometer 1711 and control circuitry 1713 simulate changes in diesel engine temperature and control of the radiator control motors and the throttle limit relay in an actual locomotive. A volt meter 1712 emulates the locomotive temperature gauge. Fault switches 1714a (FLT SW 17) and 1741b (FLT SW 18) allow an instructor to introduce faults into the emulated engine cooling system.

Under the control of potentiometer 1711, control circuitry 1713 selectively activates and de-activates the coils of TA relay 1701, TB relay 1703, and ETS 1705 at simulated engine temperatures. In the illustrated embodiment, TA relay 1701 closes when the simulated temperature increases to at or above 174° F. and opens when the simulated temperature decreases to at or below 159° F., while TB relay 1703 closes when the simulated temperature increases to at or above 182° F. and opens when the simulated temperature decreases to at or below 167° F. Generally, with increasing temperature, the coil of FC1 relay 603 energizes first to activate emulated radiator blower 1 (RBL 1) 604 (FIG. 6A), followed by the energizing of the coil of FC2 relay 605 and the activation of emulated radiator blower motor 2 (RBL 2) 606 (FIG. 6A) (i.e., both radiator blower motors are active). On decreasing temperature, generally, the coil of FC2 relay 605 de-energizes first, shutting off RBL 2, followed by the de-activation of the coil of FC1 relay 603, which shuts off RBL 1.

In the illustrated embodiment of simulator 100, the coil of ETS 1705 energizes when the simulated temperature increases to at or above 215° F. and de-energizes when the simulated temperature decreases to at or below 205° F.

Figure 18:
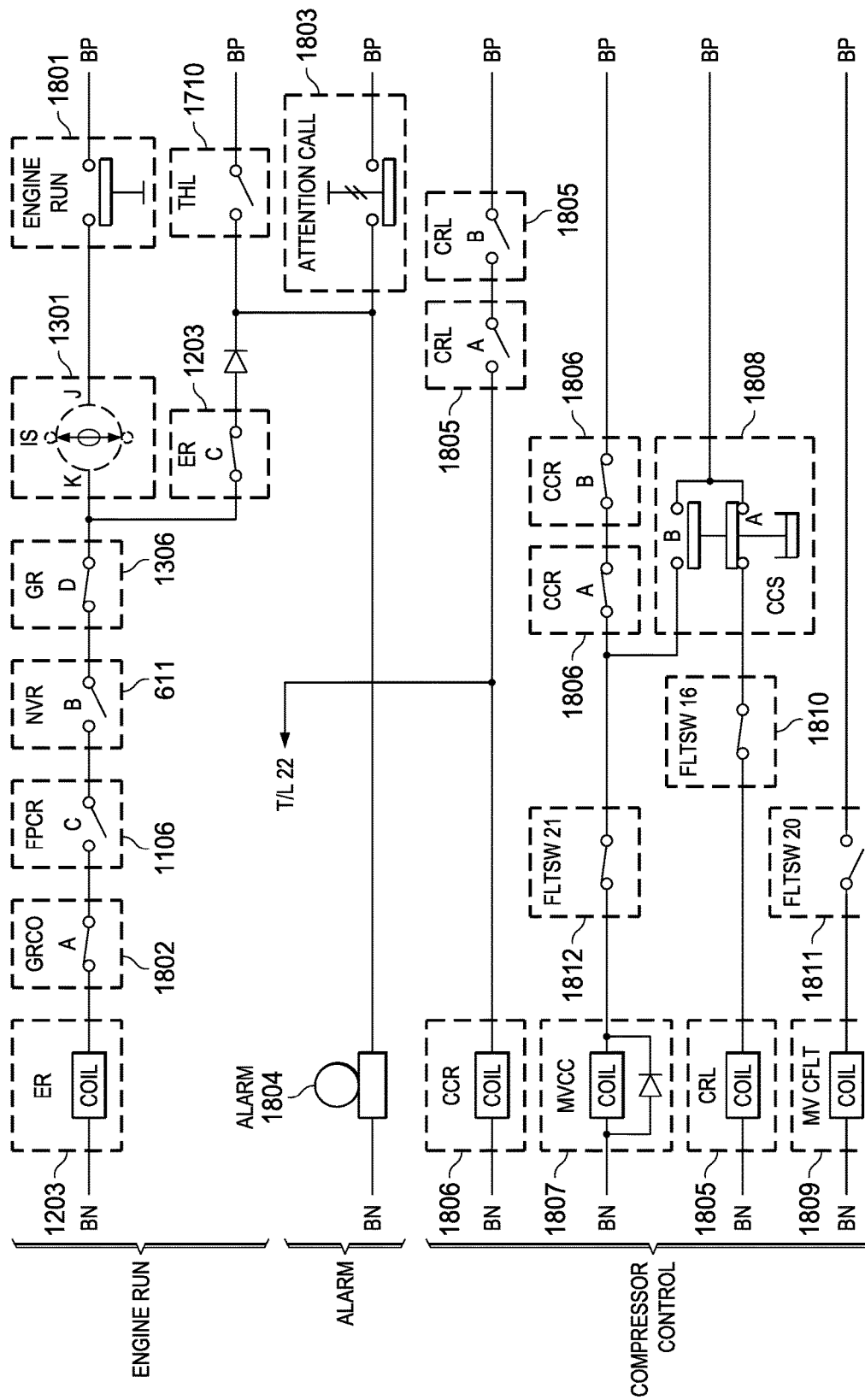
FIG. 18 is an electrical schematic diagram of the engine run, alarm, and compressor control emulation subsystems of the simulator system of FIG. 1.

The emulated engine run controls of simulator 100 are shown in FIG. 18. Engine run switch 1801 is controlled by the operator on the operator stand and the J and K contacts of isolation switch 1301 are connected. The coil of ER 1203 is not energized under certain conditions to prevent an increase of engine speed, as discussed below in conjunction with FIG. 22A. Contact D of GR 1306 is normally closed and allows the coil of ER 1203 to energize as long as the coil of GR 1306 (FIG. 5B) is not energized (i.e., no high voltage ground detected). Contact B of NVR 611 is normally open and the coil of ER 1203 cannot not be energized until the NVR 611 coil (FIG. 6) is energized. The C contact of FPCR 1106 and the FPCR 1106 coil (FIG. 11) must be energized before the ER 1203 coil is energized, which ensures that DC motor 114 emulating the locomotive diesel engine is running before engine governor 113 will respond to throttle inputs (i.e., the THS inputs discussed below). The A contact GRCO 1802 assures that the ground relay protection is active.

The coil of engine run relay 1203 is de-energized and alarm bell 1808 sounds when any of the following occur: (1) a high voltage ground is detected, which opens the D contact of GR 1306; (2) a failure of the AC power, which opens the B contact of NVR 610; (3) ground relay protection has been disabled, which opens the A contact of GRCO 1802; or (4) one of the emergency stop buttons of FIG. 13 is pressed, which opens the C contact of FPCR 1106.

Alarm bell 1804 also sounds in response to engine overheating and closure of the contacts of THL 1710 and the attention call button 1803 being depressed.

FIG. 18 also depicts preferred emulated compressor synchronization control circuitry of simulator 100. Compressor control is based triggered by the air pressure within main tank 2701 (FIG. 27).

Without a trainline request, the compressor synchronization control circuitry operates in stage 1. If the pressure within main tank 2701 falls below 60 psi (representing 130 psi in an actual locomotive), the A contact of compressor control switch (CCS) 1808 closes and the B contact of CCS 1808 opens. The coil of compressor relay (CRL) 1805 is energized, which de-energizes the coil of compressor control magnetic value (MVCC) 1807. In turn, air is removed from the compressor unloader line, which allows air compressor 1205 (FIG. 12) to run. (In simulator system 100, removing compressor air from the unloader line is the equivalent of no air being applied to CULS 1204 of FIG. 12, in which case the normally closed contact of CULS 1204 provides power to air compressor 1205 motor as long as engine running relay (ERR) 1203 coil is energized and the B contact of ERR 1203 is closed.)

When the pressure in the main tank reaches 70 psi (140 psi in an actual locomotive), the A contact of CCS 1808 opens, which de-energizes the coil of CRL 1805 and the coil of MVCC 1807 is energized. MVCC 1807 then applies air to the compressor unloader line, which in simulator system 100 is the application of air to CULS 1204 of FIG. 12. The contact of CULS 1204 opens and cuts-off power to the motor of compressor 1205.

In response to a trainline request (T/L 22 in FIG. 18), the coil of CCR 1806 is energized, which de-energizes the coil of MVCC 1807. Air is removed from the compressor unloader line, CULS 1204 closes, and the motor of compressor 1205 runs. The compressor synchronization control circuitry now operates in stage 2.

If the main tank reaches 75 psi (145 psi in an actual locomotive), the B contact doses, which energizes the coil of MV-CC 1807. The coil of CCR 1806 is energized by the trainline (T/L 22) and the coil of MVCC 1807 is energized by the B contact of CCS 1808. MVCC 1807 then applies air to the compressor unloader line, which in simulator system 100 is the application of air to CULS 1204 of FIG. 12. The contact of CULS 1204 opens and cuts-off power to the motor of compressor 1205.

When the main tank pressure falls to 65 psi in simulator system 100, the B contact of CCS 1808 will open. The coil of CRL 1805 is de-energized and the coil of CCR 1806 is energized by T/L 22. The coil of MVCC 1807 is de-energized with the opening of the B contact of CCS 1808. Air is removed from the compressor unloader line, CULS 1204 closes, and the motor of compressor 1205 runs.

Fault switches 1810 (FLTSW 19), 1811 (FLTSW 20), and 1812 (FLTSW 21) allow an instructor to emulate faults in a locomotive compressor control electrical subsystem. In particular, normally open FLTSW 20 is set to introduce a fault, which in turn energizes the coil of (MVCLFT) 1809. With the coil of MVCLFT 1809 energized, air to CULS 1204 is interrupted such that the motor of air compressor 1205 continuously runs. This emulates a faulty air compressor, where the unloader line has air on it but does not unload the compressor.

The coil for fuel pump relay 1107, which is always energized as long as there is low voltage power, is shown in FIG. 19. FIG. 19 also illustrates the emulated pneumatic control circuitry of the illustrated embodiment of simulator 100.

As discussed above, the notches of the throttle handle switch (THS) are emulated in simulator 100 by a series of toggle switches. These include THS idle switch 1901 (FIG. 19), THS 1-8 switch 2001 (FIG. 20). THS Stop, 5, 6 switch 2201 (FIG. 22A), THS 3-8 switch 2202 (FIG. 22A), THS 5-8 switch 2203 (FIG. 22A), and THS 2, 4, 6, 8 switch 2204.

Generally, power is supplied to the THS switches so long as the pressure within main tank 2701 remains above 60 psi and pneumatic control switch (PCS) 1902 remains closed (e.g., emulating safe air system operating conditions in an actual locomotive) and the THS idle switch A contacts remain normally closed (locomotive out of idle). In normal operating conditions, the coil of pneumatic control relay (PCR) 1509 is energized and the B and C contacts of PCR 1509 are closed. In an actual locomotive, the PCS switch monitors the train brakes and the brake pipe pressure, which is normally at 90 psi. An emergency occurs if the brake pipe pressure falls rapidly. The illustrated embodiment of simulator system 100 does not include an emulated brake system; however, by turning PCS 1902 off, emergency conditions can be simulated.

In particular, in the off state, PCS 1902 opens, emulating unsafe locomotive operating conditions (e.g., the brake pipe in a desired or undesired emergency condition), the coil of PCR 1509 de-energizes, the PCR B and C contacts open, and the PCR A contact re-closes, which illuminates PCS lamp 1903. The THS toggle switches are disabled and the loading on the main generator is released, as discussed below. A reset of the pneumatic control circuitry of FIG. 19 is then required to resume normal locomotive operations.

During PC reset, the diesel engine must be in the idle state, with both the A the contacts of THS idle switch 1901 and the contacts of PCS 1902 closed. The coil of PCR 1509 is again energized, the PCR B and C contacts close, the PCR A contact opens, and PCS lamp 1903 turns off. The B contact of PCR 1509 holds the PCR coil energized if the THS idle switch 1901 is taken out of idle, during normal locomotive operations. The C contact of PCR 1509 sources power to the generator field controls (FIG. 20) and the engine governor controls (FIG. 22A).

FIG. 20 illustrates the emulated generator field control circuitry of simulator 100. In the normal operating mode, with PCS 1902 closed and current flowing through the C contact of PCR 1509, the coil of MR (motoring relay) 1506 is energized when the B contacts of THS 1-8 switch 2001 are closed, the generator field pushbutton switch 2002 is closed, and the L and M contacts of isolation switch 1301 are connected. Fault switch 2003 (FLTSW 22) allows simulated faults to be introduced into the motoring relay control path.

During load testing, the B contact of BR1 1502 is normally closed and the E and F contacts of isolation switch 1301 are connected and the 1 and 3 contacts of test switch 1301 are connected. The coil of GFC (generator field contactor) 608 is energized through the normally closed D contact of FOR 1002, the normally closed C contact of RER 1003, the C contact of LTTA 1510 (the LTTA coil of FIG. 16 is energized), and the E contacts of GFD 1405 (the GFD coil of FIG. 15A energized).

In the motoring modes, the B contact of BR1 1502 is closed and the E and F contacts of isolation switch 1301 are connected. The 1 and 3 contacts of test switch 1301 are connected. As discussed above with regards to transactions, during series traction motor operations, the coil of GFC 608 is energized through the normally closed D contact of PR 1514, the closed contact of S12A 1503 (the S12A coil of FIG. 15C is energized), the C contacts of RV transfer switch 502, and the E contact of FOR 1002 during forward movement or the D contact of RER 1003 during reverse movement.

During parallel traction motor operations, the coil of GFC 608 is energized through the E contact of PR 1514 (the PR coil of FIG. 16 is energized), P1A contractor 1515 (the P1A coil of FIG. 15C is energized), the B contacts of P2 contractor 509 (the P2 coil of FIG. 15C is energized), the C contacts of RV transfer switch 502, and the E contact of FOR 1002 during forward movement or the D contact of RER 1003 during reverse movement. Fault switch 2005 (FLTSW 23) allows for the introduction of faults in the GFC coil control path.

In the dynamic braking mode, the coil of GFC 608 is energized when the B contact of THS Idle switch 1901, the contact of BKS BG 2217, and the B contact of BA 1507 are all closed (see FIG. 2A). In FIG. 20, the energizing path for the GFC coil, in the forward direction, include the C contact of BR1 1502, the E-F terminals of isolation switch 1301, the B contact of GRCO 1802, the D contact of PR 1514, the C contact of S12A 1503, the RV 502, FLTSW 23 2007, the E contact of FOR 1002, and the E contact of GFD 1405. A series resistance and capacitance 2006 sets the ramping-up and ramping-down of the input to GFC coil 608.

The directional control circuitry of FIG. 21 controls the energizing of the coils of FOR (forward direction relay) 1002 and RER (reverse direction relay) 1003 in response to the setting of the emulated reverse handle switch (RHS) 2002, which in the illustrated embodiment is a toggle switch. When the RHS 2002 is set to the forward direction, the FOR coil is energized through the normally closed E contact of RER 1003. The E contact of FOR 1002 opens, such that the RER coil is de-energized. When the RHS 2002 is set to the reverse direction, the RER coil is energized through the normally closed E contact of FOR 1002. The E contact of RER 1003 opens, such that the FOR coil is de-energized.

The emulated engine governor and braking control circuitry of simulator 100 are shown in FIGS. 22A-22C. Generally, the engine governor controls emulate the AV, CV, BV, and DV solenoids of an actual locomotive, which respond to the THS notch settings from the throttle handle switch. In simulator 100, the toggle switches emulating the THS control the coils to a set of emulated engine governor solenoids, which in turn control the voltages applied to motor speed controller 115 and set the speed of DC motor 114.

As shown in FIG. 22A, the emulated engine governor controls include AV coil 2205, BV coil 2206, CV coil 2207, and DV coil 2208. The contacts of these coils control voltage divider discussed below in conjunction with FIG. 22C. During motoring, As long as the air brake system is not in emergency, (PCS 1902 closed and PCR coil 1509 energized) PCR-C 1509 is closed (FIG. 19) and the D, E, and F contacts of ER (engine relay) 2103 are all closed (ER coil of FIG. 18 energized—diesel engine running). The D contact of FPCR (fuel pump control relay) 1106 is open (FPRC coil of FIG. 13 is energized—fuel pump motor running). The D and C contacts of isolation switch 1301 are connected in the run mode.

Under these conditions (motoring and load test), the coil of AV 2205 is energized when THS 2, 4, 6, 8 switch 2204 is closed, the coil of BV 2206 is energized when the B contacts THS 5-8 switch 2203 are closed, the coil of CV 2207 is energized when the THS 3-8 switch 2202 is closed, and the coil of DV 2208 is energized the A and B contacts of THS Stop, 5, 6 switch 2201 are closed. In the dynamic braking mode, the B contact of THS Idle 1901 is closed, BKS BG 2217 is closed, the B contact of BA 1507 is closed, such that the coil of BV 2206 is energized through the E contact of ER 1203.

As shown in FIG. 22C, the main paths of the AV, BV, CV, and DV relays control a switched (variable output) voltage divider including resistor 2115 and switched potentiometers 2216a-2216d, which set the voltage of the control signal (W) of motor speed controller 115.

During starting of DC motor 114, the A and B contacts of SST (simulator starting) contactor 205 close (SST 205 coil of FIG. 8 is energized). The voltage at the control input W (0-10V) of motor speed controller 115 is set by potentiometer 204. The engine running (ERUN) relay 206 and fuel pump running relay (FPRR) 1111 close and the coil of engine run delay relay (ERDR) 1201 energizes. The B contacts of ERDR close after a delay of approximately 3 to 4 seconds to simulate diesel engine cranking and the A and B contacts of SST contactor 205 open.

In the illustrated embodiment, the HI input to motor speed controller is set to approximately 10 volts and the LO (return) input is set to approximately 0 Volts. The control voltage at the control input (w) ranges between approximately 0 and 10 volts and sets the speed of DC motor 114. During start, the control voltage is set by the tap of potentiometer 204. In the illustrated embodiment, potentiometer 204 has a total resistance of approximately 10 kΩ and the tap is set at the point where the low voltage side resistance at approximately 4.2 kΩ and the high voltage side resistance is approximately 5.8 kΩ, which sets the control voltage during starting at approximately 4.2V.

During engine running, the control voltage is set by the voltage divider output at the node between potentiometer R1 and the switched resistor ladder formed by potentiometers RA, RB, RC, and RD. When AV coil 2205 is energized, potentiometer RA 2216a is bypassed, when BV coil 2206 is energized, potentiometer RB 2216b is bypassed, and when CV coil 2207 is energized, potentiometer RC 2216c is bypassed. In contrast, potentiometer RD 2216d is normally bypassed within the voltage divider and is switched into the voltage divider when DV coil 2208 is energized. (When DV coil 2208 is energized, but CV coil 2207 is de-energized, motor 114 is stopped.)

R1 has a nominal resistance of 10 kΩ, RA has a nominal resistance of 1.620 kΩ, RB has a nominal resistance of 6.480 kΩ, RC has a nominal resistance of 3.240 kΩ, and RD has a nominal resistance of 3.420 kΩ, for the illustrated embodiment. (The resistance values for potentiometer 204, and resistors R1, RA, RB, RC, and RD are exemplary and may varying in alternate embodiments.)

In the illustrated embodiment, the HI, LO, and control (W) voltages can be set to provide the nominal voltages shown in Table 1 with the following procedure. First, the THS switches are set for Notch 8 operation, such that AV, BV, and CV coils are energized and resistors RA, RB, RC, and RD are all bypassed. With the nominal voltage between the HI and LO terminals set to 10 volts nominal, the motor speed controller 115 output is set to produce a nominal output voltage of 90 V with a potentiometer (not shown).

Next, the THS switches are set to notch 6 (AV, BV, CV, DV energized), and potentiometer RD is adjusted to set a control voltage W of approximately 8.5 volts, which results in a motor speed controller 115 output of approximately 72.4 volts. Then, the THS switches are set to notch 7 (BV, CV energized) and potentiometer RA is adjusted to set a control voltage W of approximately 9.6 volts, which results in a motor speed controller output voltage of approximately 82.0 volts. The THS switches are then set to notch 4 (AV, CV energized) and potentiometer RB adjusted to set the control voltage W to approximately 6.9 volts, which produces a motor speed output voltage of approximately 56.9 volts. Finally, the THS switches are set to idle and potentiometer is adjusted to set control voltage W to approximately 30 volts.

The dynamic braking control circuitry of simulator 100 is shown in FIG. 22B. Dynamic braking is enabled when the locomotive is out of the motoring mode, and the D contact of MR 1506 is closed (the MR coil of FIG. 20 is de-energized). Dynamic braking is selected by closing switch 2214, which in the illustrated embodiment is a toggle switch. When dynamic braking is enabled and selected, the coils of BR1 1502 and BR2 1007 are energized, which de-energizes the GFC coil and interrupts power from DC motor 114.

When coming from motoring, THS-idle 1901 is turned off, GFC 608 drops out. When operator turns on BKS, the A contact of BKS 2214 closes and the coils of BR1 1502 and BR2 1007 are energized. In turn, the coil of CDR 1504 is de-energized and the coils of power contactors S12 507 and S12A 1503 de-energize (FIG. 15C). The B contact of S12 contactor 507 returns to normally closed and the coil of TSR 1001 is energized (FIG. 10).

When the coil of TSR 1001 energizes, the A and B contacts of TSR 1001 close, which causes the motor/brake switch (MB/MOT) 504 to move from the motoring position to braking position (FIG. 10). The F contact of MB/MOT closes and the coil of CDR relay 1504 to energize through the C contact of BR2 1007 (FIG. 15B). The coils of contactors S12 507 and S12A 1503 energize which cause the coil of TSR 1001 to de-energize. When the operator closes BKS-BG switch 2217 (FIG. 22A) the coil of GFC 608 (FIG. 20) energizes.

Figure 23:
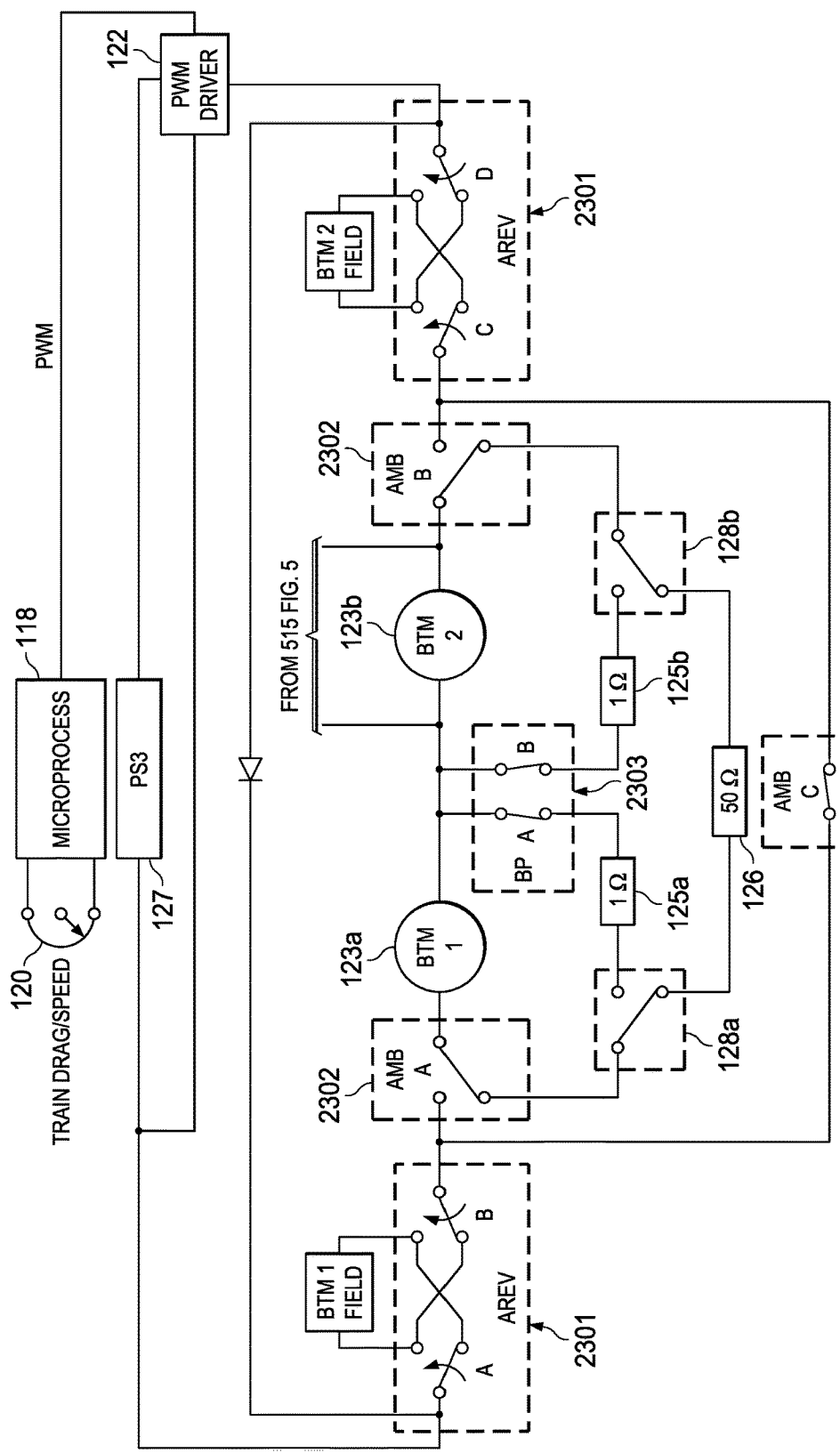
FIG. 23 is an electrical schematic diagram of the blind motor speed control emulation subsystem of the simulator system of FIG. 1.
Figure 24A:
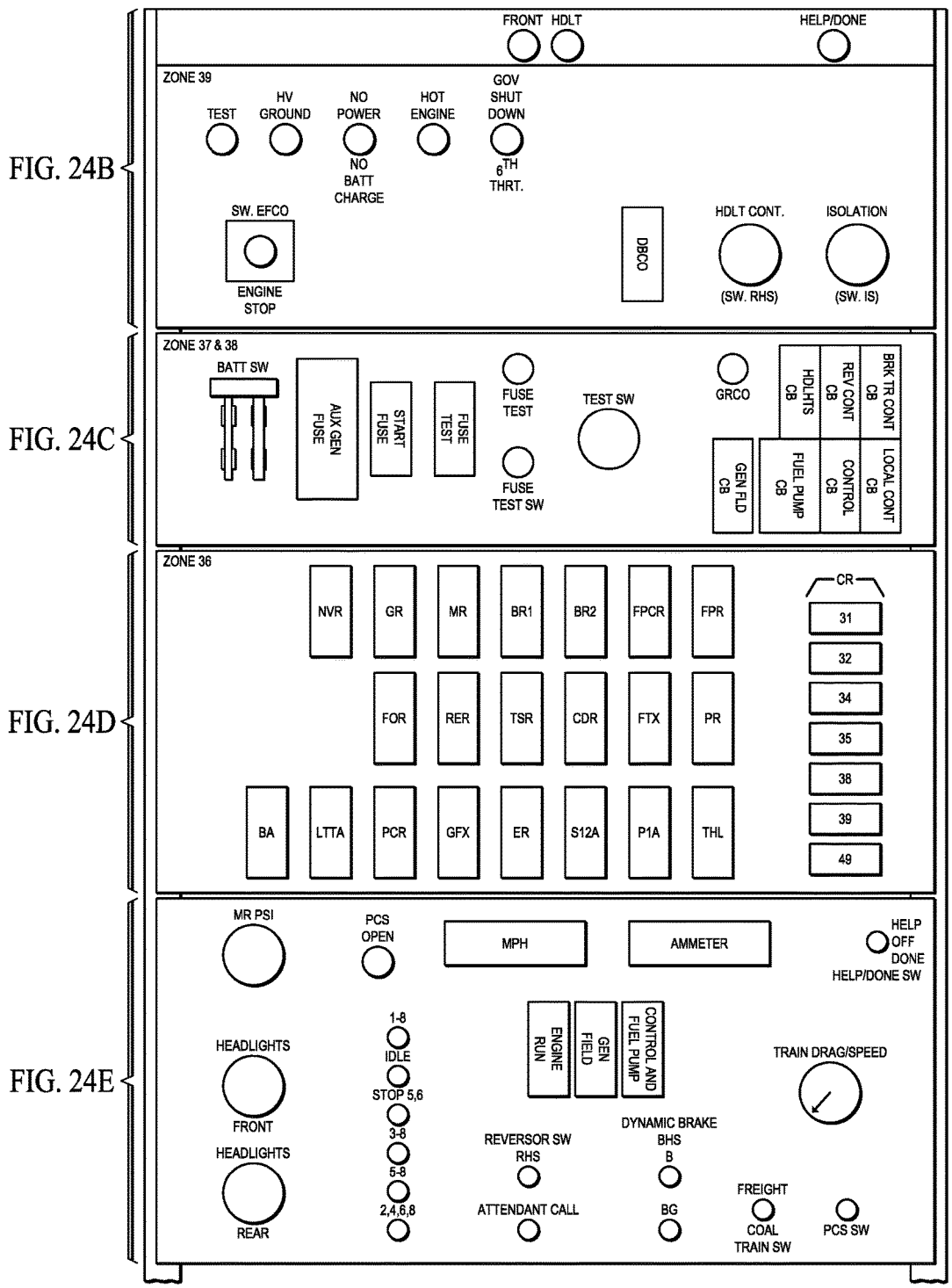
Figure 24B:
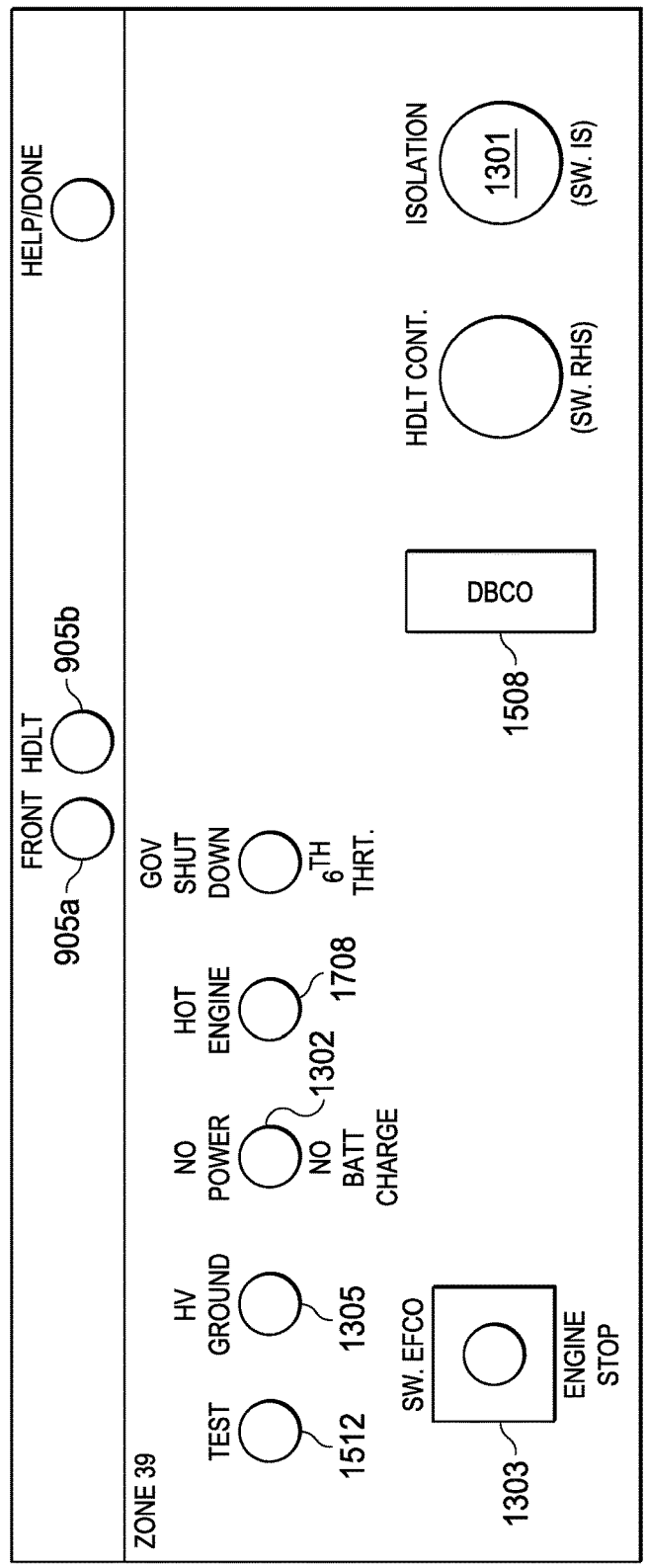
Figure 24C:
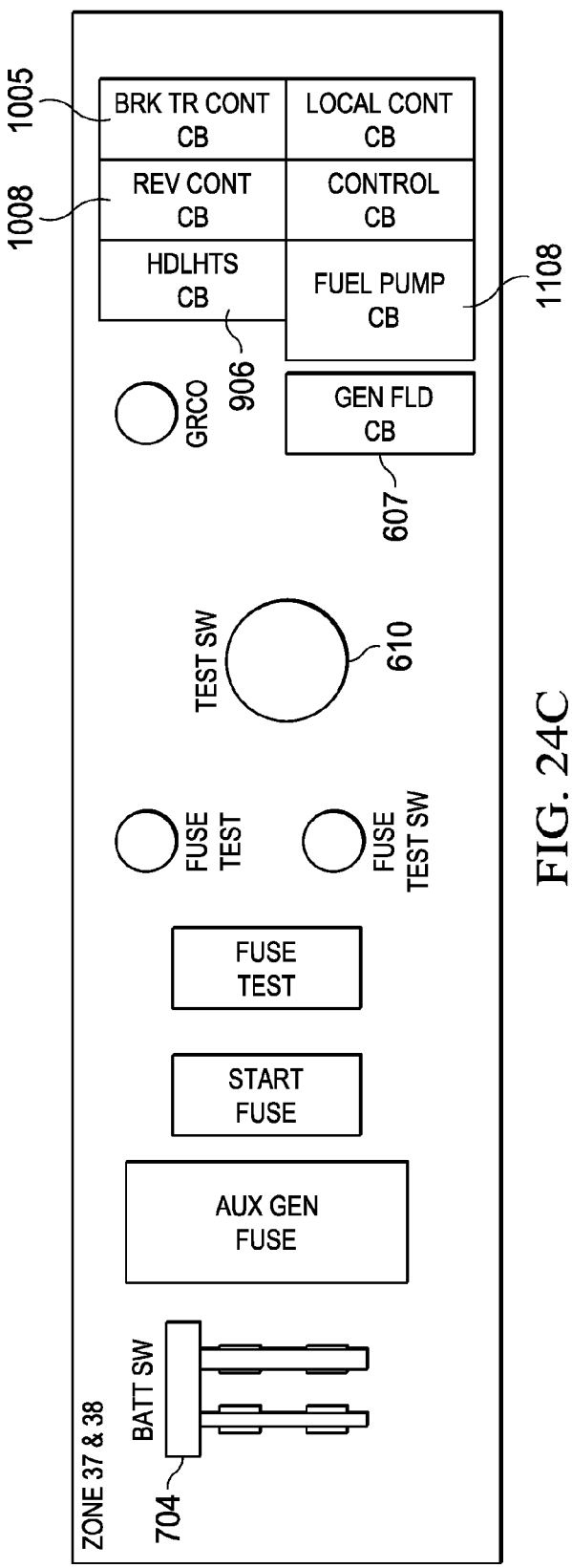
Figure 24E:
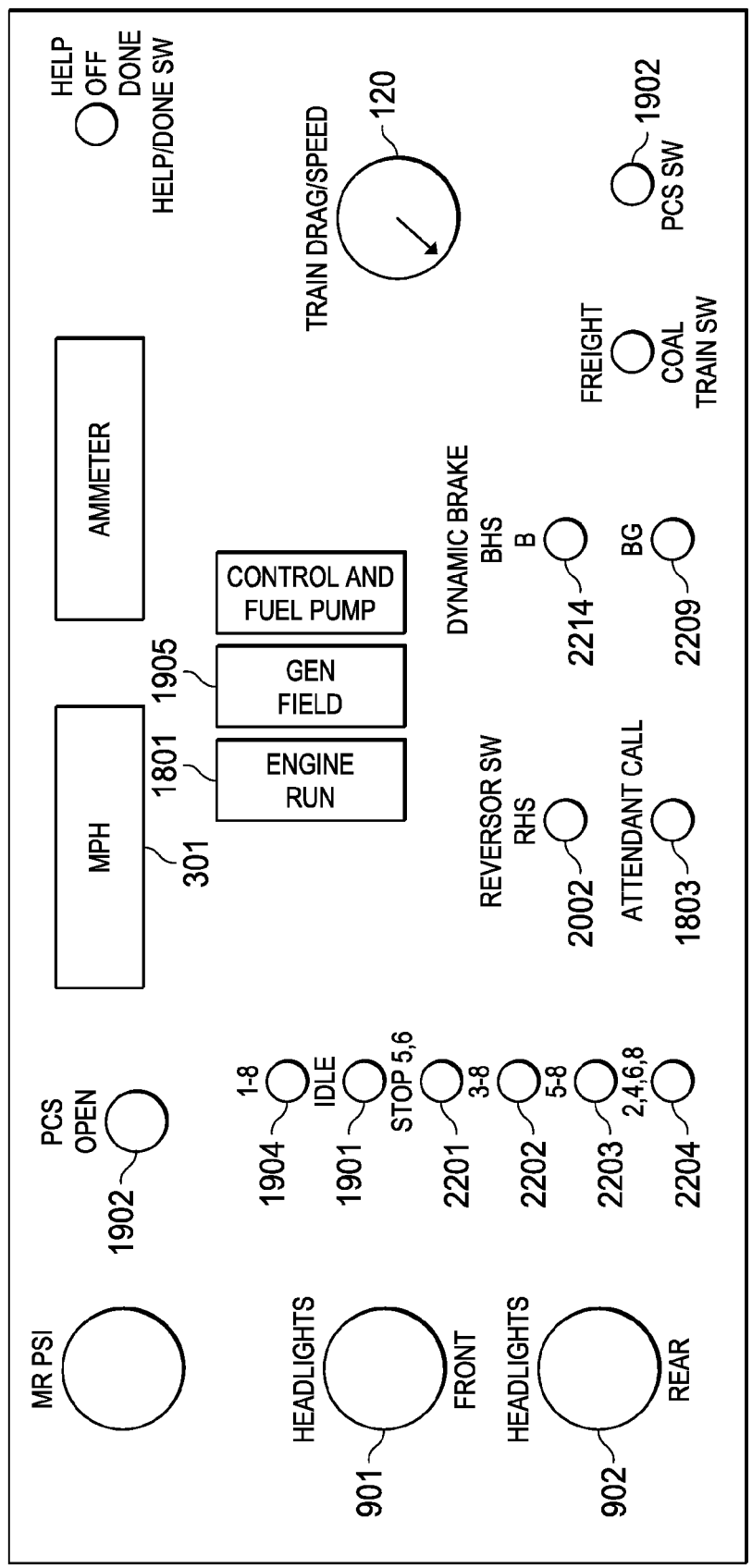
Figure 25A:
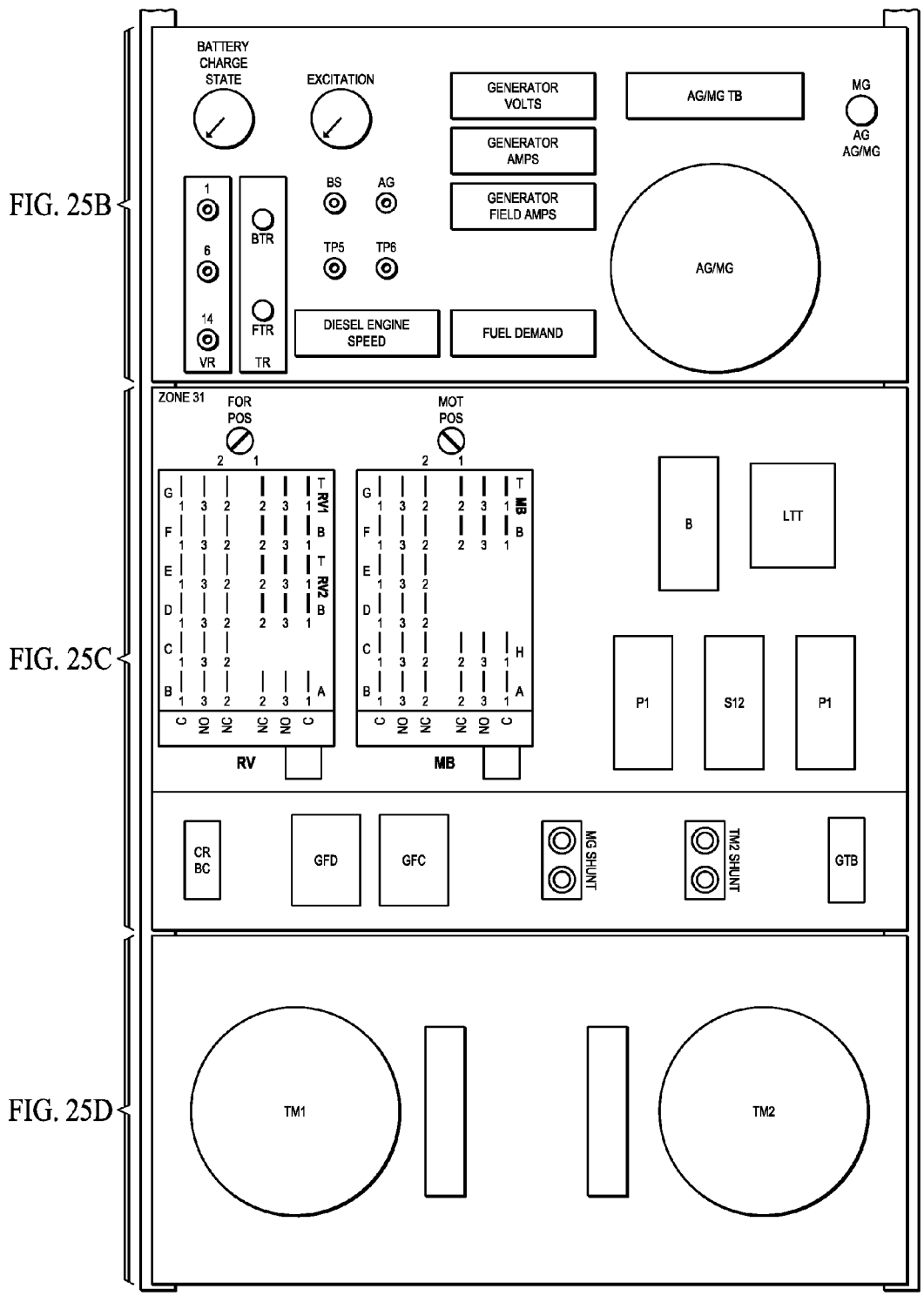
FIGS. 25A-25D are diagrams of the panels of a lower front section of the exemplary training rack.
Figure 25B:
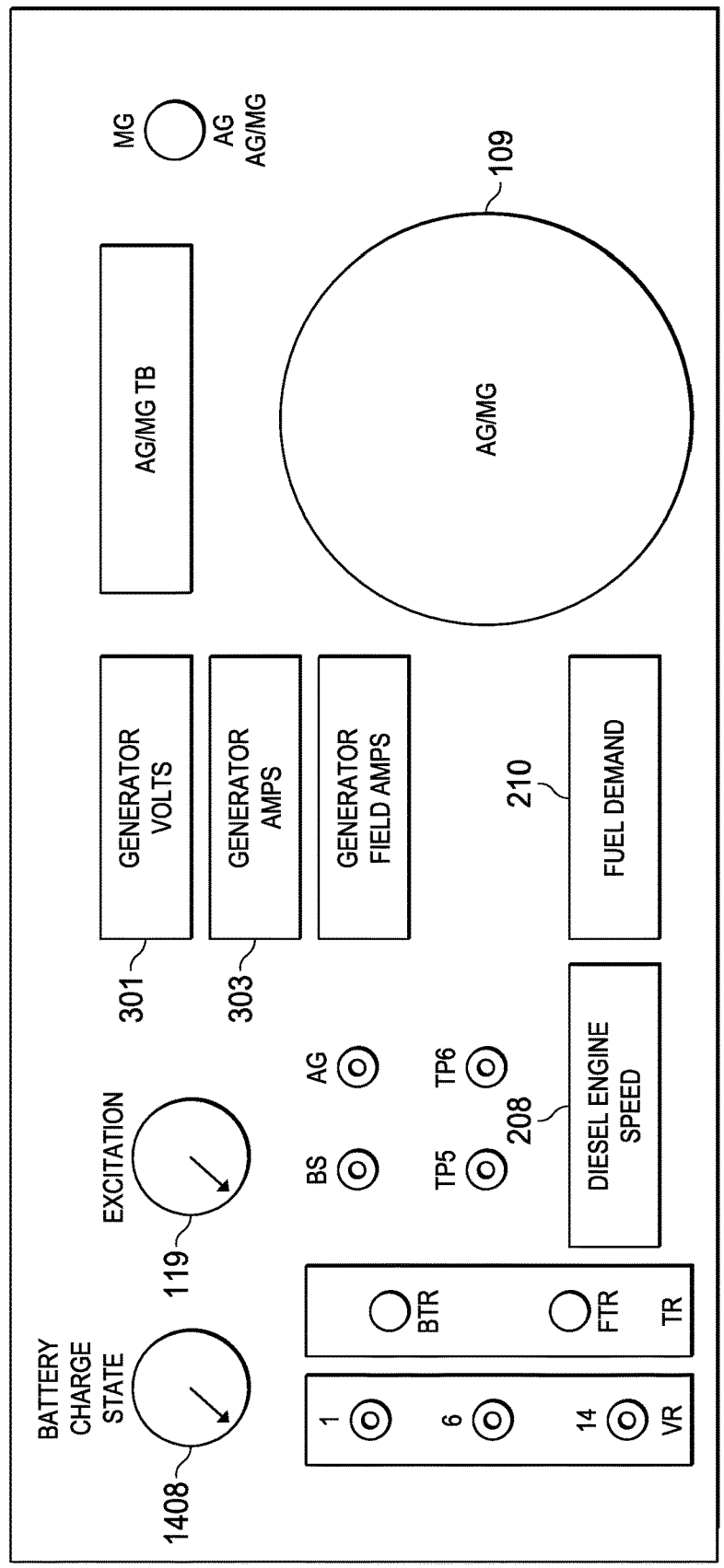
Figure 25C:
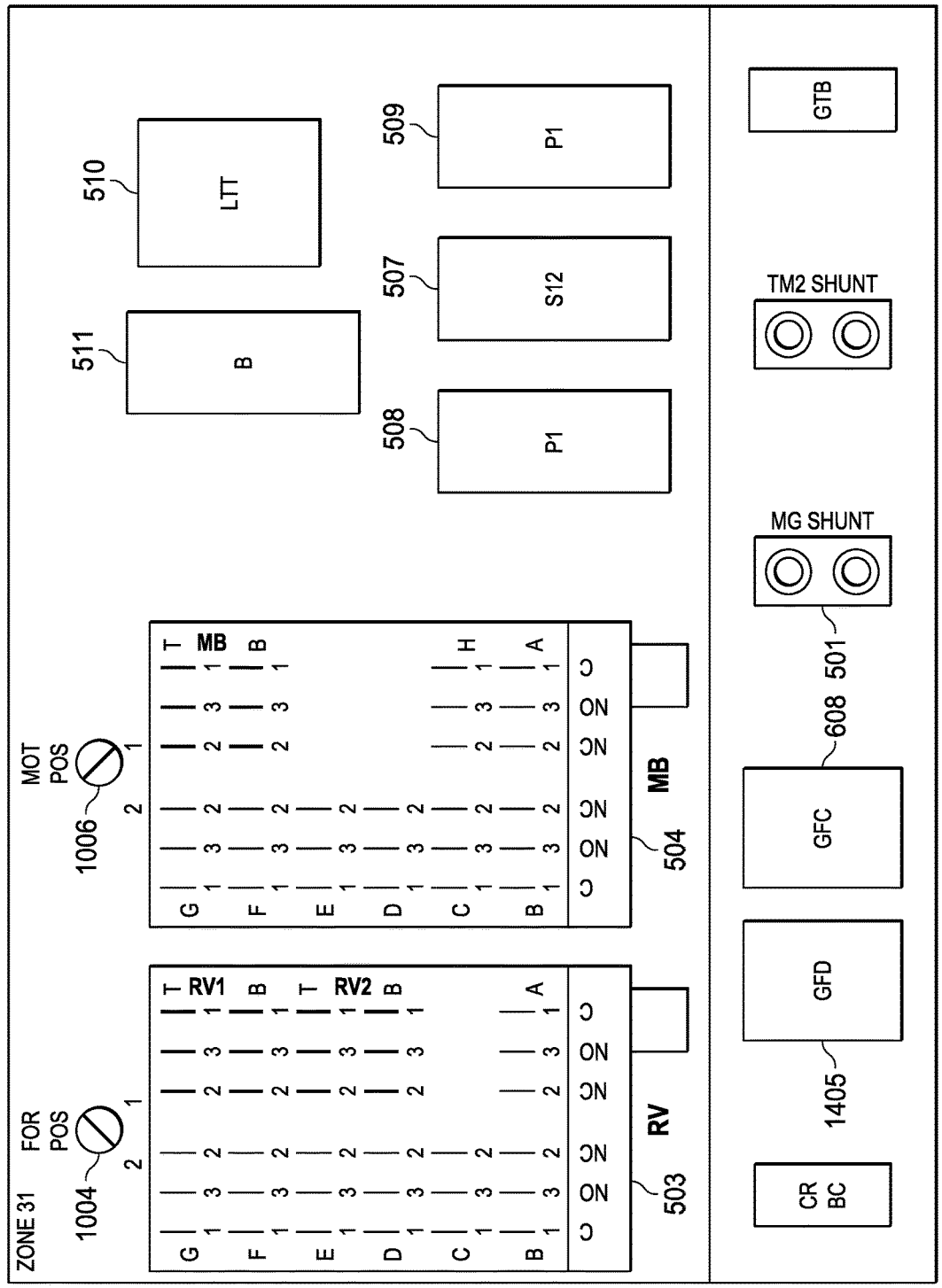
Figure 25D:
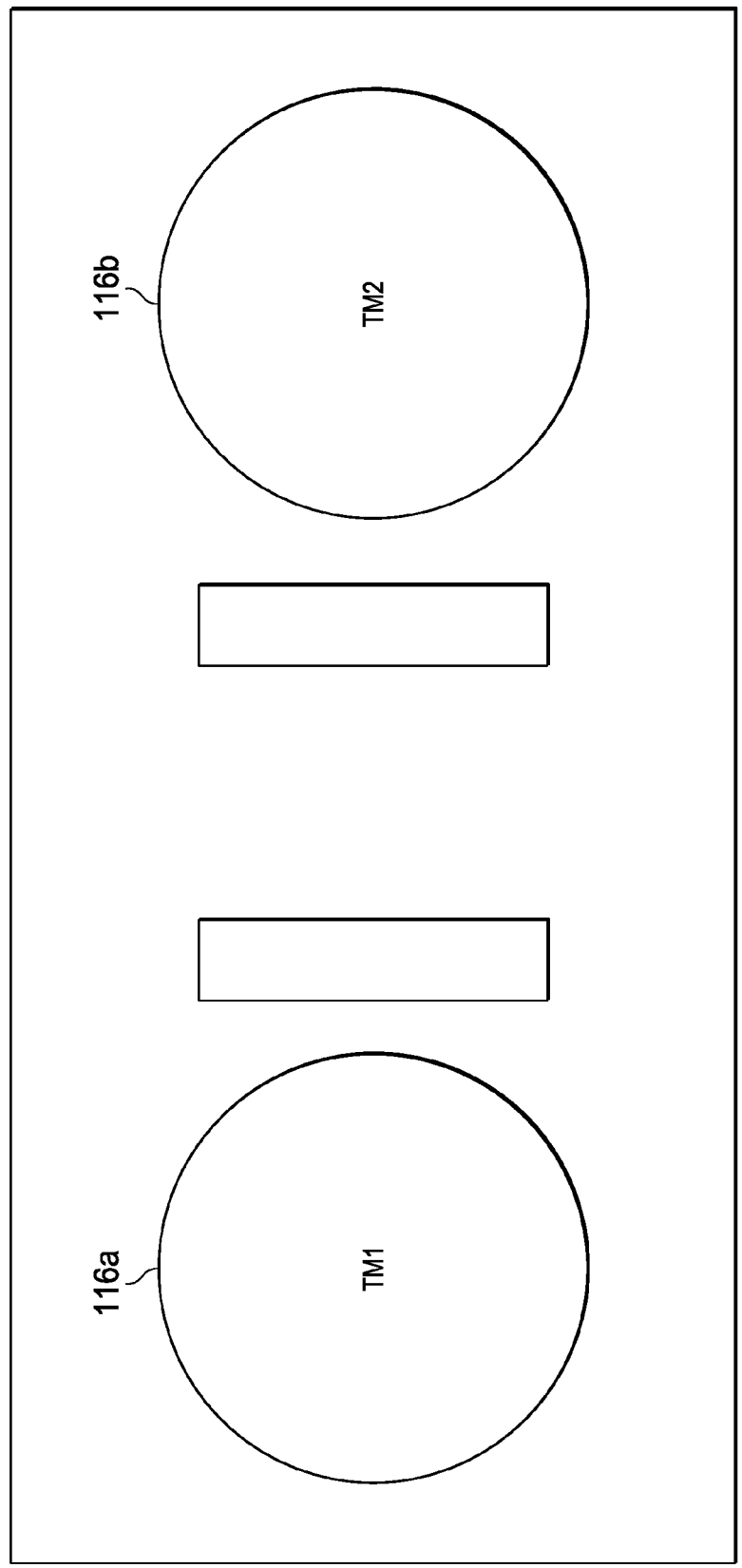
Figure 26A:
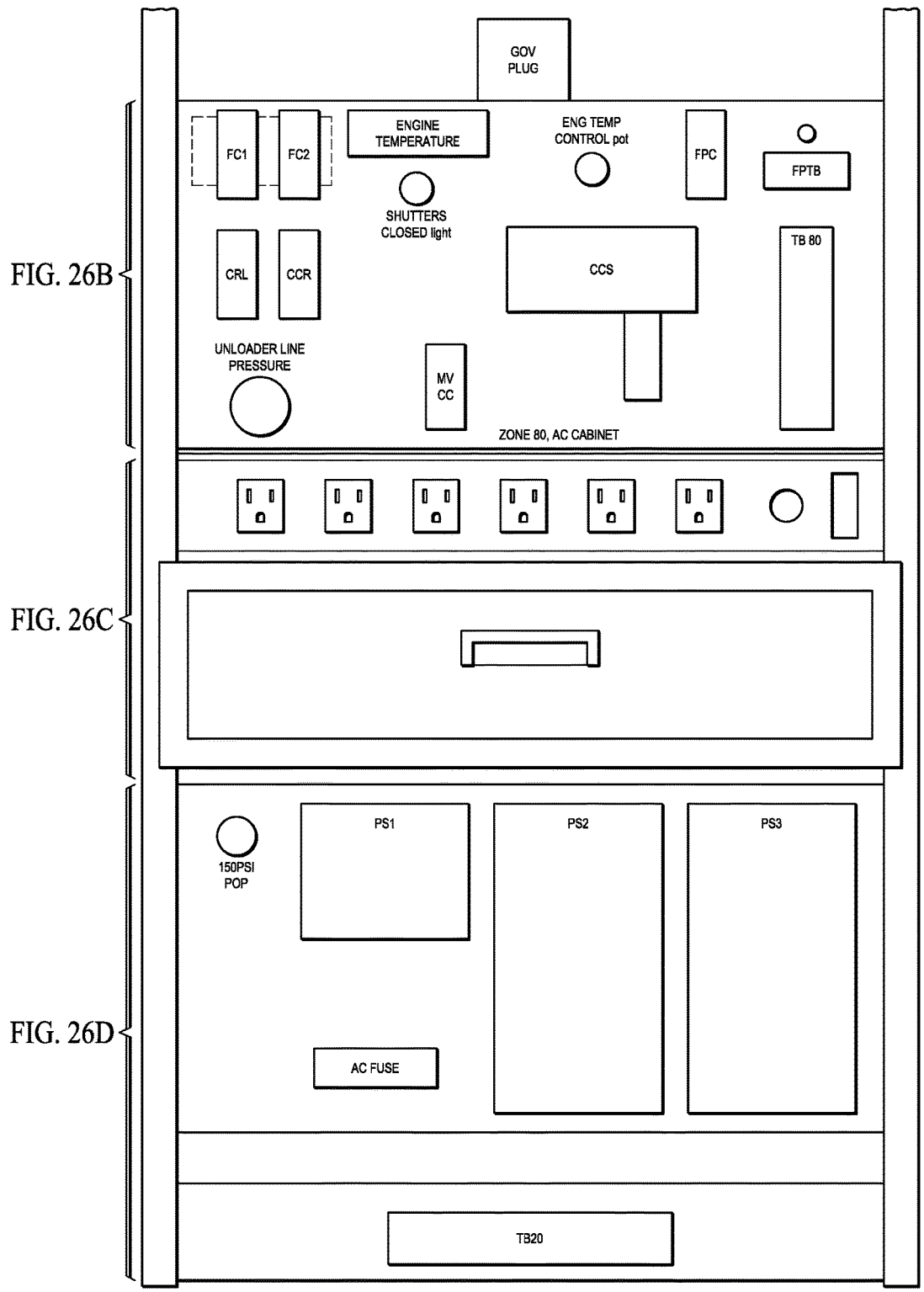
FIGS. 26A-26D are diagrams of the panels of a lower rear section of the exemplary training rack.
Figure 26B:
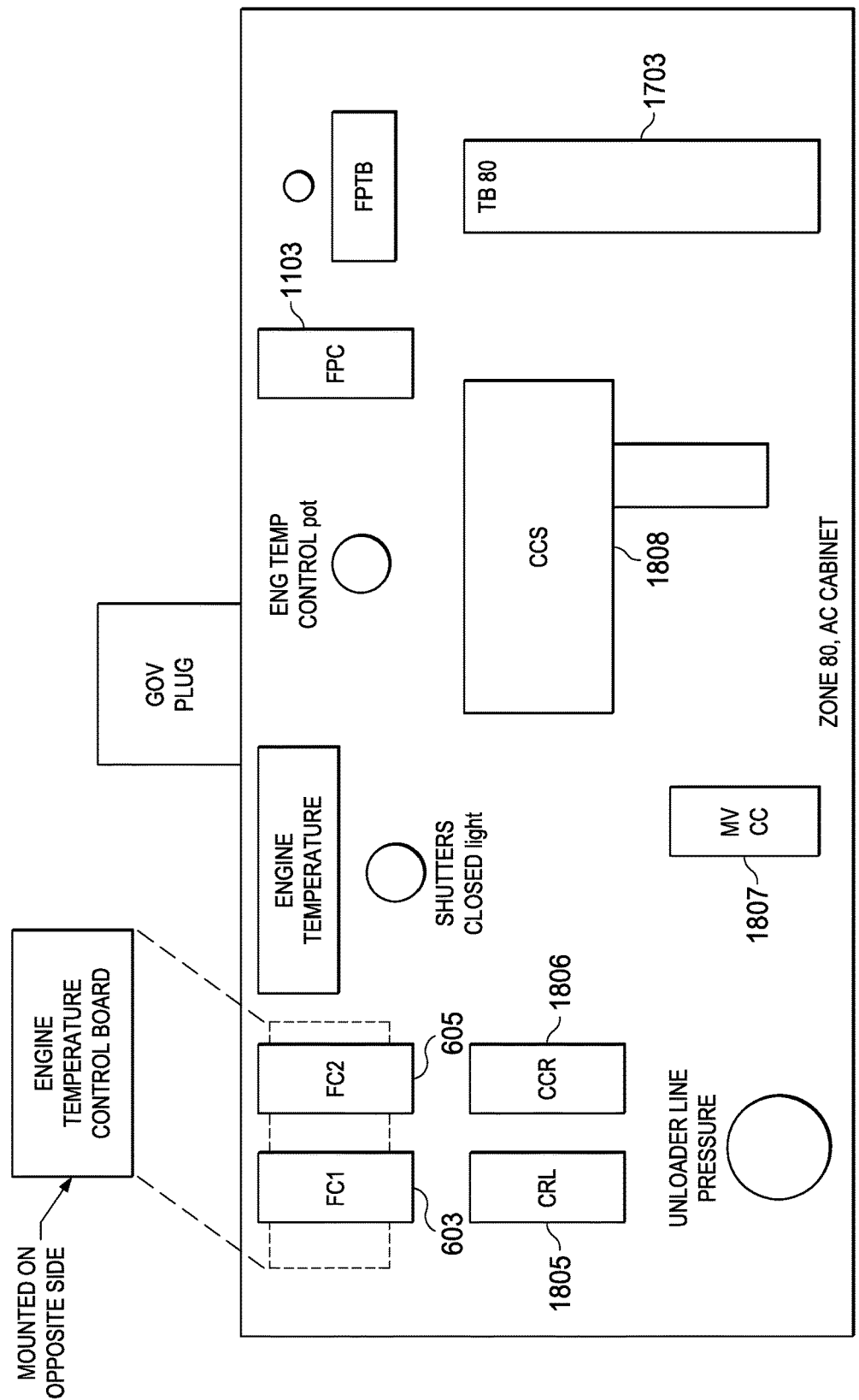
Figure 26C:
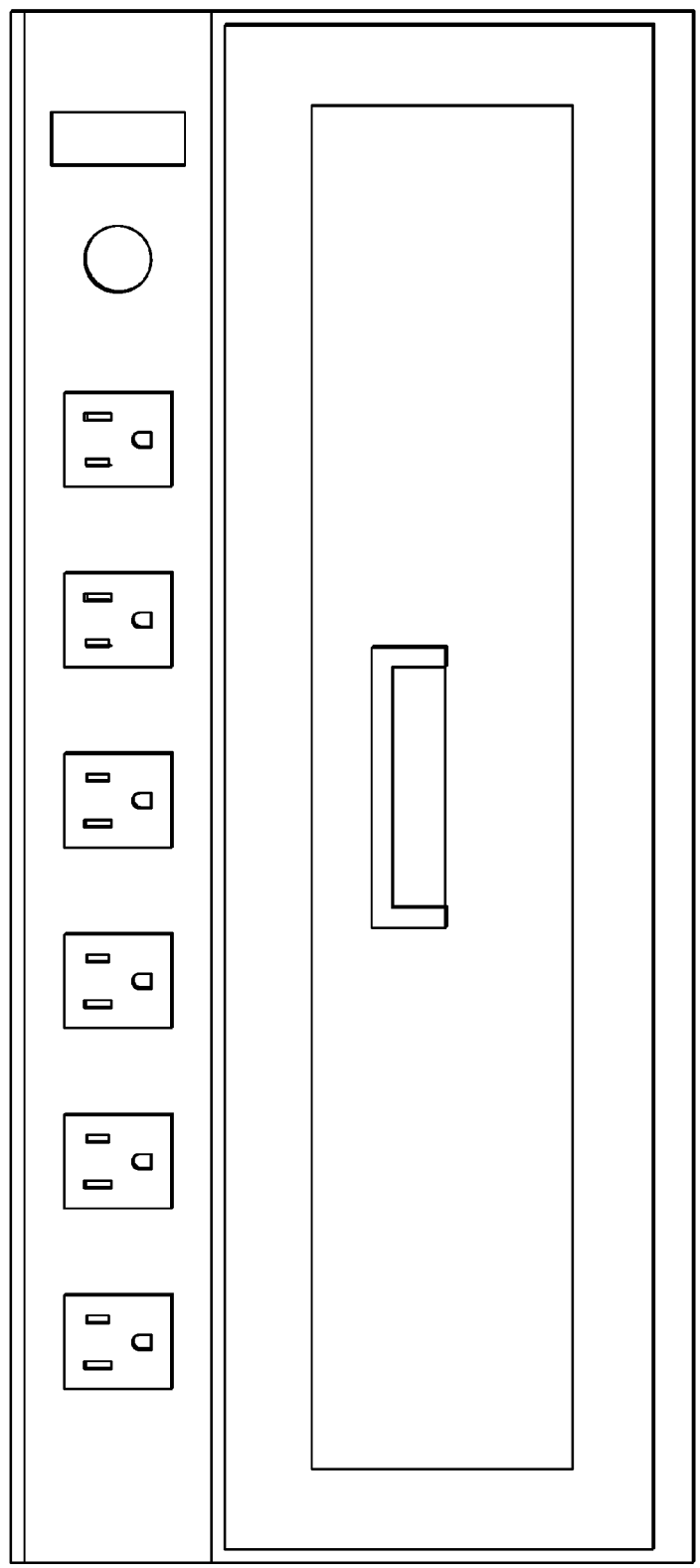
Figure 26D:
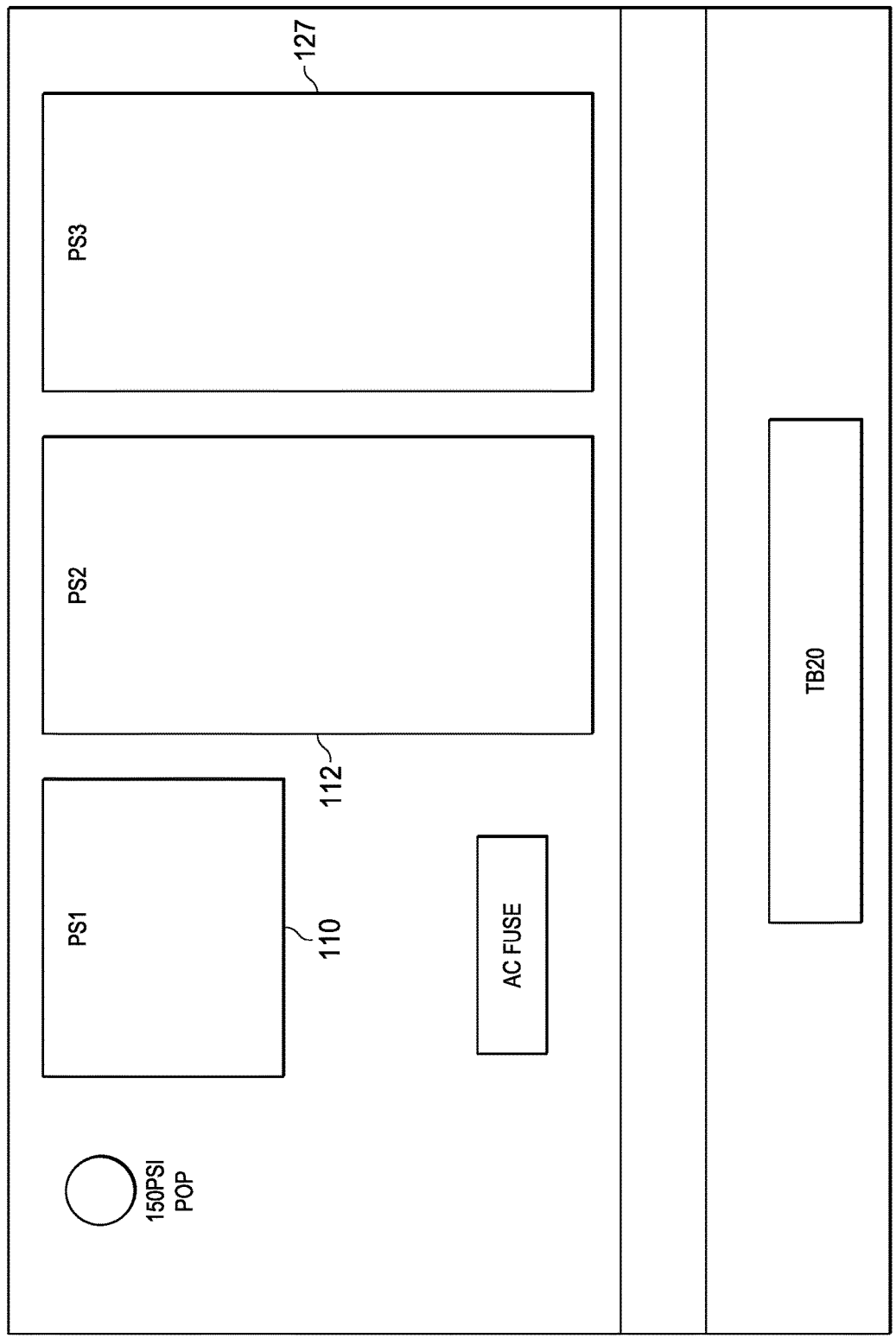

FIG. 23 shows the blind motor control circuitry 105 of FIG. 1 in further detail. As discussed above, during simulated motoring, blind motors 123a and 123b act as generators applying a load to traction motors 116a and 116b. During simulated dynamic braking, blind motors 123a and 123 operate as motors running off of PS3 127. Train drag/speed potentiometer 120 sets the simulated amount of drag applied by the blind motors during motoring and sets the blind motor speed during dynamic braking. In response to the potentiometer setting microprocessor 118 applies a corresponding pulse width modulated signal to the blind motor circuit through PWM driver 122.

When simulator system 100 is in the motoring mode, microprocessor 118 controls the current through the fields of blind motors 123a-123b, which are arranged in a series configuration with PS3 127. When simulator system 100 is in the dynamic braking mode, the power from PS3 127 goes through the fields and armatures of blind motors 123a-123b, which are arranged in a series configuration.

Power/braking switch gear 124a-124b of FIG. 1 includes a multiple-contact auxiliary directional control switch (AREV) 2301 and multiple-contact auxiliary motoring/braking control switch (AMB) 2302. As shown in FIG. 23, the A and B contacts of AREV 2301 are set for forward movement and the A, B and C contacts of AMB 2302 are set for motoring (i.e., blind motors 123a-123b acting as generators).

During simulated motoring, electrical loading is placed on blind motors 123a-123b through switches 128a-128b In FIG. 23, the loading is configured for the intermodal (freight) mode, which is realized with a 50Ω resistor 126 connected to the blind motor armatures. The coal train mode is realized, through switches 128a-128b, with a pair of 1Ω resistors 125a-125b and the A and B contacts of BP relay 2303.

Figure 27A:
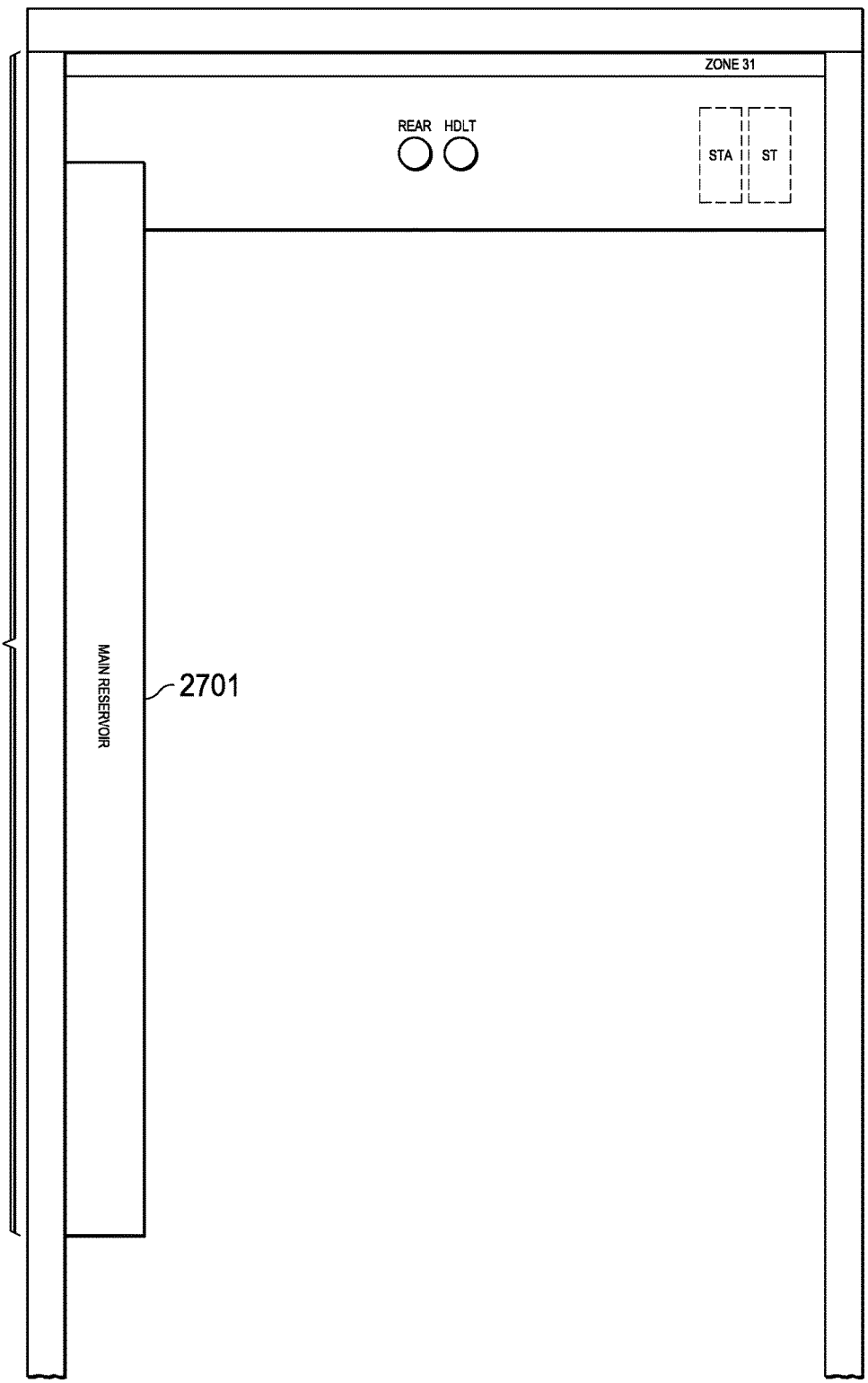
FIGS. 27A-27B are diagrams of the panels of an upper rear section of the exemplary training rack.
Figure 27B:
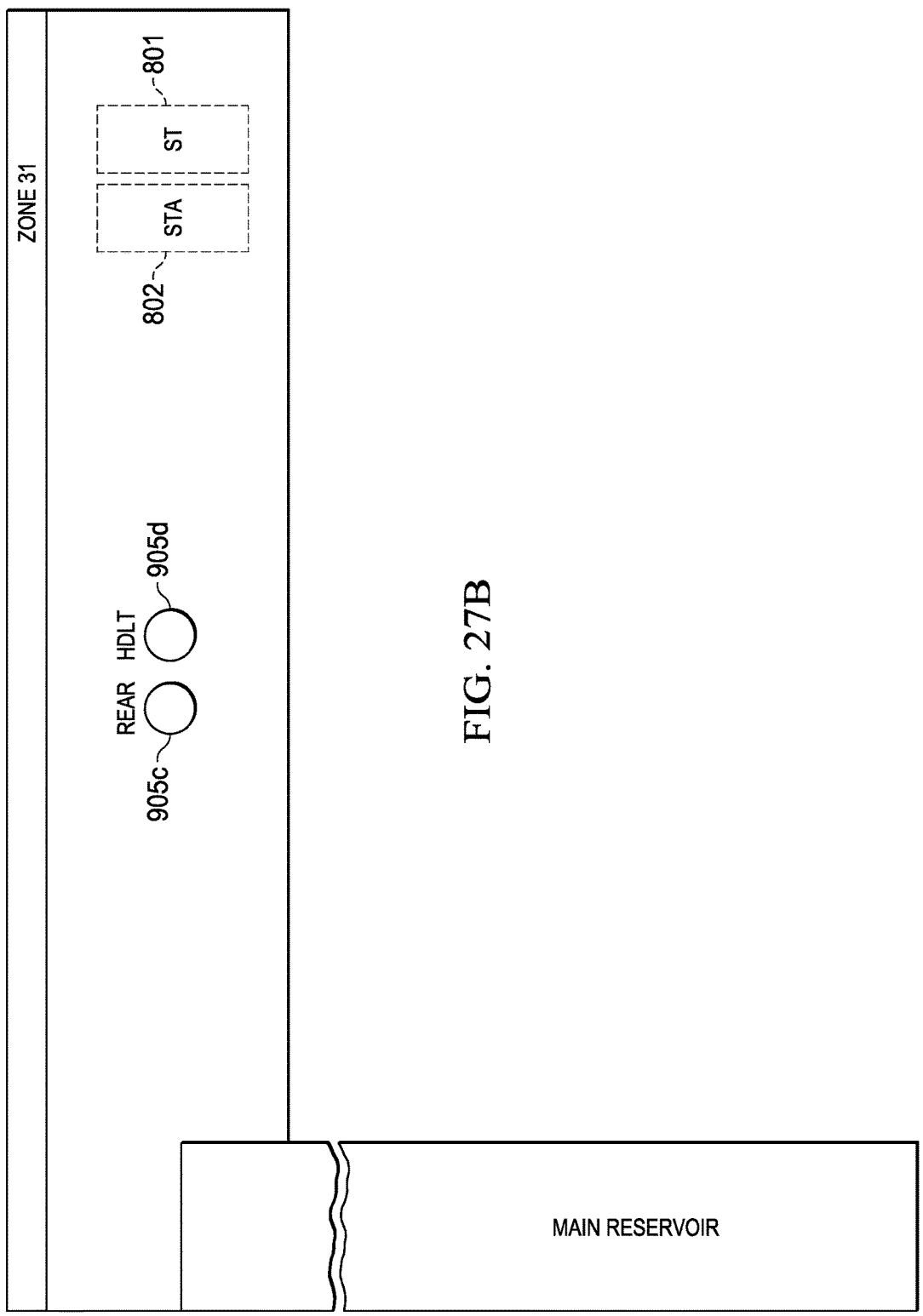
Figure 28A:
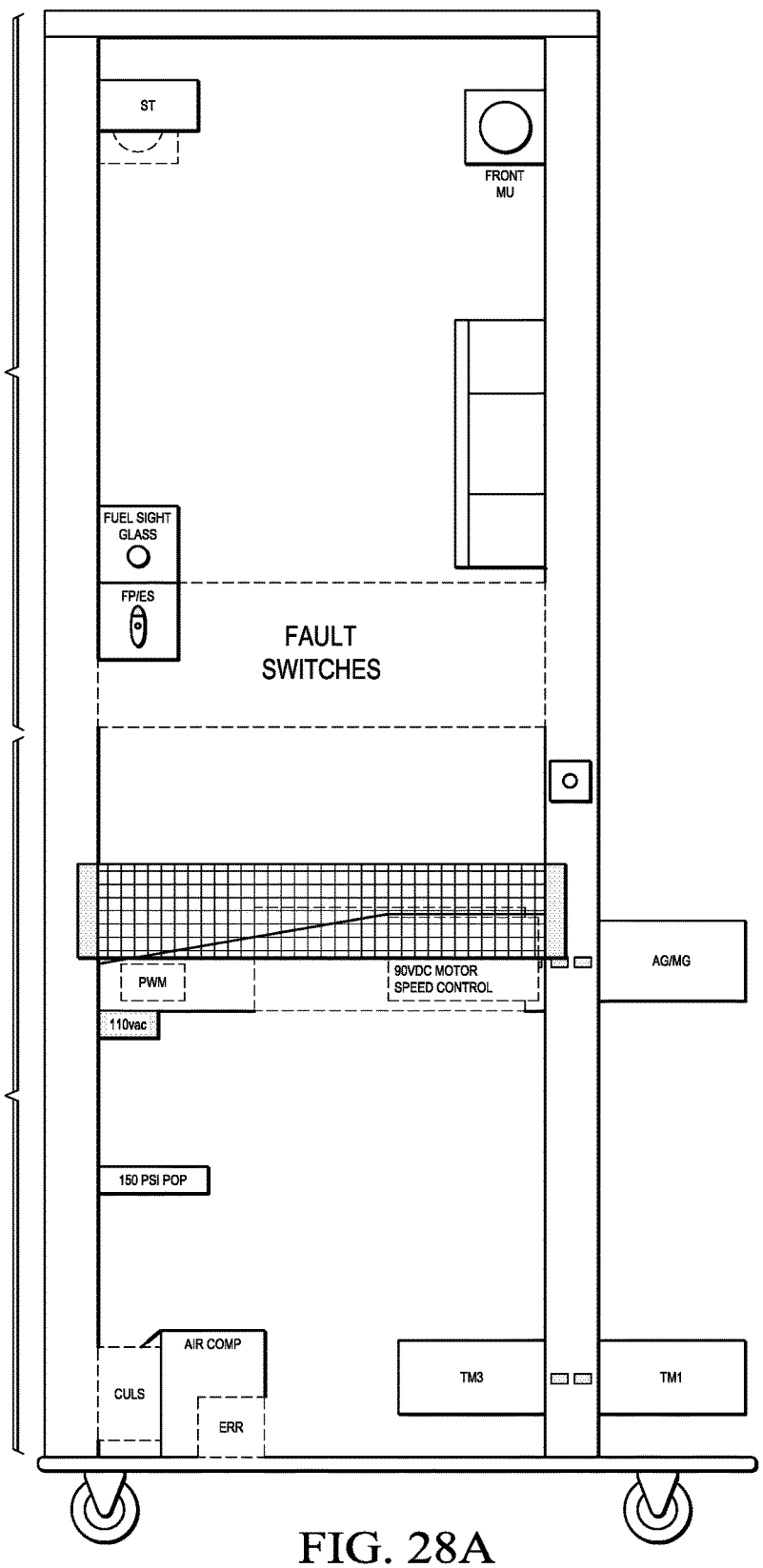
FIGS. 28A-28C are diagrams of the panels of a right side of the exemplary training rack.
Figure 28B:
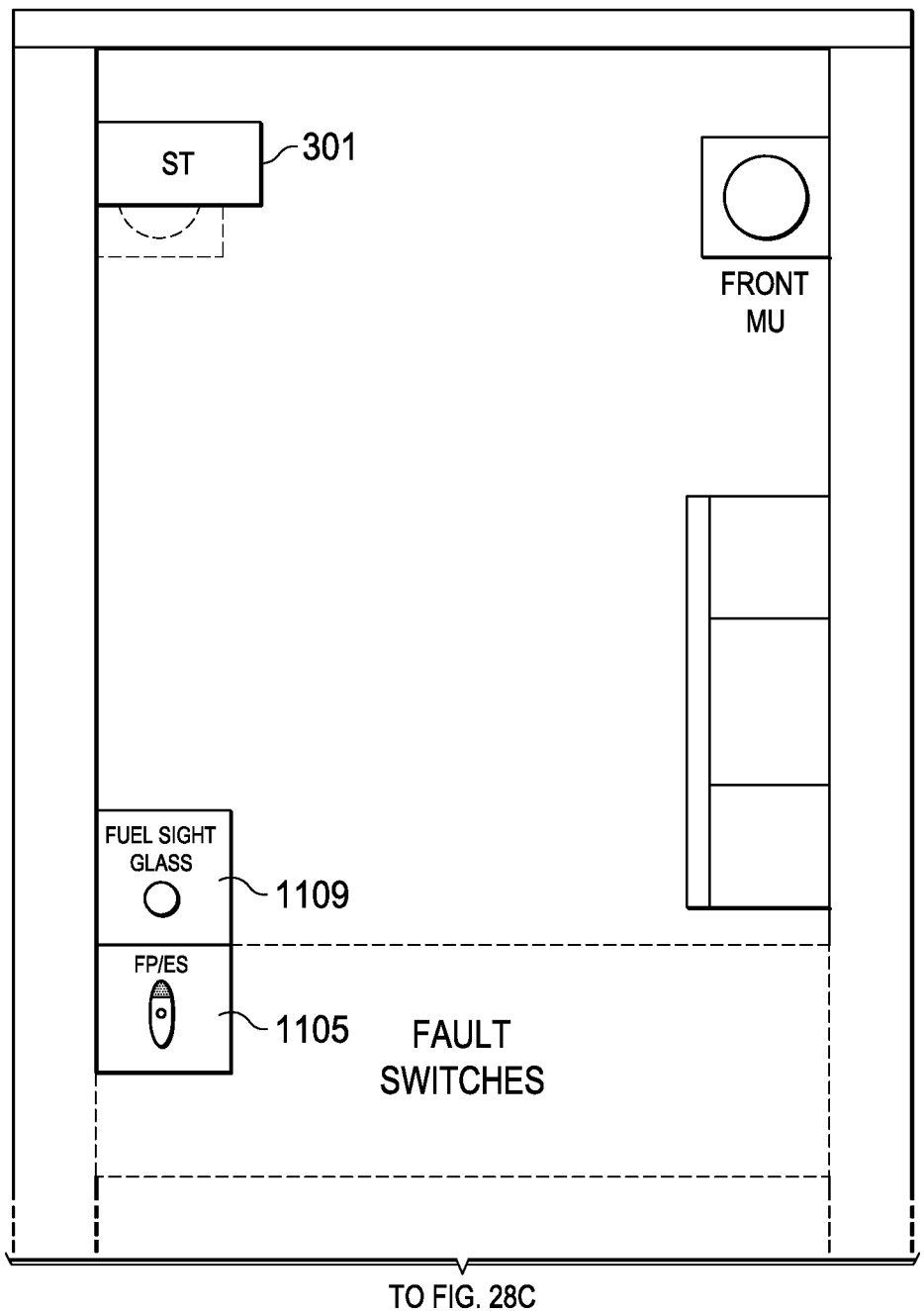
Figure 28C:
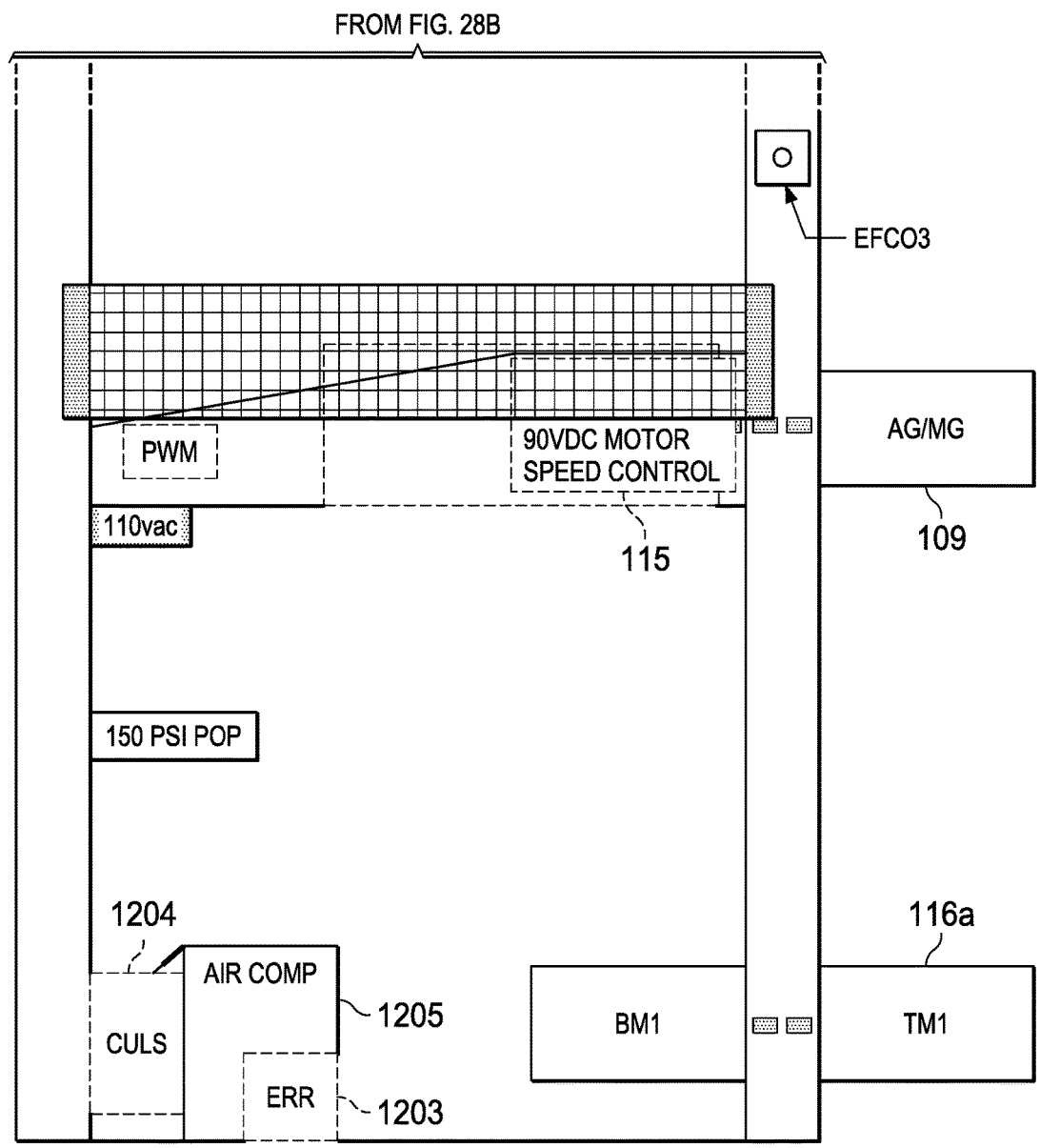
Figure 29A:
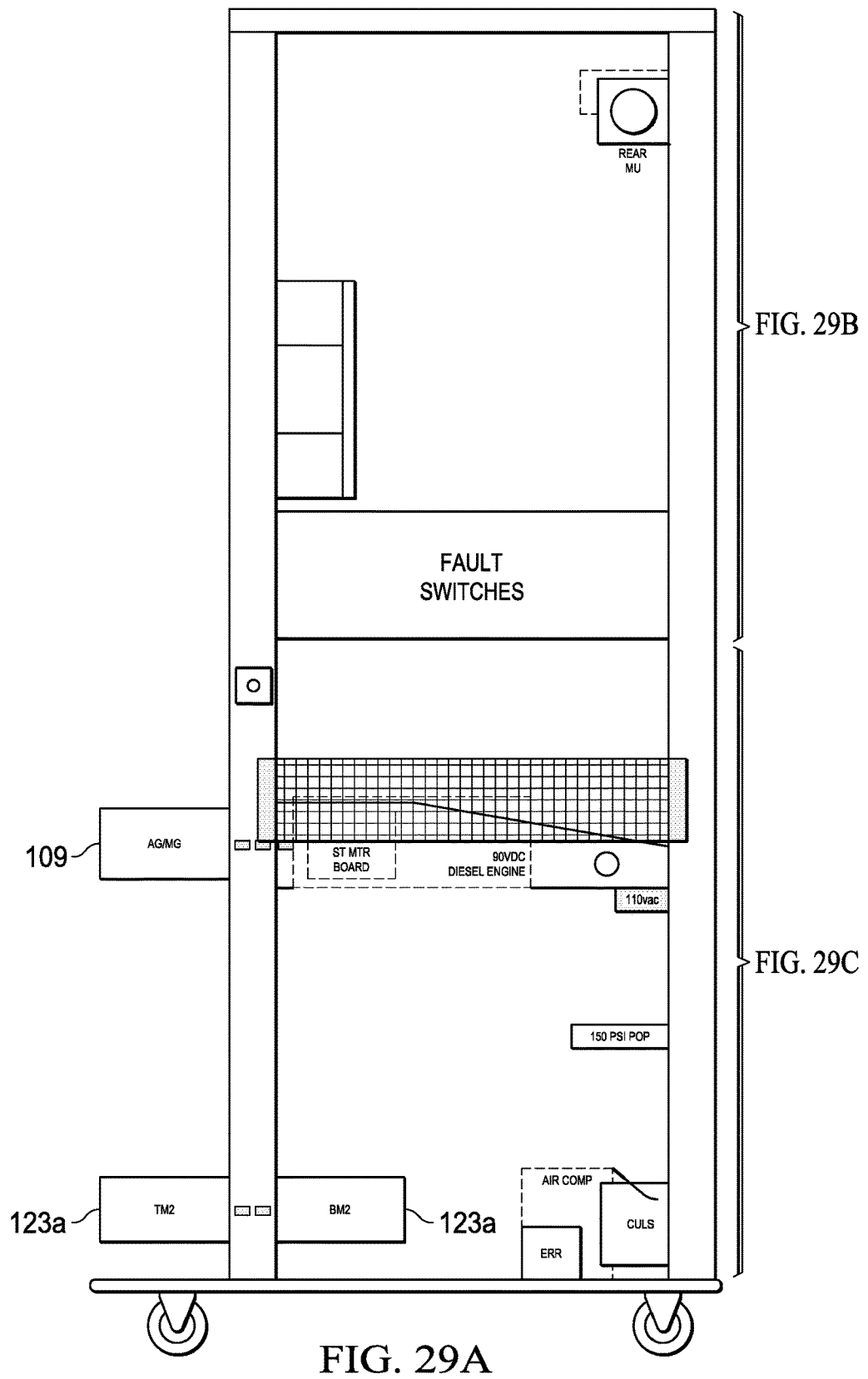
FIGS. 29A-29C are diagrams of the panels of a left side of the exemplary training rack.
Figure 29B:
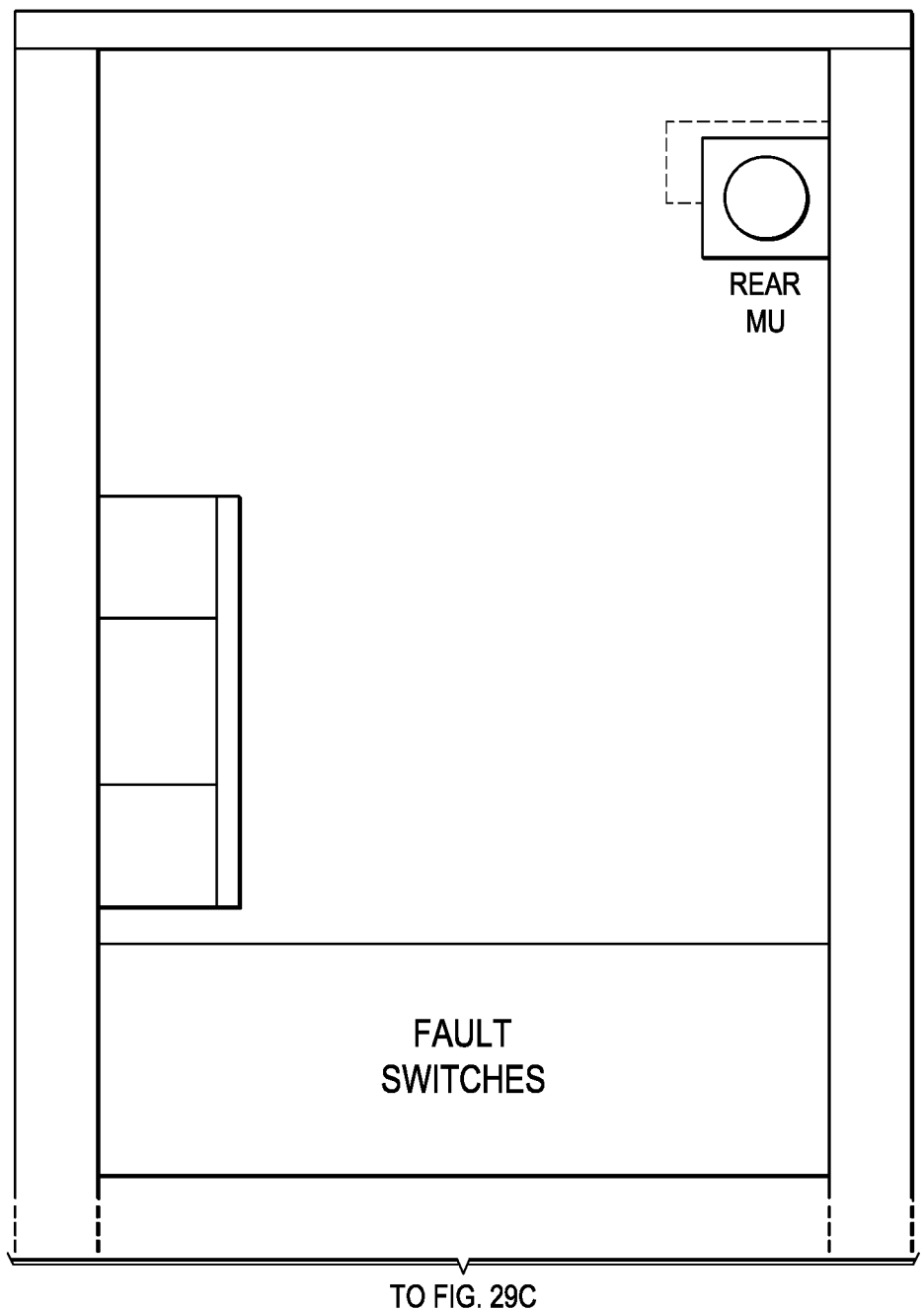
Figure 29C:
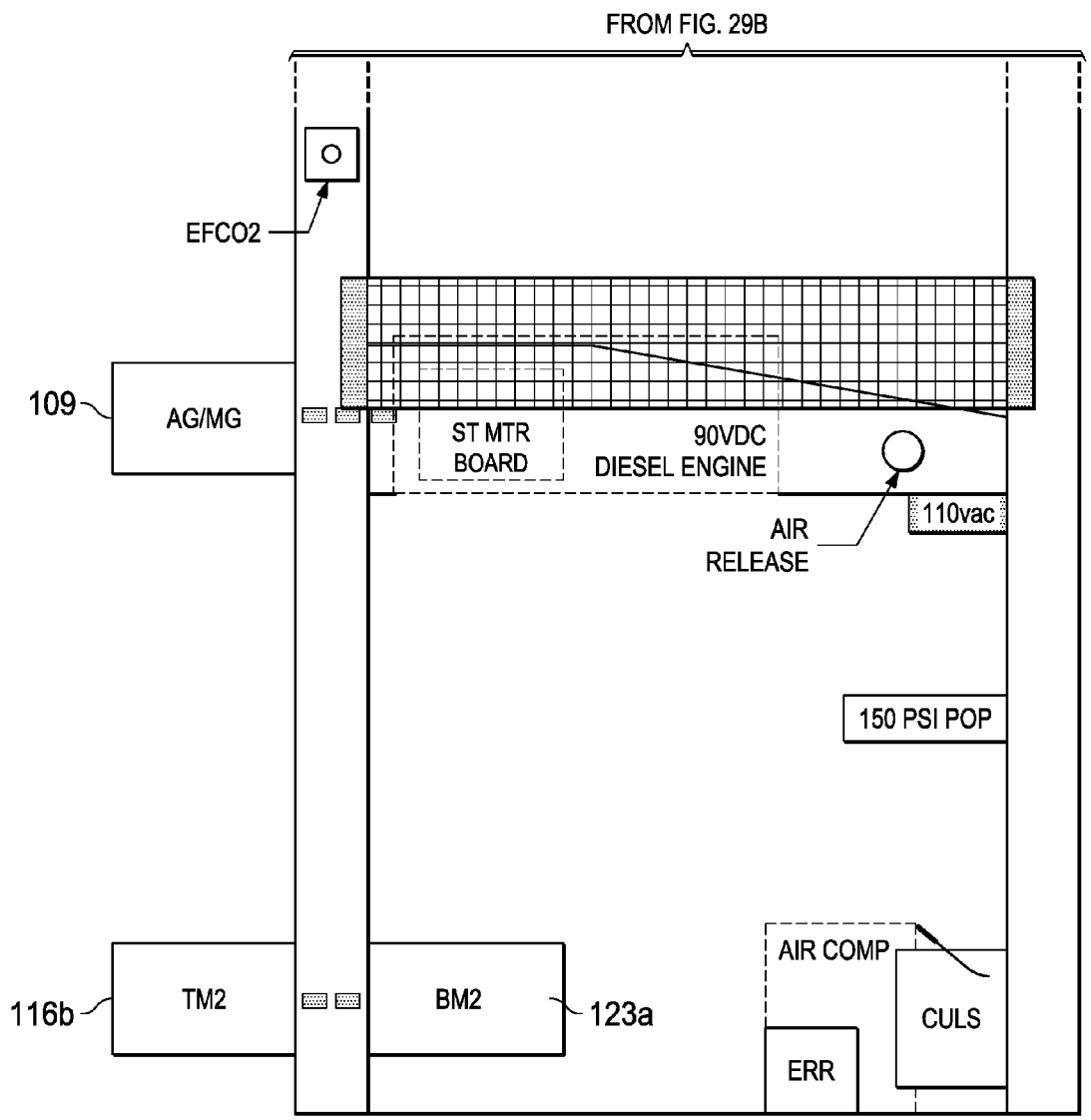

Simulator 100 is preferably assembled as a single rack system, although this is not a strict requirement for practicing the present principles. One particular exemplary rack system and component layout is shown in FIGS. 24-29. In particular, FIGS. 24A-24E show the panels of the upper front section of the exemplary training rack, and FIGS. 25A-25D show the panels of the corresponding lower front section. FIGS. 26A-26D show the panels of the lower rear section of the exemplary training rack, and FIGS. 27A-27B show the panels of the corresponding upper rear section. The panels of a right side of the exemplary training rack are shown in FIGS. 28A-28C and the panels of the left side are shown in FIGS. 29A-28C.

Figure 30:
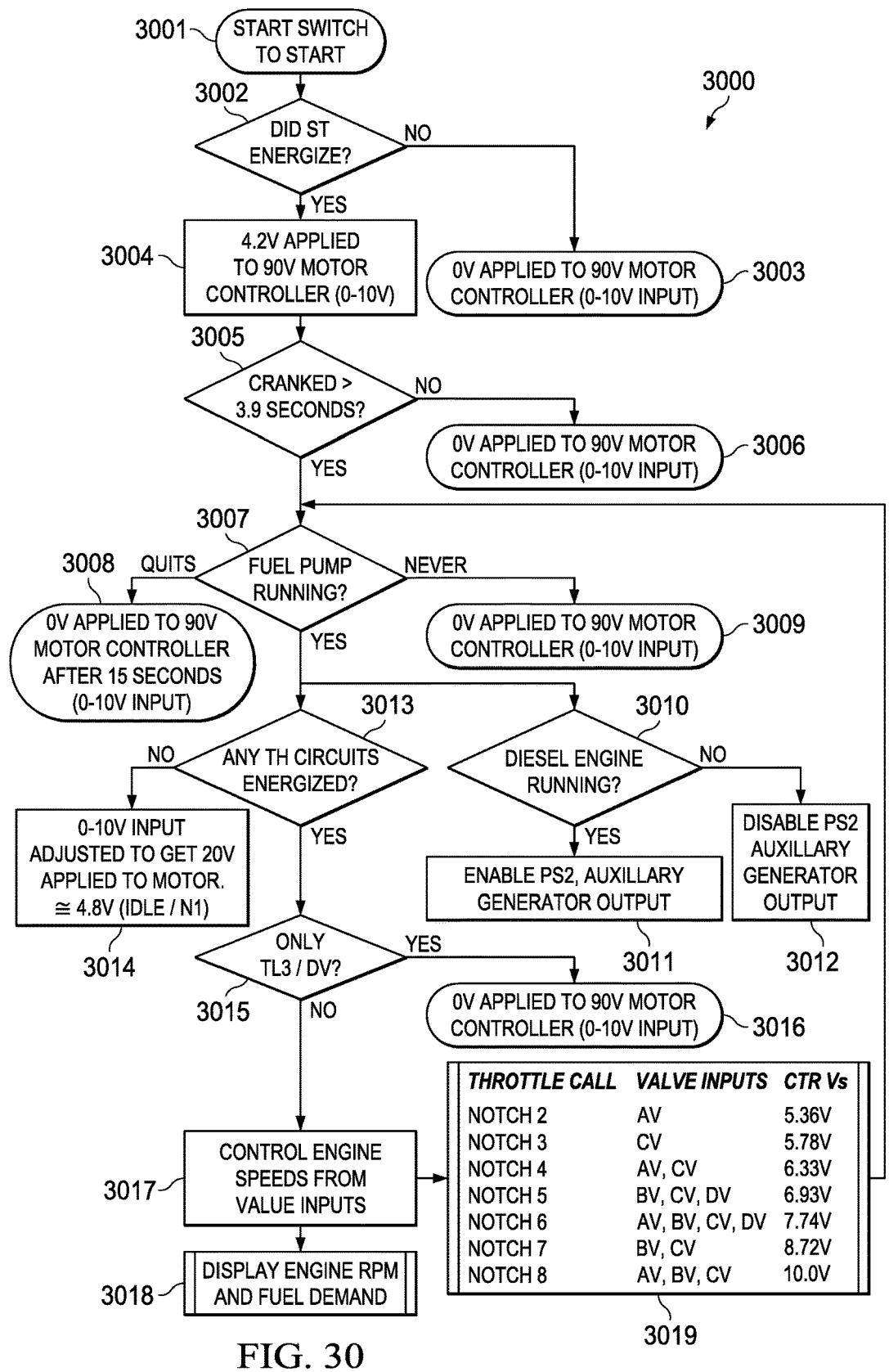
FIG. 30 is a flow chart of an exemplary training procedure for operating the diesel engine speed controls of the simulator system of FIG. 1.

FIG. 30 is a flow chart of a procedure 3000, illustrating simulated diesel engine operations during typical training session using simulator 100. At Block 3001, the engine start switch (FP/ES 1105) is set to the start position. If starting contactor (ST) 205 (FIG. 2) does not energize, then 0 volts are applied to the 0-10 V input of motor speed controller 115 (Block 3003). On the other hand, if starting contactor 205 energizes, then 4.2 volts are applied to the 0-10 V input of motor speed controller 115 (Block 3004).

The 4.2 volts must be applied to DC motor 114 for at least 3.9 seconds, at Block 3005, which simulates the cranking of an actual locomotive diesel engine. If the 4.2 volts are not sustained for at least 3.9 seconds, then 0 volts are applied to the 0-10 V input of motor speed controller 115 (Block 3006).

If the simulated diesel engine successfully cranks, then a determination is made at Block 3007 as to whether the fuel pump is running. If the fuel pump starts, but then quits, then at Block 3008, 0 volts are applied to the 0-10 V input of motor speed controller 115 after a delay of 15 seconds. If the fuel pump never starts, then at Block 3009, 0 volts are applied to the 0-10 V input of motor speed controller 115.

If the fuel pump is operating, then a determination is made at Block 3010 as to whether the simulated diesel engine is running. If the simulated diesel engine is running, then PS2 112 (the auxiliary generator output) is enabled (Block 3011). Otherwise, PS2 112 is disabled (Block 3012).

At Block 3013, a determination is made as to whether any of the throttle handle (TH) circuits are energized (i.e., any of the THS toggle switches are set). If not, then DC motor is in the idle/notch 1 state at Block 3014, and the 0-10 V input to motor speed controller 115 is adjusted to approximately 4.8 V such that DC motor 114 operates with a nominal 20 V input. Otherwise, at Block 3015, a determination is made as to whether only the coil of DV 2208 (FIG. 22A) is activated (i.e., THS Stop, 5, 6 toggle switch 2201 is set.)

If only the coil of DV 2208 is energized, then 0 volts are applied to the 0-10 V input to motor speed controller 115 (Block 3016). Otherwise, the engine speed is controlled using the THS toggle switches at Blocks 3017 and 3018. At Block 3018, the speed of the emulated diesel engine (i.e., DC motor 114) is displayed on display 208 and the simulated fuel demand is displayed on display 210 (FIG. 2).

Figure 31:
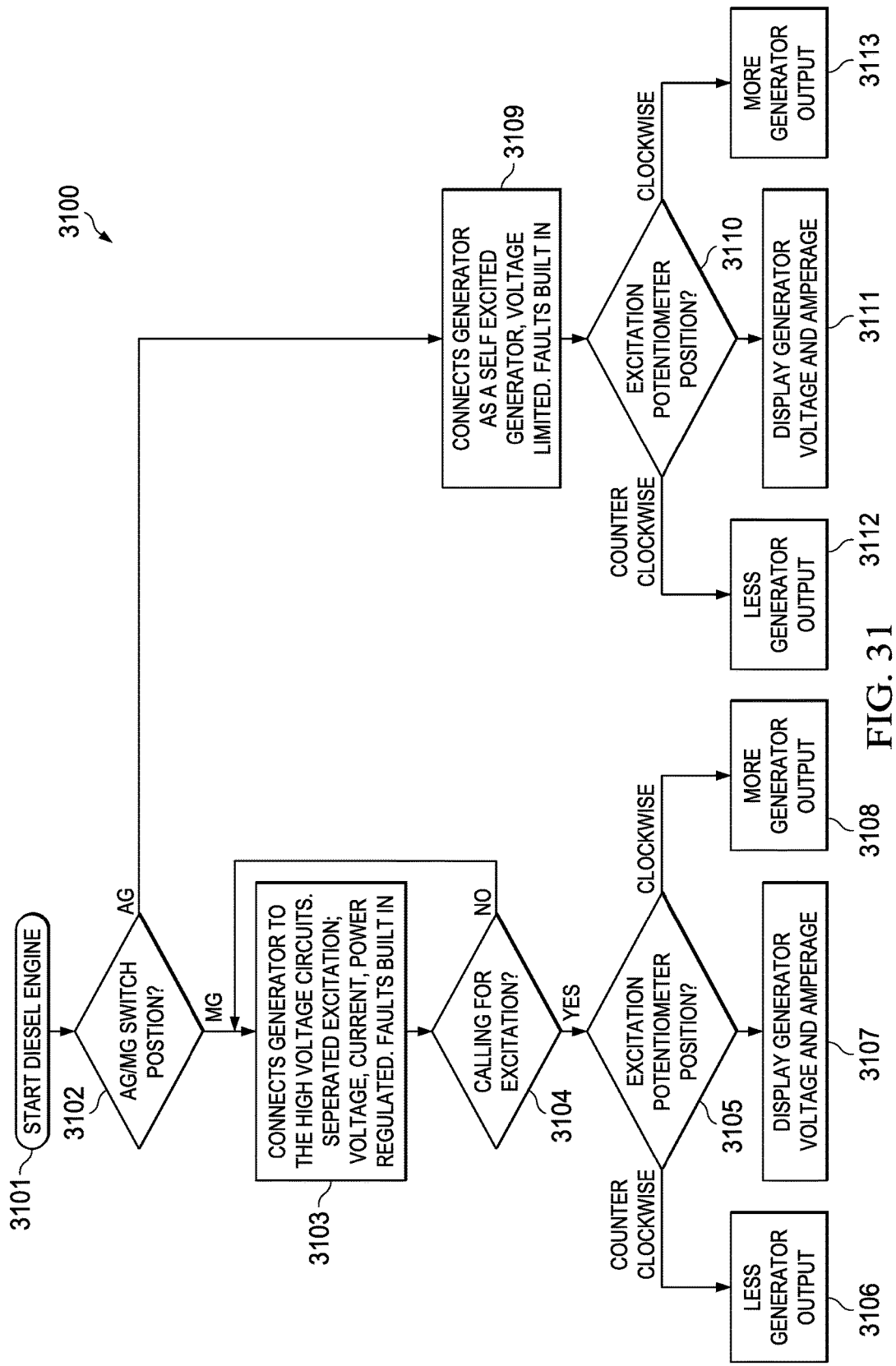
FIG. 31 is a flow chart of an exemplary training procedure for operating the emulated dual auxiliary generator/main generator of the simulator system of FIG. 1.

Procedure 3100 of FIG. 31 illustrates exemplary dual auxiliary/main generator 107 operations during typical training sessions using simulator 100. At Block 3101, the simulated diesel engine starting operations are executed, similar to those discussed above in conjunction with FIG. 30. The position of AG/MG switch 109 is then set for either main generator (MG) operations or auxiliary generator (AG) operations at Block 3102.

When MG operations are selected, dual auxiliary generator/main generator 107 is connected to the high voltage circuits, as shown in FIGS. 5A-5B, and configured for separate excitation (Block 3103). The generator output voltage, current, and power is regulated, and the instructor enables any built-in faults for troubleshooting by the student.

During MG operations, procedure 3100 loops-back to Block 3103 until there is a call for main generator excitation at Block 3104. The position of excitation potentiometer 119 (FIG. 1) is checked at Block 3105. If less main generator output is required, then potentiometer 119 is turned in the counter-clockwise direction (Block 3106). If more main generator output is required, then potentiometer 119 is turned in the clockwise direction (Block 3108). The generator voltage is displayed, at Block 3107, on generator voltage display 301 and the corresponding amperage on generator amperage display 303 (FIG. 3).

When AG/MG switch 109 is set for AG operations, at Block 3102, then at Block 3109, dual auxiliary generator/main generator 107 is connected as a self-exciting generator, with the output voltage limited. The instructor enables any built-in faults for troubleshooting training by the student.

At Block 3110, the position of excitation potentiometer 119 is checked. If less auxiliary generator output is required, then potentiometer 119 is turned in the counter-clockwise direction (Block 3112). If more auxiliary generator output is required, then potentiometer 119 is turned in the clockwise direction (Block 3113). The generator voltage is displayed, at Block 3111, on generator voltage display 301 and the corresponding amperage on generator amperage display 303.

Figure 32:
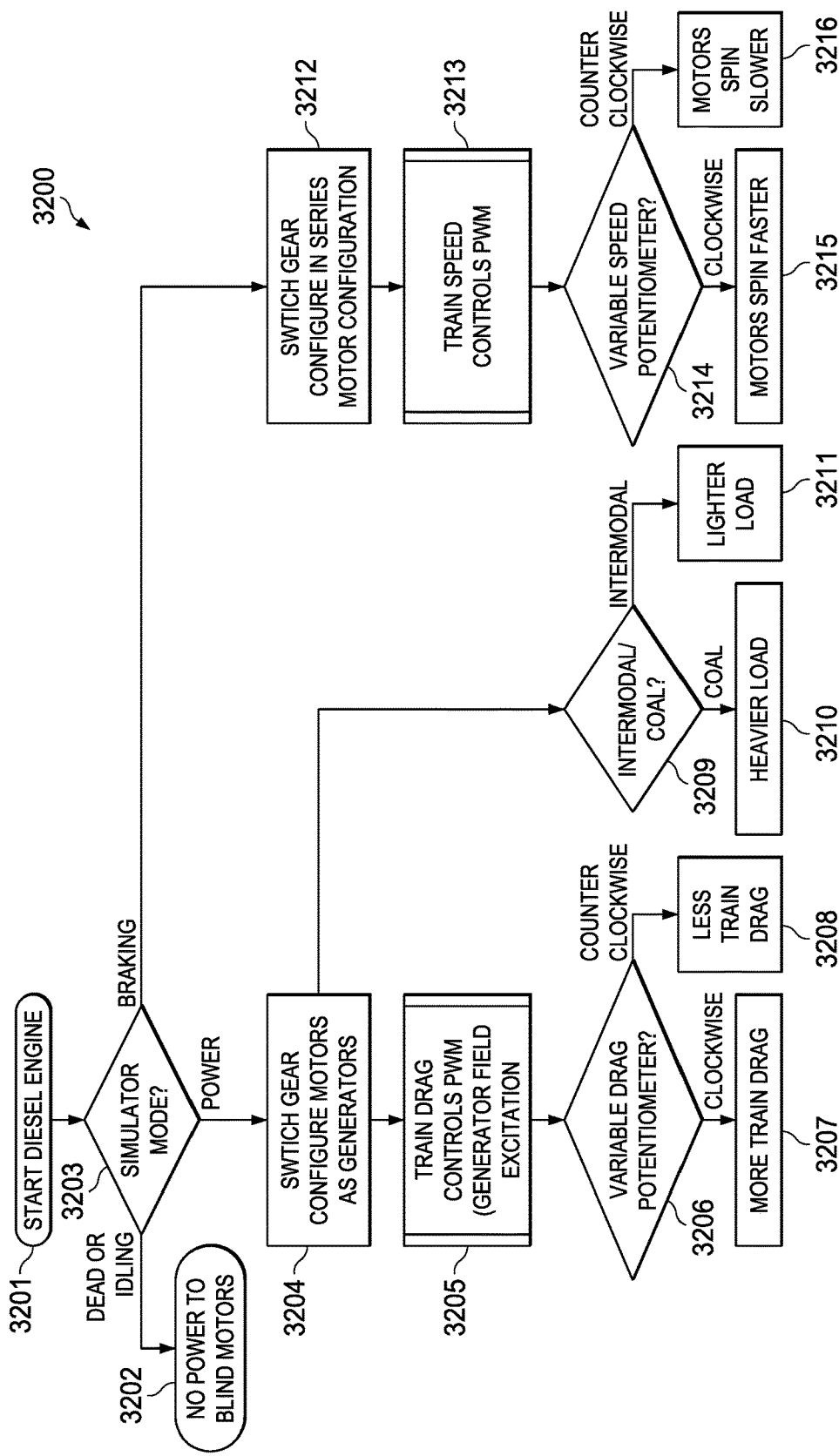
FIG. 32 is a flow chart of an exemplary training procedure for controlling the blind motors of the simulator system of FIG. 1.

Procedure 3200 of FIG. 32 illustrates typical operations of blind motor circuitry 105 during the operation of simulator 100. At Block 3201, the simulated diesel engine starting operations are executed, similar to those discussed above in conjunction with FIG. 30. If the simulated diesel engine is in a dead (stopped) or idling state, then no power is provided to blind motors 116a-116b. Otherwise, at Block 3203, a determination is made as to whether simulator 100 is operating in the simulated power (motoring) mode or in the simulated braking mode.

In the simulated power (motoring) mode, at Block 3204, switch gear 124a-124b (FIGS. 1 and 23) configures blind motors 116a-116b as generators. At Block 3205, the train drag is controlled by train drag/speed potentiometer 120 and microprocessor 118, which provide a PWM signal to the fields of blind motors 116a-116b. More specifically, if at Block 3206, more train drag is required, then potentiometer 120 is moved in the clockwise direction (Block 3207). If less train drag is required, then potentiometer 120 is moved in the counter-clockwise direction (Block 3208).

At Block 3209, the simulated train loading is selected using switches 126 and 128 (FIGS. 1 and 23). For a simulated coal train, a heavier electrical load is applied to the generator outputs of blind motors 116a-116b. For a simulated intermodal (freight) train, a lighter electrical load is applied to the generator outputs of blind motors 116a-116b.

When simulator 100 is operating in the simulated dynamic braking mode, switch gear 124a-124b configures blind motors 3212 into a series motor configuration 3212. In this configuration, the train speed set by train drag/speed potentiometer 120, which controls the PWM signal applied to blind motors 116a-116b by microprocessor 118.

At Block 3214, the setting of train drag/speed potentiometer 120 is observed. To spin blind motors 116a-116b faster, at Block 3215, drag/speed potentiometer 120 is rotated in the clockwise direction. To spin blind motors 116a-116b slower, at Block 3216, drag/speed potentiometer 120 is rotated in the counter-clockwise direction.

Figure 33:
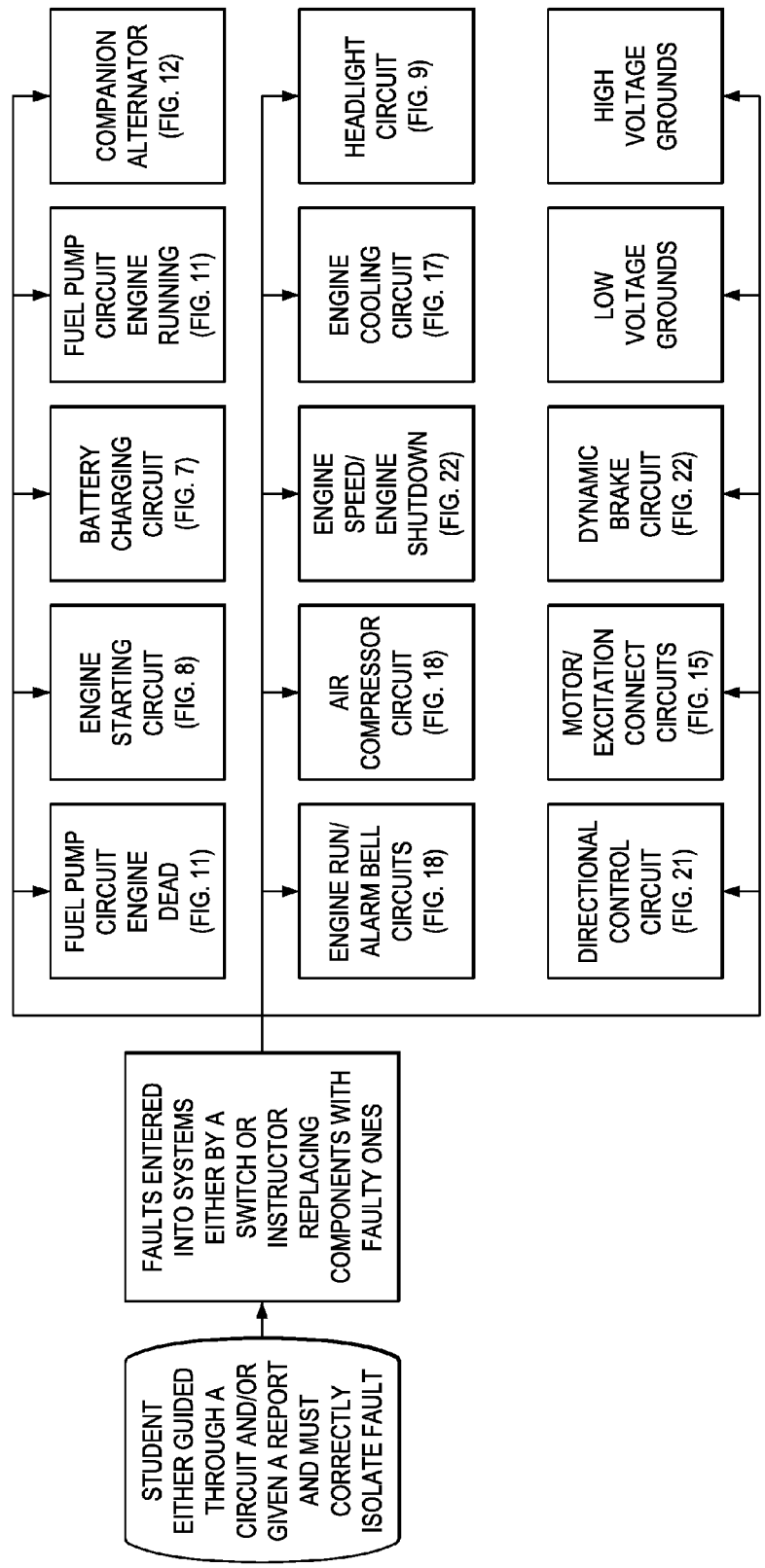
FIG. 33 is a flow chart of an exemplary procedure for general troubleshooting of locomotive electrical systems using the simulator system of FIG. 1.

FIG. 33 provides an overall summary of the troubleshooting procedures that can implemented during training on simulator 100. Generally, a student is either guided through an electrical circuit or subsystem or is given a report of a fault emulated within simulator 100, which the student must correctly isolate. Faults are implemented by the instructor using the fault switches discussed above and/or by replacing good electrical components with faulty ones. FIG. 33 also cross-references the schematics discussed above as part of the overall fault diagnosis process.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

APPENDIX

TABLE 1

| Notch | Governor Solenoid Energized | Switches Set | Nominal Control Voltage (V) | Nominal DC Motor Voltage (V) |
|---|---|---|---|---|
| Stop | — | THS Stop 5-6 | 0 | 0 |
| Idle | DV | Idle<br>THS 5-8 | 4.8 | 20 |
| 1 | DV | THS 1-8<br>THS 5-8 | 4.8 | 20 |
| 2 | AV | THS 1-8<br>THS 2, 4, 6, 8 | 5.36 | 37.1 |
| 3 | CV | THS 1-8<br>THS 3-8 | 5.78 | 49.3 |
| 4 | AV, CV | THS 1-8<br>THS 3-8<br>THS 2, 4, 6, 8 | 6.33 | 56.9 |
| 5 | BV, CV, DV | THS 1-8<br>THS 3-8<br>THS 5-8<br>THS Stop 5-6 | 6.93 | 64.3 |
| 6 | AV, BV, CV, DV | THS 1-8<br>THS 3-8<br>THS 5-8<br>THS Stop 5-6<br>THS 2, 4, 6, 8 | 7.74 | 72.4 |
| 7 | BV, CV | THS 1-8<br>THS 3-8<br>THS 5-8 | 8.72 | 82 |
| 8 | AV, BV, CV | THS 1-8<br>THS 3-8<br>THS 5-8<br>THS 2, 4, 6, 8 | 10.01 | 90 |

TABLE 2

| CONDITION | FP/ES | IS | RHS | BKS | THS | MTR | PCR | FPC | ST | ER | AV | BV | CV | DV | GFA | GFC | MR | B | BR | P1,P2 | S12 |
|---|---|---|---|---|---|---|---|---|---|---|---|---|---|---|---|---|---|---|---|---|---|
| PRIME | 1 | ISOLATE | OFF | OFF | IDLE | ● | ● | ● | | | | | | | | | | | | | |
| START | 3 | POS 2 | | | | ● | ● | ● | ● | | | | | | | | | | | | |
| IDLE | POS 2 | | | | | ● | ● | ● | | | + | | | + | | | | | | | |
| RUN | | RUN | FOR/REV | | | | | | | | | | | | | | | | | | |
| | | | | | 1 | ● | ● | ● | | ● | ● | | | | ● | ● | ● | | | + | + |
| | | | | | 2 | ● | ● | ● | | ● | ● | | ● | | ● | ● | ● | | | + | + |
| | | | | | 3 | ● | ● | ● | | ● | | | ● | | ● | ● | ● | | | + | + |
| | | | | | 4 | ● | ● | ● | | ● | | ● | ● | | ● | ● | ● | | | + | + |
| | | | | | 5 | ● | ● | ● | | ● | | ● | ● | ● | ● | ● | ● | | | + | + |
| | | | | | 6 | ● | ● | ● | | ● | | ● | | ● | ● | ● | ● | | | + | + |
| | | | | | 7 | ● | ● | ● | | ● | | ● | | | ● | ● | ● | | | + | + |
| | | | | | 8 | ● | ● | ● | | ● | | | | | ● | ● | ● | | | + | + |
| STOP | | | | | * | ● | ● | ● | | ● | | | | ● | ● | ● | ● | | | | |
| PAR | | | | | 1-8 | ● | ● | ● | | ● | | | | | ● | ● | ● | | | ● | |
| SER-PAR | | | | | 1-8 | ● | ● | ● | | ● | | | | | ● | ● | ● | | | | ● |
| BRAKE | | | ■ | | | ● | ● | ● | | ● | | | | | ● | | | ● | ● | | |
| BRAKE | | | | | 1-8 | ● | ● | ● | | ● | | | | | ● | | ● | | | | ● |

● ENERGIZED
+ CONDITIONAL
* STOP
■ BRAKE SET-UP

TABLE 3

| | TEST SW | | |
|---|---|---|---|
| | POSITION | | |
| TERM | CKT CHECK | NORM | LOAD TEST |
| 1-2 | | | ● |
| 1-3 | | ● | |
| 4-5 | | | ● |
| 4-6 | | ● | |
| 7-8 | ● | | ● |
| 7-9 | ● | ● | |
| 10-11 | | | ● |
| 10-13 | | ● | |
| 12-13 | ● | | |
| 14-15 | | | ● |
| 14-17 | | ● | |
| 16-17 | ● | | |

TABLE 4

| | FP/ES SW POSITION | | |
|---|---|---|---|
| | OFF | PRIME | ST |
| 1-2 | | ● | ● |
| 3-4 | ● | | |
| 5-6 | ● | | |
| 7-8 | | | ● |
| 9-10 | | | ● |

TABLE 5

| | IS | |
|---|---|---|
| | POSITO | |
| SW | ST | RUN |
| A-B | ● | |

TABLE 5-continued

| | IS | |
|---|---|---|
| | POSITO | |
| SW | ST | RUN |
| C-D | | ● |
| E-F | | ● |
| G-H | | ● |
| J-K | | ● |
| L-M | | ● |
| N-P | | ● |
| Q-R | ● | |
| S-T | | ● |

TABLE 6

| | THS | | | | | | | | | |
|---|---|---|---|---|---|---|---|---|---|---|
| | | Position | | | | | | | | |
| SWS | STOP | IDLE | 1 | 2 | 3 | 4 | 5 | 6 | 7 | 8 |
| IDLE  C-D | | ● | | | | | | | | |
| 1 THRU 8  A-B | | | ● | ● | ● | ● | ● | ● | ● | ● |
| STOP 5, 6  A-B | ● | | | | | | ● | ● | | |
| C-D | | | | | | | | | | |
| 3 THRU 8  C-D | | | | | ● | ● | ● | ● | ● | ● |
| 5 THRU 8  A-B | ● | ● | ● | ● | ● | | | | | |
| C-D | | | | | | | ● | ● | ● | ● |
| 2, 4, 6, 8  C-D | | | | ● | | ● | | ● | | ● |
| BRAKE 1-8  A-B | | | ● | ● | ● | ● | | | | |
| C-D | | | | | | | ● | ● | ● | ● |

TABLE 7

SW HDLT BK & FR

| SWS | POSITION | | | |
|---|---|---|---|---|
| | OFF | DIM | MED | BRT |
| L-1 | | ● | | |
| L-2 | | | ● | |
| L-3 | | | | ● |

TABLE 8

RHS (Remote Headlights Switch)

| POS | FUNCTION | CONNECTION | | | |
|---|---|---|---|---|---|
| 1 | SINGLE UNIT OR INTERMEDIATE UNIT | 5-1 | 10-6 | 15-11 | 20-16 |
| 2 | CONTROLLING WITH UNIT COUPLED AT HOOD END | 5-2 | 10-7 | 15-12 | 20-17 |
| 3 | CONTROLLING WITH UNIT COUPLED AT CAB END | 5-3 | 10-8 | 15-13 | 20-18 |
| 4 | CONTROLLED FROM ANOTHER UNIT COUPLED AT EITHER END | 5-4 | 10-9 | 15-14 | 20-19 |

What is claimed is:

1. A system for simulating electrical systems of a diesel-electric locomotive comprising:
   a first electric motor for simulating a locomotive diesel engine;
   a generator coupled to the first electric motor in a main generator operating mode for simulating a locomotive main generator;
   wherein the generator is further operable to simulate a locomotive auxiliary generator in an auxiliary generator operating mode and the system further comprises a simulated electrical load selectively coupled to the generator in the auxiliary generator operating mode;
   a second electric motor driven by an electrical output of the generator in the main generator operating mode for simulating a locomotive traction motor; and
   A third electric motor coupled to the second electric motor and operating as a generator providing a load on the second electric motor during simulated locomotive motoring operations.

2. The system of claim 1, wherein the simulated electrical load selectively comprises a simulated battery load for simulating a locomotive battery at a selected charge level.

3. The system of claim 1, wherein the generator comprises a field coil and the system further comprises a power supply providing a current to the field coil of the generator in the auxiliary generator mode for simulating a self-excited generator.

4. The system of claim 1, wherein the generator comprises a field coil and the system further comprises:
   a pulse width modulation driver providing an excitation signal to the field coil of the generator; and
   a microprocessor responsive to a user input for controlling a strength of the excitation signal provided by the pulse width modulation driver to the field coil of the generator.

5. The system of claim 1, wherein the third electric motor is selectively coupled to the second electric motor for operating as a motor driving the second electric motor during simulated dynamic braking operations and the system further comprises switching circuitry for selectively coupling an electrical output of the generator to a resistive load during simulated dynamic braking operations.

6. The system of claim 5, further wherein the third electric motor comprises a field coil and the system further comprises:
   a pulse width modulation driver providing a signal to the field coil while the third electric motor is operating as a motor; and
   a microprocessor responsive to a user input for controlling the signal provided by the pulse width modulation driver to the field coil of the third electric motor to vary a rotation speed of the second and third motors during simulated dynamic braking operations.

7. The system of claim 1, further wherein the third electric motor comprises a field coil and the system further comprises:
   a pulse width modulation driver providing a signal to the field coil while the third electric motor is operating as a generator; and
   a microprocessor responsive to a user input for controlling the signal provided by the pulse width modulation driver to the field coil of the third electric motor to vary the load on the second electric motor during simulated locomotive motoring operations.

8. The system of claim 1, further comprising switchgear selectively coupling the electrical output of the generator to the second electric motor to control a direction of rotation of the second motor.

9. The system of claim 1, further comprising:
   a plurality of switches for simulating a locomotive throttle handle switch;
   a simulated electronic governor control responsive to inputs provided by the plurality of switches and including a switched voltage divider for selectively generating control voltages; and
   a variable speed motor controller responsive to the control voltages for varying a speed of the first electric motor in response to user input through the plurality of switches.

10. The system of claim 1, further comprising switching circuitry coupled to an output of the third electric motor for applying a selected one of a first electrical load simulating coal train operating conditions and a second electrical load simulating intermodal train operating conditions during simulated motoring operations.

11. A locomotive electrical systems simulation system comprising:
   a simulated diesel engine subsystem including an electrical motor and a motor speed controller for controlling a speed of the electrical motor in response to a control voltage;
   a plurality of switches for simulating a locomotive throttle handle switch;
   a simulated electronic governor control responsive to inputs provided by the plurality of switches and including a switched voltage divider for selectively setting the control voltage;
   a generator driven by the electrical motor of the simulated diesel engine subsystem and operable in a main generator mode to simulate a locomotive main generator and in an auxiliary generator mode to simulate a locomotive auxiliary generator;
   excitation control circuitry for controlling excitation of a field winding of the generator in response to a user input;
   a simulated traction motor subsystem comprising:
      first and second simulated traction motors;

switching circuitry for selectively electrically coupling the first and second simulated traction motors with the generator during motoring in the main generator mode and to a resistive load during dynamic braking;

first and second control motors operating as generators respectively loading the first and second simulated traction motors during motoring and operating as motors respectively turning the first and second simulated traction motors during dynamic braking; and switching circuitry for selectively electrically coupling the generator to a auxiliary generator load in the auxiliary generator mode.

12. The system of claim 11, further comprising:
a load resistance; and
switching circuitry for electrically coupling the first and second traction motors to the load resistance during dynamic braking.

13. The system of claim 11, further comprising switching circuitry operable to: electrically couple the first and second traction motors to the generator in series during series motoring; and
electrically couple the first and second simulated traction motors with the generator in parallel during parallel motoring.

14. The system of claim 11, wherein the simulated auxiliary generator load circuitry comprises a variable load for simulating a locomotive battery at a selected charge levels.

15. The system of claim 11, further comprising switching circuitry for coupling the field winding of the generator to a power supply in the auxiliary generator mode for simulating a self-excited auxiliary generator.

16. The system of claim 11, wherein the first and second control motors each comprise a field winding and the system further comprises:
a pulse width modulation driver providing a signal to the field windings of the first and second control motors while the first and second control motors are operating as generators; and
a microprocessor responsive to a user input for controlling the signal provided by the pulse width modulation driver to the field windings of the first and second control motors to vary the loads on the first and second simulated traction motors during simulated locomotive motoring operations.

17. The system of claim 11, further comprising switching circuitry coupled to the first and second control motors for selectively applying a selected one of a load simulating coal train operating conditions and a load simulating intermodal train operating conditions during simulated motoring operations.

18. The system of claim 11, wherein the first and second control motors each comprise a field winding and the system further comprises:
a pulse width modulation driver providing a signal to the field windings of the first and second control motors while are the first and second control motors are operating as motors; and
a microprocessor responsive to a user input for controlling the signal provided by the pulse width modulation driver to the field windings of the first and second control motors to vary a rotation speed of the on the first and second simulated traction motors during simulated locomotive dynamic braking operations.

19. The system of claim 11, wherein the switching circuitry for selectively electrically coupling the first and second simulated traction motors with the generator during motoring and to a resistive load during dynamic braking comprises a motor-driven multiple-contact motor/braking switch.

20. The system of claim 11, wherein the switching circuitry for selectively electrically coupling the first and second simulated traction motors with the generator during motoring and to a resistive load during dynamic braking comprises switching circuitry for reversing a direction of rotation of the first and second simulated traction motors.

21. The system of claim 20, wherein the switching circuitry for reversing the direction of rotation of the first and second simulated traction motors comprises a motor-driven multiple-contact reverser switch.

* * * * *